(12) United States Patent
Horstmeyer et al.

(10) Patent No.: US 12,504,615 B2
(45) Date of Patent: Dec. 23, 2025

(54) SYSTEM AND METHOD FOR PARALLELIZED VOLUMETRIC MICROSCOPE IMAGING

(71) Applicant: Ramona Optics Inc., Durham, NC (US)

(72) Inventors: Gregor Horstmeyer, Durham, NC (US); Mark Harfouche, Durham, NC (US); Paul Reamey, Durham, NC (US)

( * ) Notice: Subject to any disclaimer, the term of this patent is extended or adjusted under 35 U.S.C. 154(b) by 407 days.

(21) Appl. No.: 17/902,761

(22) Filed: Sep. 2, 2022

(65) Prior Publication Data

US 2023/0070475 A1 Mar. 9, 2023

Related U.S. Application Data

(60) Provisional application No. 63/240,718, filed on Sep. 3, 2021.

(51) Int. Cl.
*G02B 21/36* (2006.01)
*G02B 21/00* (2006.01)

(52) U.S. Cl.
CPC ......... *G02B 21/365* (2013.01); *G02B 21/004* (2013.01); *G02B 21/0064* (2013.01); *G02B 21/0076* (2013.01)

(58) Field of Classification Search
CPC .. G02B 21/365; G02B 21/367; G02B 21/361; G02B 21/004; G02B 21/0064; G02B 21/0076; G02B 21/16
See application file for complete search history.

(56) References Cited

U.S. PATENT DOCUMENTS

2004/0090667 A1* 5/2004 Gartner ................ G02B 21/247
359/368

FOREIGN PATENT DOCUMENTS

WO WO-2019118960 A1 * 6/2019 ........... G01B 11/245

* cited by examiner

*Primary Examiner* — Kathleen V Nguyen
(74) *Attorney, Agent, or Firm* — Edward Ergenzinger

(57) ABSTRACT

A system can be used for imaging volumetric samples using a camera array to capture images under different illumination patterns at different axial planes of focus, and at optionally varying lateral fields of view. The sequence of images taken under the different illumination patterns and optional varying lateral fields of view can be processed to generate an image representation of the sample at a focus plane of the sample. Multiple image representations at different focus planes are assembled to form a 3D volumetric representation of the sample.

20 Claims, 37 Drawing Sheets

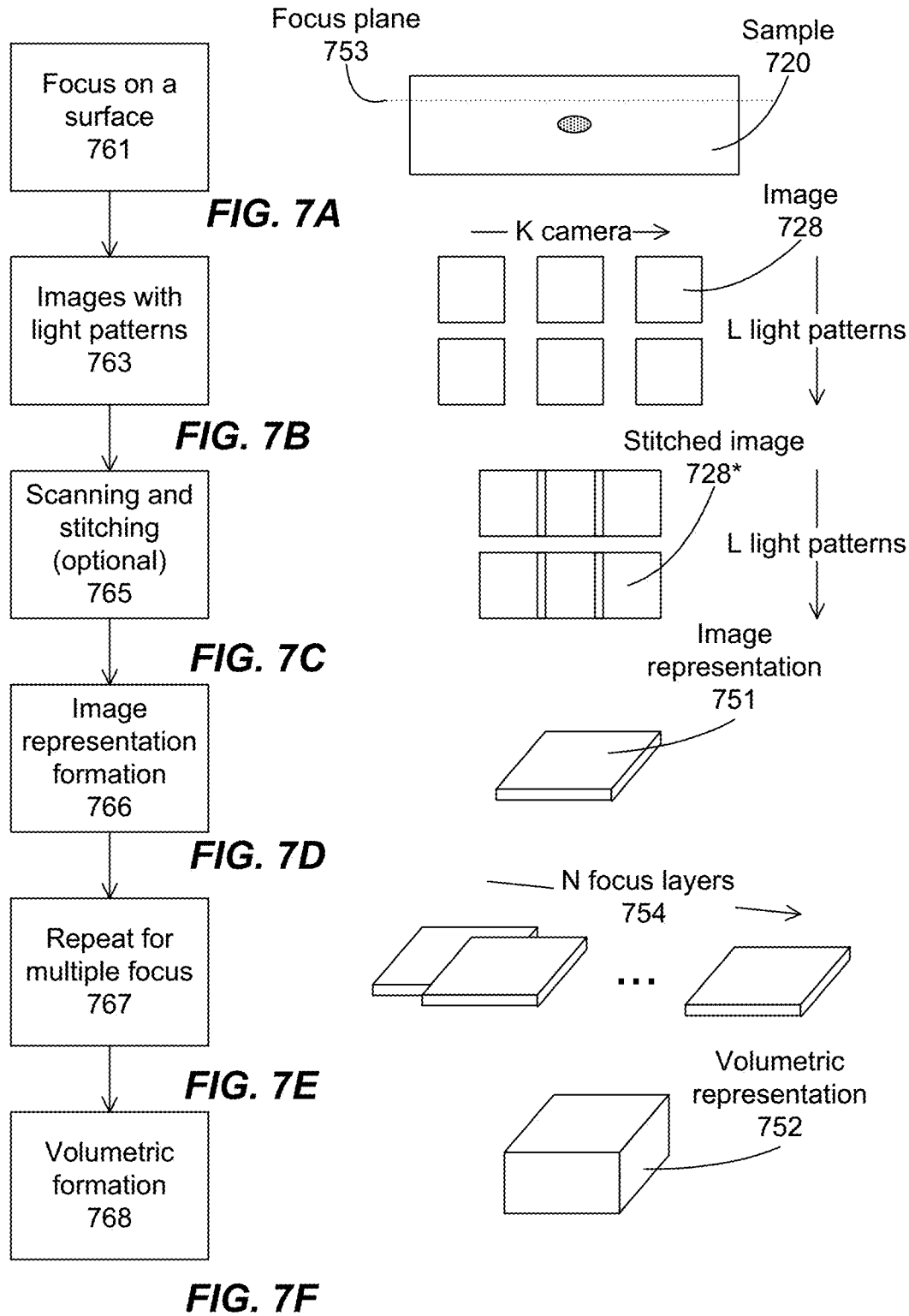

1264 forms multiple image representations at multiple focus planes of a sample, with each image representation formed by processing multiple images of an area captured under multiple illumination patterns, with each image of the multiple images captured under an illumination pattern of the multiple illumination patterns.

The images of an area include images captured by an individual camera, or composite images stitched from images captured by multiple cameras.

The image representation includes a result image having higher contrast than an image of the images.

The image representation includes lateral and depth information around a focus plane of the multiple focus planes.

The image representation includes lateral locations of objects in the sample and thickness of the objects at the lateral locations.

The image representation includes complex values with magnitude components showing lateral locations of objects in the sample and phase components showing thickness of the objects.

The multiple illumination patterns are configured to enable calculations of phase contrast information in the images.

The multiple illumination patterns comprise equal and opposite illumination patterns to the area to provide phase contrast information in the images.

The multiple illumination patterns are configured to enable calculations of phase information of light reaching the images for determining the depth information.

1266 forms a 3D volumetric representation of the sample based on the multiple image representations at the multiple focus planes of the sample.

The formation comprises identifying in-focus image locations using a sharpness metric, and associating the locations with calibrated depths.

The formation comprises identifying in-focus image locations using a sharpness metric, and merging the identified image locations into an all-in-focus image.

The formation comprises minimizing a cost function with respect to a 3D volume subjected to constraints and the multiple image representations.

The formation comprises connecting the multiple image representations subjected to constraints of light propagation.

*FIG. 12*

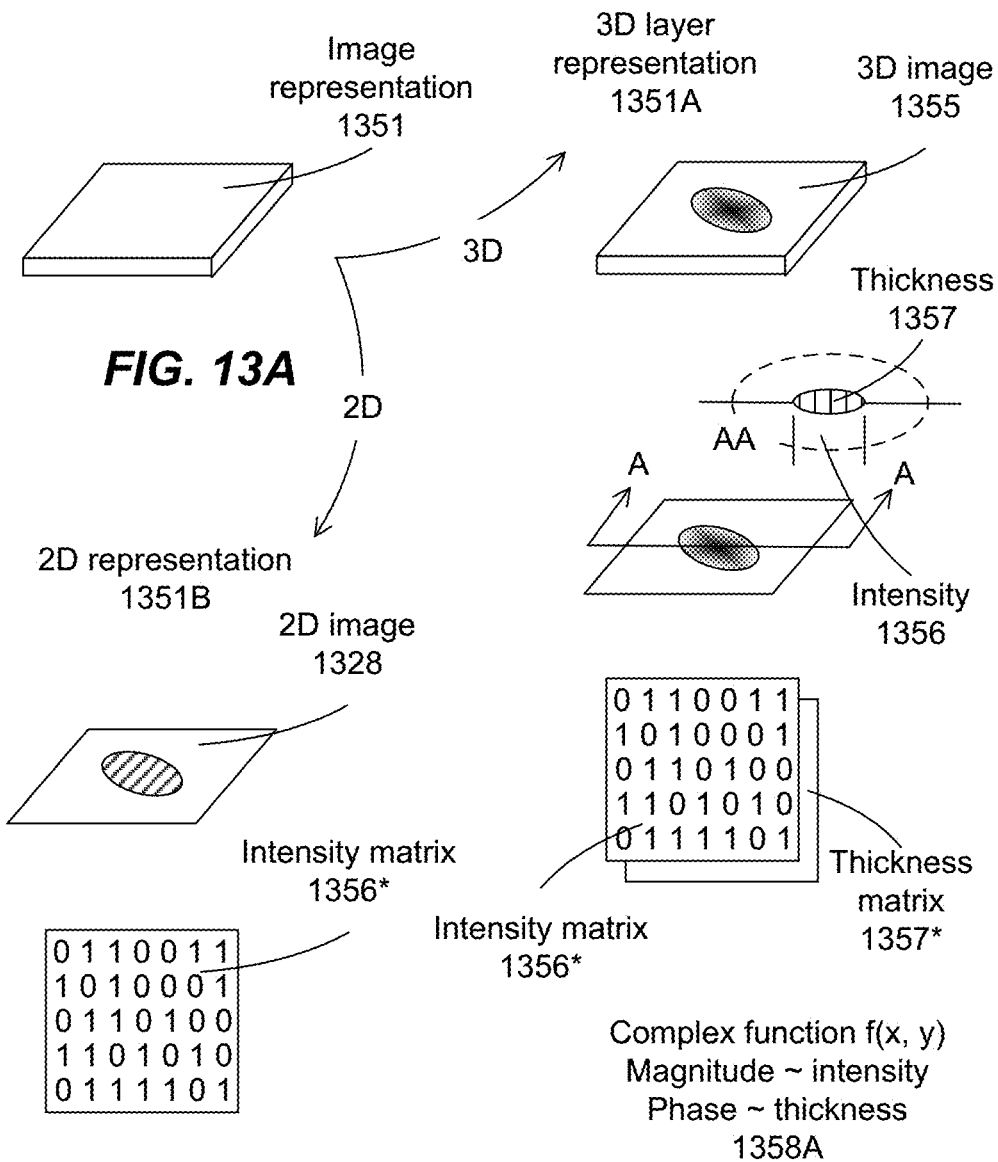

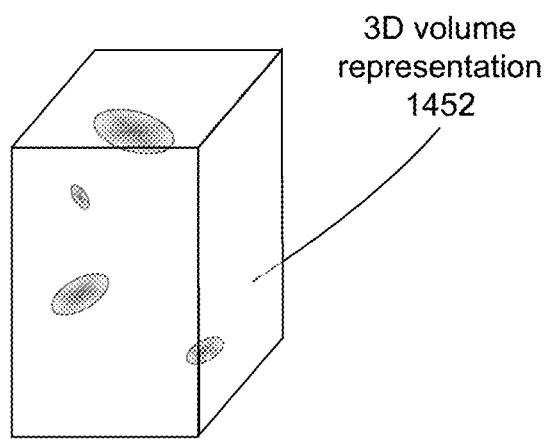
FIG. 14A
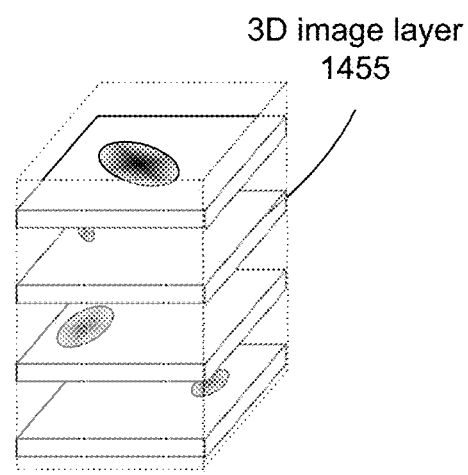
FIG. 14B
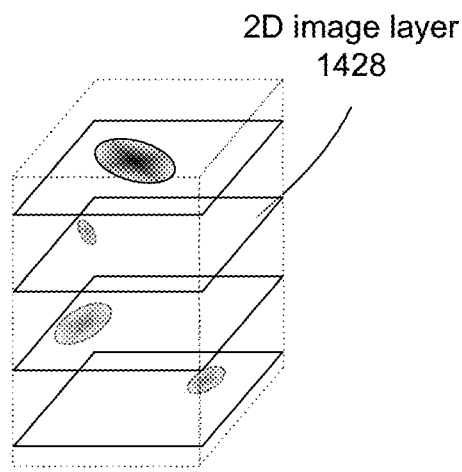
FIG. 14C
Vertex table f(x, y, z)
Edge table f(x, y, z)
Surface table f(x, y, z)
1452A
FIG. 14D

1560 optionally provides excitation to the sample, with the excitation including a local excitation to one or more areas of the sample or a global excitation to a whole of the sample, with the excitation including at least one of a continuous excitation, a periodic excitation, or a pulse excitation, and with the excitation including a noise, a sound, an audio effect, a light, a visual effect, an olfactory effect, a vibration, a mechanical manipulation, a chemical or biochemical injection, a fluorescence excitation,

1561A sets focus of multiple cameras to a first focus plane in the sample.

1563A captures images from the multiple cameras under a first illumination pattern from one or more light sources, with each camera capturing an area of sample.

1564 optionally pre-processes captured image data for each camera in parallel before sending the image data or the pre-processed image data to a memory of a processor. The optional pre-process includes organizing the image data from the cameras and forming a serial data stream to be sent to a processor.

1563B repeats capturing images from the cameras under one or more second illumination patterns different from each other and from the first illumination pattern.

1565A optionally moves the cameras or the sample to new locations to scan the sample, and repeats capturing images from the cameras under the first and the one or more illumination patterns at new locations.

1565B optionally stitches images of different areas of the sample under each illumination pattern.

1566 fuses the images or the stitched images of the first and the one or more second illumination patterns to form a first image representation of the area or of the sample, with the first image representation comprising lateral and depth information around the first focus plane.

1561B sets focus of cameras to one or more focus planes in the sample, with the one or more focus planes different from each other and from the first focus plane.

1567 repeats capturing images, optionally moving, optionally stitching, and fusing to form one or more second image representations with each second image representation comprising lateral and depth information around one of the one or more focus planes.

1568 forming a 3D volumetric representation of the sample based on the first and the one or more second image representations of the sample.

*FIG. 15*

1600 forms an MCAM system for forming a 3D volumetric representation of a sample.

The MCAM system includes multiple cameras each configured to capture images of a different area of the sample, one or more light sources configured to provide irradiation to the sample, one or more moving mechanisms configured to focus the multiple cameras to one of multiple focus planes in the sample, and a controller configured to control the multiple cameras, the one or more light sources, the one or more moving mechanisms, and also configured to process image data from the captured images.

The MCAM system optionally includes one or more excitation sources configured to provide a local or a global excitation to the sample, with the excitation sources including a local excitation to an area of the sample or a global excitation to a whole of the sample, with the excitation including a continuous excitation, a periodic excitation, or a pulse excitation, and with the excitation including a noise, a sound, an audio effect, a light, a visual effect, an olfactory effect, a vibration, a mechanical manipulation, a chemical or biochemical injection, a fluorescence excitation.

The controller is configured to generate one or more illumination patterns by controlling the one or more light sources.

The controller is configured to control the multiple cameras to capture images of the sample under each of the one or more illumination patterns.

The controller is configured to control the one or more moving mechanisms to focus the multiple cameras to each of the multiple focus planes.

The controller is configured to generate multiple image representations, with each image representation generated from a set of images captured by the multiple cameras under each illumination pattern at each focus plane.

The set of images comprises multiple individual images, with each individual image captured by a same individual camera.

The set of image comprises multiple composite images, with each composite image comprising images captured by the multiple cameras and stitched together.

The set of image comprises multiple scanned images, with each scanned image comprising images captured by a same individual camera during scanning and stitched together.

The controller is configured to generate a 3D volumetric representation of the sample by processing the multiple image representations.

FIG. 16

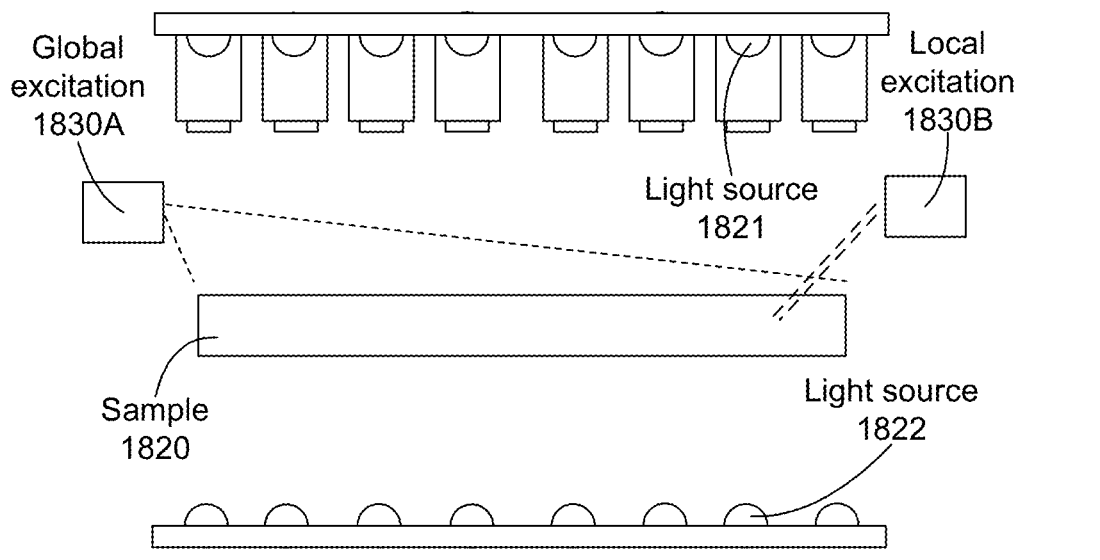
*FIG. 18A*
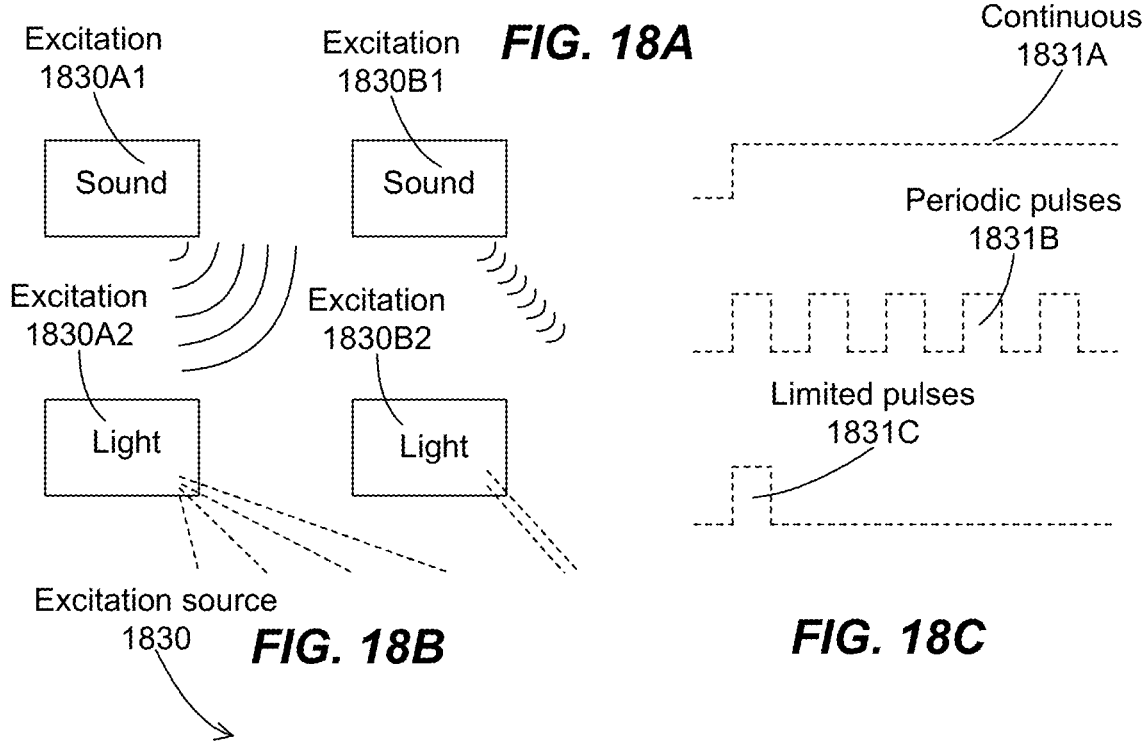
*FIG. 18B*     *FIG. 18C*
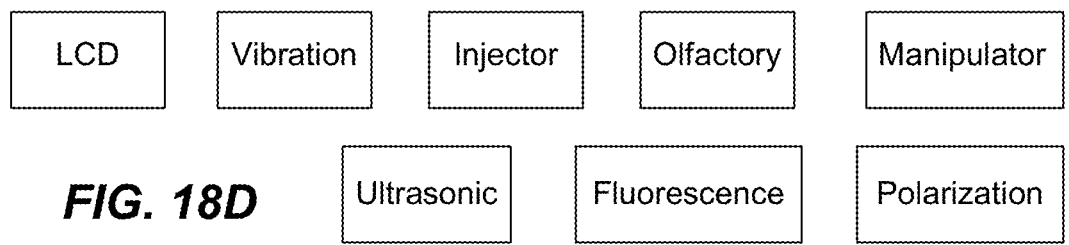
*FIG. 18D*

2265A positions a sample facing multiple cameras at a first position so that each camera is configured to capture a first image of a first area of the sample.

2262A generates a first illumination pattern on the sample.

2263A captures a first set of images from the multiple cameras under the first illumination pattern at the first location.

2265B optionally moves the multiple cameras or the sample to one or more second locations so that the each camera is configured to capture one of one or more second images of each of one or more second areas of the sample.

2263B captures one or more second sets of images from the multiple cameras under the first illumination pattern, with each of the one or more second sets of images captured at one of the one or more second locations.

2267 repeats for one or more second illumination patterns on the sample. The repetition includes generating each of the one or more second illumination patterns, moving the multiple cameras or the sample to the first and the one or more second positions, and captures additional first and one or more second sets of images at the first and the one or more second positions.

2265C Optionally stitches the first set, the one or more second sets, the additional first set, and the additional one or more second sets of images into first, one or more second, additional first, and additional one or more second composite images, respectively, with the first set of images stitched into the first composite image, with each of the one or more second sets of images stitched into one of the one or more second composite images, with the additional first set of images stitched into the additional first composite image, with each of the one or more additional second sets of images stitched into one of the one or more additional second composite images.

2266A processes one or more groups of images to form one or more image representations, with each of the one or more groups of images fused into one of the one or more image representations.

The each of the one or more groups of images includes images captured by a same camera under the first and the one or more second illumination patterns, or includes the first, the one or more second, the additional first, and the additional second composite images.

*FIG. 22*

2366A forms an image representation of a sample by processing multiple images of an area captured under multiple illumination patterns, with each image of the multiple images captured under an illumination pattern of the multiple illumination patterns.

The images of an area include images captured by an individual camera, or composite images stitched from images captured by multiple cameras.

The image representation includes a complex function of planar positions, with amplitudes of the complex function related to intensities of objects at the planar positions, with phases of the complex function related to thickness of the objects at the planar positions.

The formation of the image representation includes determining parameters of the complex function.

The determination is performed by minimizing errors between intensity of the multiple captured images and intensity of images generated by the complex function calculated from properties of light propagating in the multiple illumination patterns.

The determination is performed by calculating intensities of multiple images resulted from the light propagation in the multiple illumination patterns, respectively.

The determination is performed minimizing mean squared errors between amplitudes of the multiple captured images and the amplitudes of the multiple calculated images between the complex function and the light propagation in the multiple illumination patterns.

The formation of the image representation is optionally performed by partitioning each of the multiple captured images into smaller images, determining multiple complex functions for the smaller images, with each complex function representing a smaller image, and assembling the multiple complex functions.

*FIG. 23A*

2300A forms an MCAM system including a controller.

The controller is configured to form an image representation of a sample through minimizing errors between intensity of multiple captured images and intensity of images generated by a complex function representing the image representation calculated from properties of light propagating in the multiple illumination patterns.

*FIG. 23B*

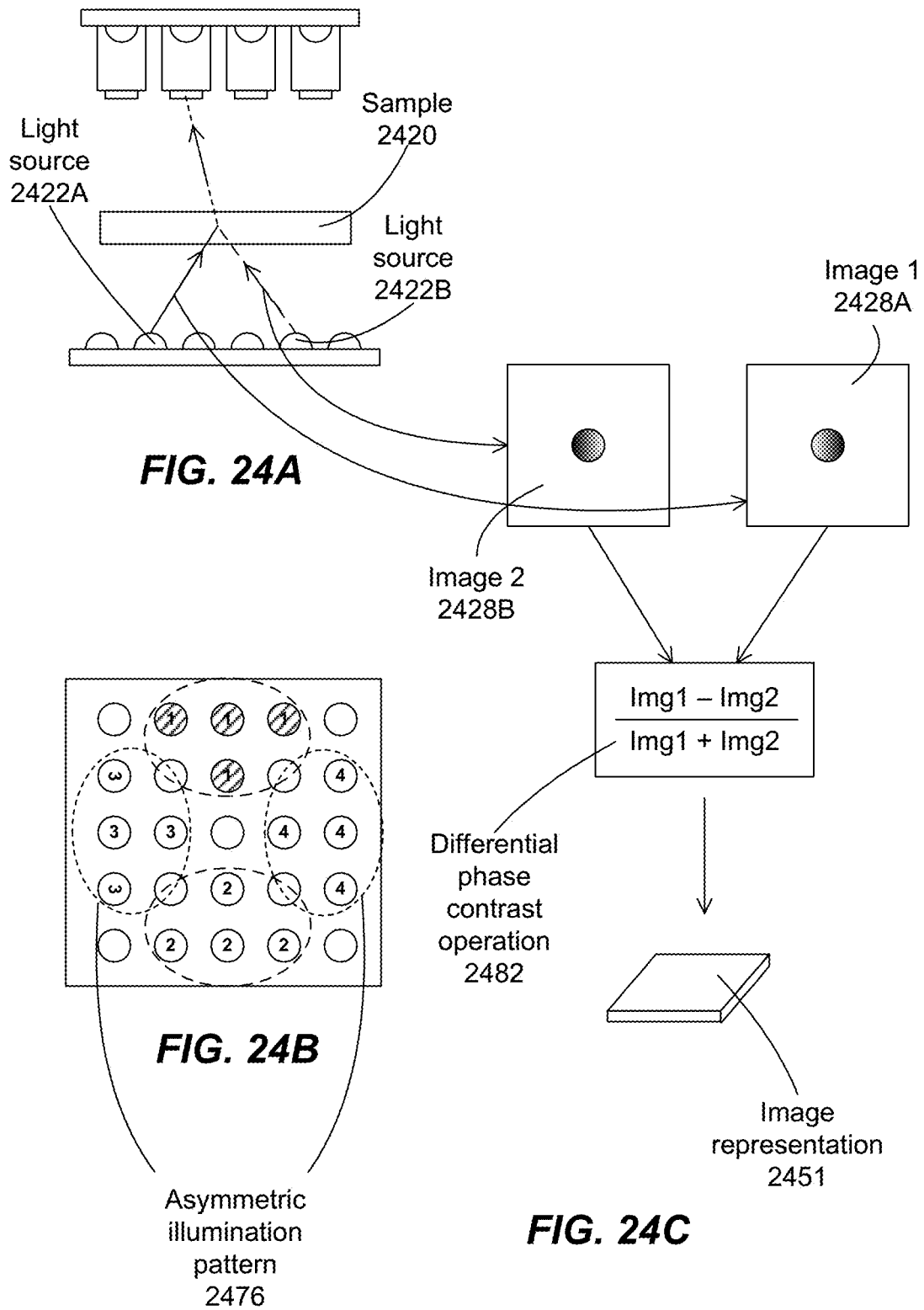

2566B forms an image representation of a sample by processing multiple images of an area captured under multiple illumination patterns.

The image representation includes a complex function of planar positions, with amplitudes and phases related to intensities and thicknesses, respectively.

The formation of the image representation includes determining parameters of the complex function.

The determination is performed by reconstructing the phase of the complex function through the internal relationship between the intensity and phase distribution of a wave.

The determination is performed by calculating phase contrast information from multiple images calculated from the light propagation under the multiple illumination patterns, respectively.

The determination is performed minimizing a mean squared error between phase information of the multiple captured images and the phase information of the multiple calculated images.

The determination is performed by minimizing errors between phase contrast differences among the multiple captured images and phase contrast differences of images generated by calculating from light propagation through the complex function.

The determination is performed by calculating phase contrast differences between multiple images calculated from light propagation under the illumination patterns.

The determination is performed minimizing mean squared errors between phase contrast difference of the multiple captured images and the phase contrast difference of the multiple calculated images.

*FIG. 25A*

2500B forms an MCAM system including a controller.

The controller is configured to form an image representation of a sample through minimizing errors between phase contrast differences of multiple captured images and phase contrast differences of images generated by a complex function representing the image representation calculated from light propagation.

*FIG. 25B*

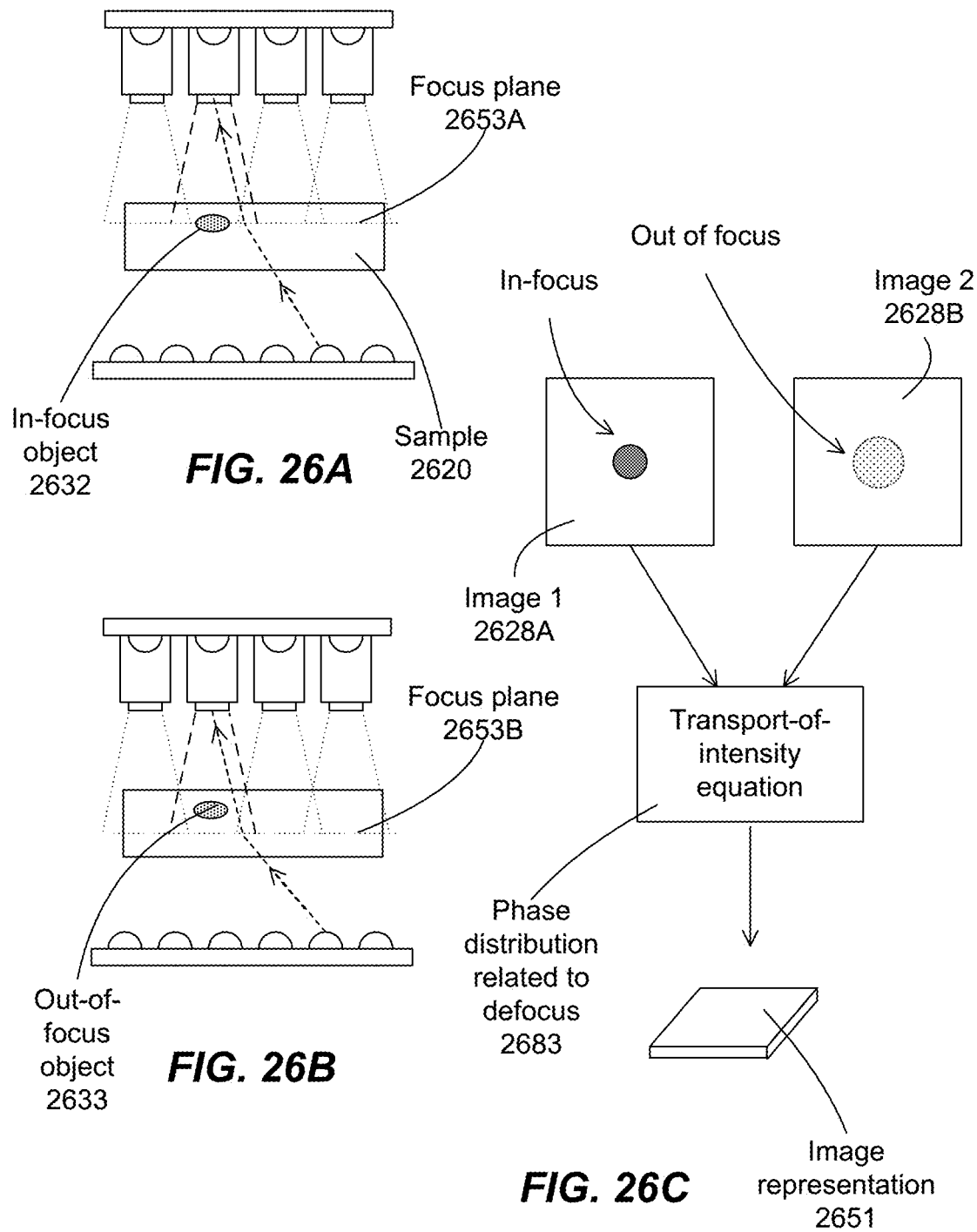

2766C forms an image representation of a sample by processing multiple images of an area captured under multiple illumination patterns.

The image representation includes a complex function of planar positions, with amplitudes and phases related to intensities and thicknesses, respectively.

The formation of the image representation includes determining parameters of the complex function.

The determination is performed by reconstructing the phase of the complex function through an internal relationship between the intensity and phase distribution of a wave, relating difference in irradiance with a phase distribution, which allows a measurement of the phase distribution of a sample by acquiring a defocus image.

*FIG. 27A*

2700C forms an MCAM system including a controller.

The controller is configured to form an image representation of a sample through calculating a phase distribution of the sample using a defocused image having intensity distribution at x, y, and z + delta z.

*FIG. 27B*

3084 stitches multiple image representations of a sample to form a 3D volumetric representation of the sample.

The multiple image representations include overlapped volumes between adjacent image representations.

*FIG. 30A*

3084A determines common features in overlapped volumes between adjacent image representations of multiple image representations..

3084B aligns the common features to form a 3D volumetric representation from the multiple image representations.

*FIG. 30B*

3000D1 forms an MCAM system including a controller.

The controller is configured to stitches multiple image representations of a sample to form a 3D volumetric representation of the sample.

The multiple image representations include overlapped volumes between adjacent image representations.

*FIG. 30C*

3000D2 forms an MCAM system including a controller.

The controller is configured to determine common features in overlapped volumes between adjacent image representations of multiple image representations.

The controller is also configured to align the common features to form a 3D volumetric representation from the multiple image representations.

*FIG. 30D*

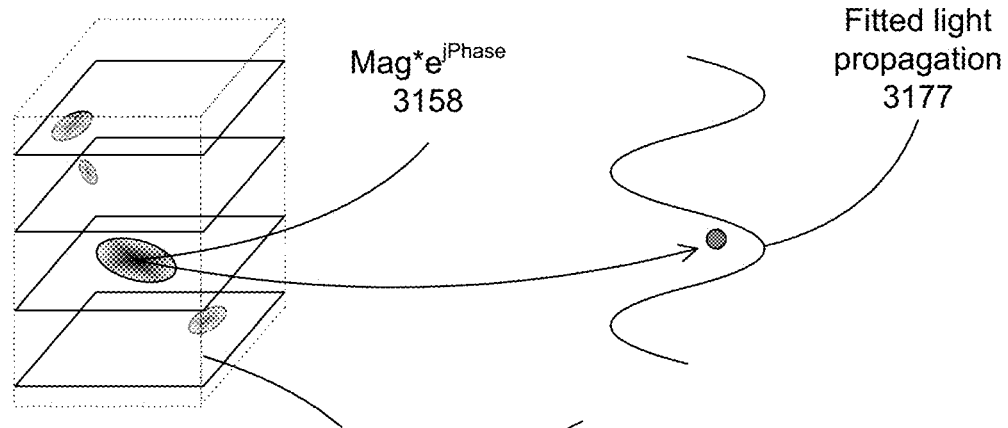
FIG. 31A
FIG. 31B
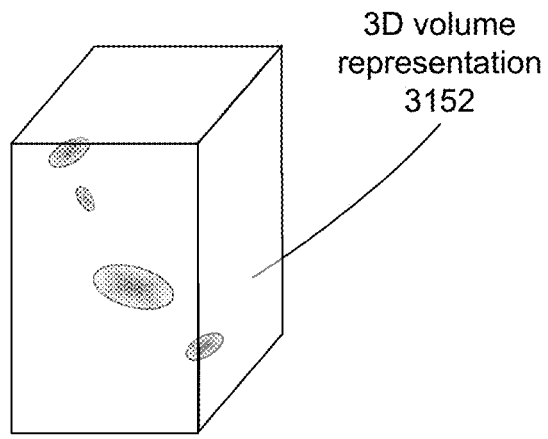
FIG. 31C

3268A forms a 3D volumetric representation of a sample by processing multiple image representations at multiple focused depths of the sample, with each image representation processed from multiple images captured under multiple illumination patterns, with each image of the multiple images captured under an illumination pattern of the multiple illumination patterns.

The multiple image representations include images captured by an individual camera, or composite images stitched from images captured by multiple cameras.

The image representation includes a complex function of planar positions, with amplitudes and phases related to intensities and thicknesses of the objects at the planar positions.

The 3D volumetric representation includes a complex function of 3D positions, with amplitudes and phases related to intensities and thicknesses of the objects at the 3D positions.

The formation of the 3D volumetric representation includes determining parameters of the complex function of 3D positions.

The determination is performed by optimizing a propagation of light between the image representations at the multiple focused depths.

The determination is performed by connecting the image representations at the multiple depths.

The determination is performed by optimizing the connections subjected to constraints of light propagation through the image representations, which including amplitudes and phases of the image representations.

*FIG. 32A*

3200E forms an MCAM system including a controller.

The controller is configured to form a 3D volumetric representation of a sample by optimizing a propagation of light between multiple image representations at multiple focused depths, with each image representation processed from multiple images captured under multiple illumination patterns, with each image of the multiple images captured under an illumination pattern of the multiple illumination patterns.

*FIG. 32B*

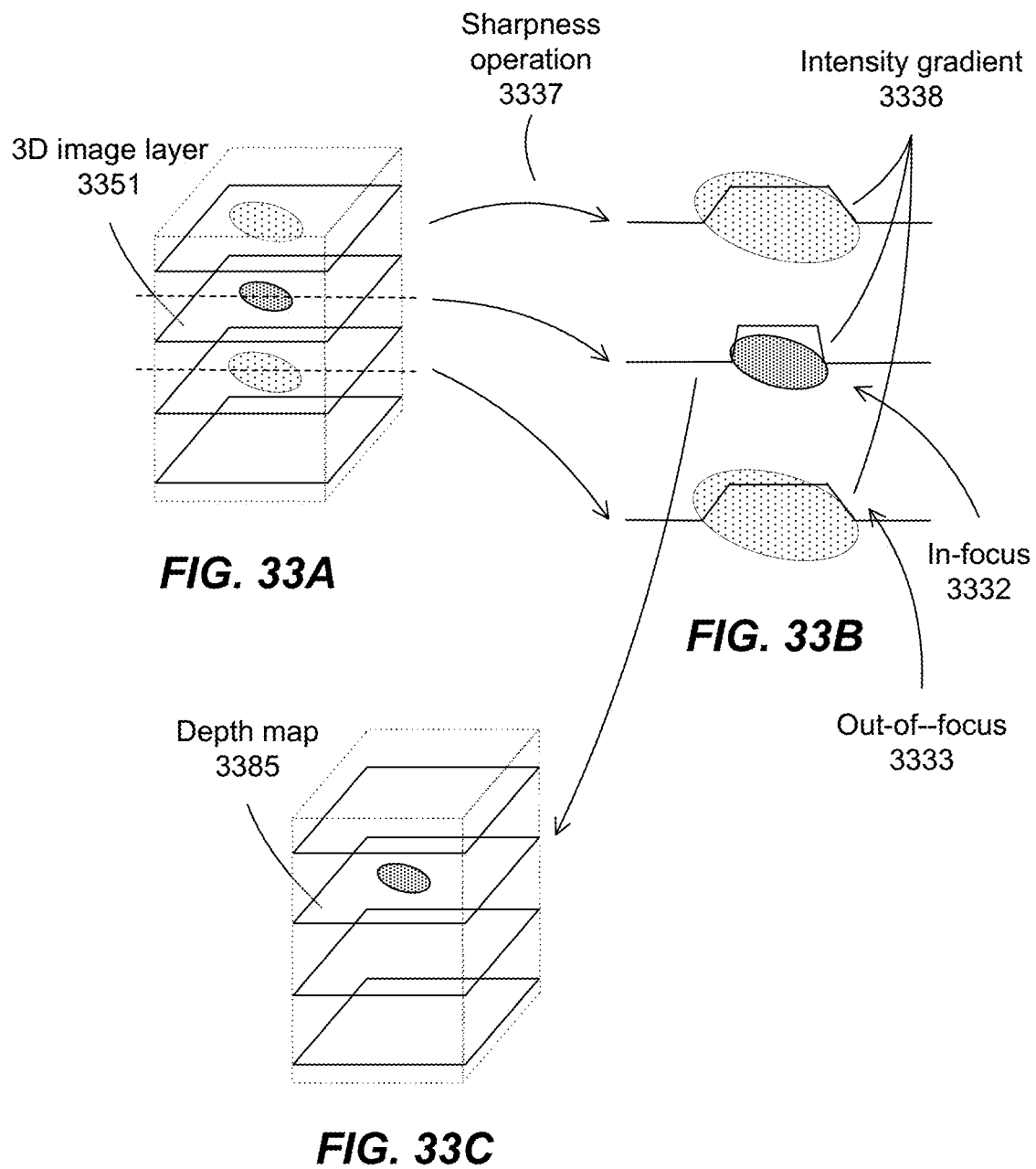

3468B forms a 3D volumetric representation of a sample by processing multiple image representations at multiple focused depth planes of the sample, with each image representation processed from multiple images captured under multiple illumination patterns, with each image of the multiple images captured under an illumination pattern of the multiple illumination patterns.

The multiple image representations include images captured by an individual camera, or composite images stitched from images captured by multiple cameras.

The image representations each include an image focused at a focused depth plane of the multiple focus depth planes to form in-focus and out-of-focus images of objects in the sample.

The 3D volumetric representation includes image representations of in-focus images of the objects.

The formation of the 3D volumetric representation includes determining in-focus images of the objects through a sharpness determination process.

The formation of the 3D volumetric representation includes determining a sharpness of the image representations through an intensity gradient determination, comparing the sharpness to a threshold to determine image representations having in-focus images, and assembling the image representations having in-focus images according the corresponded focused depths.

*FIG. 34A*

3400F forms an MCAM system including a controller.

The controller is configured to form a 3D volumetric representation of a sample by determining image representations having in-focus images through a sharpness determination process, and assembling the image representations having in-focus images according the corresponded focused depths.

*FIG. 34B*

3687 forms a composite image representation of a sample by processing multiple image representations at multiple focused depth planes of the sample, with each image representation processed from multiple images captured under multiple illumination patterns, with each image of the multiple images captured under an illumination pattern of the multiple illumination patterns.

The multiple image representations include composite images stitched from images captured by multiple cameras.

The image representations each include an image focused at a focused depth plane of the multiple focus depth planes to form in-focus and out-of-focus images of objects in the sample.

The composite image representation includes in-focus images of the objects in the sample.

Alternatively, the composite image representation includes in-focus images of the objects in the sample, together with thickness information of the objects.

The composite image representation includes in-focus images of the objects, with the in-focus images of the objects determined through a sharpness determination process.

The formation of the composite image representation includes determining a sharpness of the image representations through an intensity gradient determination, comparing the sharpness to a threshold to determine image representations having in-focus images, and assembling the image representations having in-focus images into the composite image representation.

*FIG. 36A*

3600G forms an MCAM system including a controller.

The controller is configured to form a composite image representation of a sample by determining image representations having in-focus images through a sharpness determination process, and assembling the image representations having in-focus images into the composite image representation.

*FIG. 36B*

882 forms a refocusable 3D volumetric representation of a sample by processing multiple image representations at multiple focused depth planes of the sample, with each image representation processed from multiple images captured under multiple illumination patterns, with each image of the multiple images captured under an illumination pattern of the multiple illumination patterns.

The multiple image representations include composite images stitched from images captured by multiple cameras.

The image representations each include an image focused at a focused depth plane of the multiple focus depth planes to form in-focus and out-of-focus images of objects in the sample.

The refocusable 3D volumetric representation includes in-focus images of the objects in the sample at corresponded depths, with the focused images focusable at each corresponded depth.

Alternatively, the refocusable 3D volumetric representation includes in-focus images of the objects in the sample at corresponded depths, together with thickness information of the objects.

The refocusable 3D volumetric representation includes in-focus images of the objects at corresponded depths, with the in-focus images of the objects determined through a sharpness determination process, with the focused images focusable at each corresponded depth.

*FIG. 37A*

3700H forms an MCAM system including a controller.

The controller is configured to form a refocusable 3D volumetric representation of a sample by determining image representations having in-focus images through a sharpness determination process, and assembling the image representations having in-focus images into the refocusable 3D volumetric representation, with the focused images focusable at each corresponded depth.

*FIG. 37B*

SYSTEM AND METHOD FOR PARALLELIZED VOLUMETRIC MICROSCOPE IMAGING

The present patent applicant claims priority from the U.S. Provisional Patent Application, Ser. No. 63/240,718, filed on Sep. 3, 2021, entitled "System and method for parallelized volumetric microscope imaging", of the same inventors, hereby incorporated by reference in its entirety.

BACKGROUND OF THE INVENTION

There are a number of existing techniques to form 3D images with the microscope. One general class of methods uses "focal stacking", in which a series of images is captured as the focus of the imaging system is varied across the specimen most typically along the axial dimension, which is the dimension that aligns with the optical axis of the imaging system. This can be achieved via movement of the specimen, or movement of the lens and the imaging sensor. After acquiring a sequence of snapshots from different axial locations, which are focused along different axial planes of the volumetric specimen, software can be used to process the acquired data into an estimate of the 3D distribution of the specimen of interest. Tomographic approaches can alternatively rotate the volumetric specimen while acquiring a series of images and post-processing the captured dataset accordingly. It can often be challenging or not possible to rotate multiple specimens arranged within a multi-well plate.

A second class of methods captures one or more images under unique forms of illumination to acquire 3D information about a volumetric specimen. This includes approaches using structured illumination, as well as a technique termed Fourier ptychographic tomography. These methods typically must shine multiple illumination fields, each with a particular spatial or angular arrangement, onto the specimen. It can be challenging to ensure accurate spatial or angular arrangements of illumination across many specimens distributed within a multi-well plate. Issues such as the following exist: the well wall leads to shadowing effects which prevents high-angle illumination, liquid above or below the sample, often with a meniscus, modifies the illumination beam in often unknown ways, and the well-plate itself is of material that can cause effects such as autofluorescence, inter-reflection and scattering. These effects prevent direct application of 3D imaging techniques used within standard microscopes, to the acquisition of 3D information from volumetric specimens in a parallelized manner, as is considered by the present invention. The effects must be carefully taken into account if and when illumination is used to assist with 3D information acquisition, as done here.

A third class of methods for 3D microscopic imaging rely upon interferometry, in which a coherent beam of light is used to illuminate the specimen and the resulting scattered light is interfered with a reference wave. Example methods include optical coherence tomography.

However, many of these prior efforts work within a standard microscope outfitted with a single objective lens and image sensor. They are not designed for imaging with multiple lenses and sensors in a parallelized manner, as the present invention achieves. These methods do not easily translate into imaging thick specimens in a parallelized manner. In many parallelized imaging experiments, individual specimens are placed within individual wells of a multi-well plate, which can contain 24 or 96 or 384 wells. Including a structured illumination beam, variable-angle illumination, reference beam or sample manipulation such as rotation within or across specimen material within more than one of such wells, or all such wells, is challenging or otherwise not possible.

Prior work has considered parallelized imaging within well plates. However, this prior work did not aim to image volumetric specimens specifically or to acquire 3D image data in general. This invention's primary aim is to provide a system and method for 3D imaging of volumetric specimens.

SUMMARY OF THE EMBODIMENTS

Presented is a system and method for imaging volumetric samples at high resolution in a parallelized manner. It consists of a configuration of multiple individual high-resolution imaging systems comprising an imaging system array, along with a means to vary the lateral fields-of-view and axial planes of focus of the multiple imaging systems within a specimen volume of interest, and a programmable illumination source to provide specimen illumination. The imaging system array, its positioning and focusing mechanisms, and illumination sources are electronically controlled to acquire a sequence of digital images that compose an image dataset. A computer algorithm is then used to combine this image dataset into measurements of the 3D morphological properties of the volumetric specimens of interest.

In some embodiments, the present invention discloses systems and methods for forming volumetric representation of a sample. The methods can include forming multiple image representations at multiple focus depth planes of a sample. Each image representation of the multiple image representations is formed by processing multiple images of an area of the sample captured under multiple illumination patterns at a focus depth plane of the multiple focus depth planes, with each image of the multiple images captured under an illumination pattern of the multiple illumination patterns. The images of an area comprise images captured by an individual camera, or composite images stitched from images captured by multiple cameras.

The methods can further include forming a volumetric representation of the sample based on the multiple image representations at the multiple focus depth planes.

In some embodiments, the formation of the each image representation comprises forming an image having higher contrast or resolution than an image of the multiple images. The formation of the each image representation comprises determining lateral and depth information of objects in the sample at the focus plane. The formation of the each image representation comprises determining lateral locations of the objects in the sample and thickness of the objects at the lateral locations at the focus plane. The formation of the each image representation comprises determining complex values representing the objects in the sample at the focus plane, with magnitude components of the complex values showing lateral locations of the objects and phase components of the complex values showing thicknesses of the objects.

In some embodiments, the formation of the volumetric representation comprises identifying in-focus locations of objects in the sample using a sharpness metric, and associating the locations with calibrated depths. The formation of the volumetric representation comprises identifying in-focus locations of the objects in the sample using a sharpness metric, and merging the identified in-focus locations into an all-in-focus image. The formation of the volumetric representation comprises stitching the multiple image representations based on common features identified in overlap volumes between adjacent image representations. The formation of the volumetric representation comprises minimizing a function of the volumetric representation and the multiple image representations subjected to light propagation constraints. The formation of the volumetric representation comprises minimizing errors in connecting the multiple image representations subjected to light propagation constraints.

BRIEF DESCRIPTION OF THE DRAWINGS

FIGS. 7A-7F illustrate a process for forming a volumetric representation of a sample according to some embodiments.

FIG. 12 illustrates a flow chart for forming a volumetric representation of a sample according to some embodiments.

FIGS. 13A-13C illustrate configurations for image representations according to some embodiments.

FIGS. 14A-14D illustrate configurations for volumetric representations according to some embodiments.

FIG. 15 illustrates a flow chart for forming a volumetric representation of a sample according to some embodiments.

FIG. 16 illustrates a flow chart for forming a microscope system according to some embodiments.

FIGS. 18A-18D illustrate configurations for excitation sources for an MCAM according to some embodiments.

FIG. 22 illustrates a process for forming an image representation according to some embodiments.

FIGS. 23A-23B illustrate flow charts for forming image representations according to some embodiments.

FIGS. 24A-24C illustrate a process for forming image representations using phase contrast according to some embodiments.

FIGS. 25A-25B illustrate flow charts for phase contrast processes according to some embodiments.

FIGS. 26A-26C illustrate a process for forming image representations using phase information obtaining from defocus images according to some embodiments.

FIGS. 27A-27B illustrate flow charts for phase distribution processes according to some embodiments.

FIGS. 30A-30D illustrate flow charts for stitching image representations according to some embodiments.

FIGS. 31A-31C illustrate a process for forming a volumetric representation according to some embodiments.

FIGS. 32A-32B illustrate flow charts for forming a volumetric representation according to some embodiments.

FIGS. 33A-33C illustrate a process for forming a depth map according to some embodiments.

FIGS. 34A-34B illustrate flow charts for forming a volumetric representation according to some embodiments.

FIGS. 36A-36B illustrate flow charts for forming a volumetric representation according to some embodiments.

FIGS. 37A-37B illustrate flow charts for forming a volumetric representation according to some embodiments.

DETAILED DESCRIPTION OF THE EMBODIMENTS

Figure 1A:
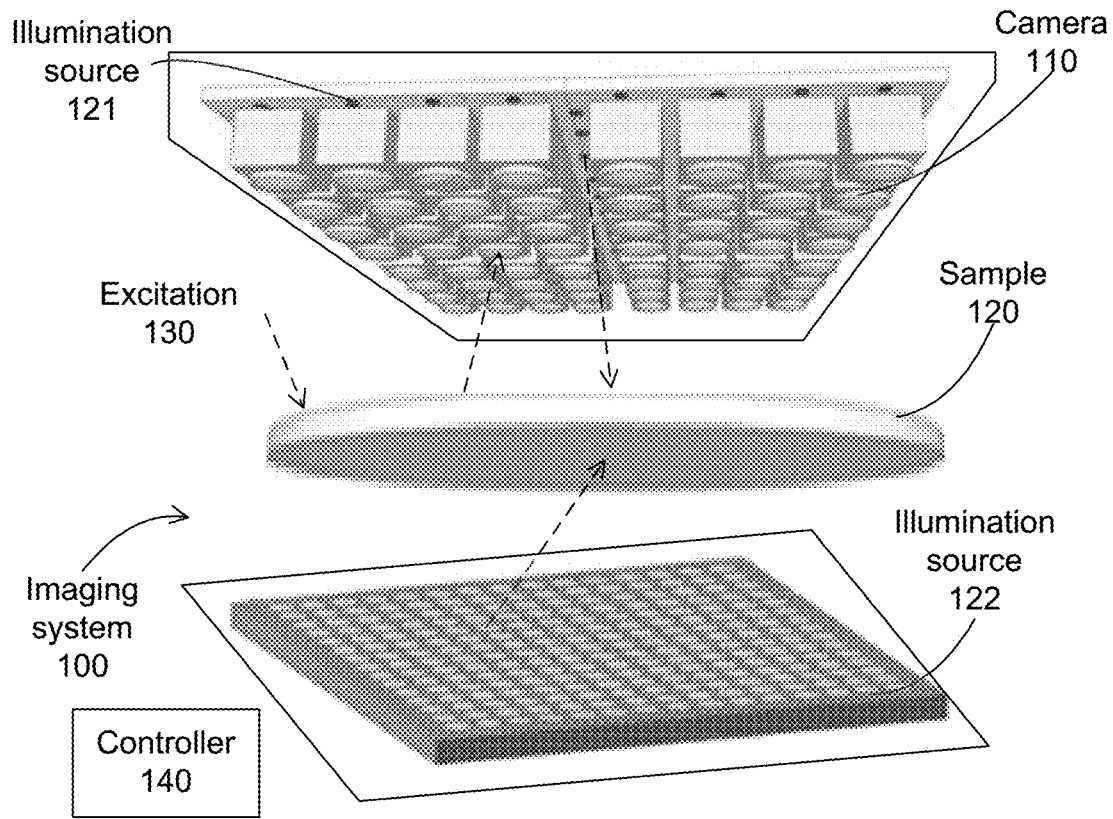
FIGS. 1A-1B illustrate a schematic of an MCAM system according to some embodiments.

In some embodiments, the present invention discloses systems and methods to image volumetric samples at high resolution. The systems include an imaging array having multiple individual high-resolution imaging systems, e.g., cameras, along with positioning and focusing mechanisms to vary the lateral fields-of-view and axial planes of focus of the imaging array within a sample, e.g., a specimen or a volume containing organisms of interest, together with a programmable illumination source capable of providing multiple illumination patterns to the sample or specimen. The systems further include a controller or a processor configured to control the imaging array, including controlling the positions, the fields of view, and the focuses of the individual imaging systems, the illumination sources, including controlling the generation of different illumination patterns to the sample or specimen. The controller or processor can also be configured to process image data captured by the imaging array to generate a three dimensional volumetric representation of the samples.

In operation, the imaging array, including the positioning, fields of view adjusting, and focusing mechanisms, and the illumination sources are electronically controlled to acquire a sequence of digital images that compose an image dataset. The image dataset can include multiple composite image datasets, with each composite image dataset formed by stitching images captured by individual cameras under an illumination pattern and at a focusing depth on the sample. Alternatively, the image dataset can include multiple individual image datasets, with each individual image dataset including images captured by the individual cameras under an illumination pattern and at a focusing depth on the sample. The controller or processor, having a computer algorithm, is then used to combine the image dataset into a 3D volumetric representation of the sample, which can allow the measurements of 3D morphological properties of the volumetric specimens of interest.

In some embodiments, the systems can be configured to obtain measurements of the 3D morphological properties of the sample under different external excitation. The excitation can be provided locally, e.g., to one or more discrete areas or volumes of the sample. The excitation can be provided globally, e.g., to the whole area or volume of the sample.

In some embodiments, the systems can be configured to analyze a single sample or specimen, such as a petri disk containing multiple organisms. The systems can be also configured to analyze multiple discrete samples, such as a well plate containing multiple wells. The excitation can be provided to the different wells, such as a same excitation can be provided to multiple wells, but with different parameters such as different frequencies or amplitudes to different wells, or different excitation can be provided to different wells.

In some embodiments, the systems can form 3D images of volumetric specimens or samples with 3D image construction or with high resolution, such as higher than that offered by individual cameras. The system can acquire more than one image from more than one camera aggregated within an array of cameras under more than one illumination pattern, and then combines the acquired image data into multiple image representations at different focus depth planes, and a 3D volumetric reconstruction of one or more volumetric organisms typically located within the specimen or the sample, such as within wells of a multi-well plate.

In some embodiments, the systems can include microscopes outfitted with multiple image systems, e.g., multiple cameras, with each camera having an objective lens and an image sensor, operated in a parallelized manner. The multiple camera microscope can be configured to image thick samples to generate 3D volumetric representations of the specimens. For example, the multiple camera microscope can parallely process multiple specimens, such as by placing the individual specimens in individual wells of a multi-well plate, which can contain 24 or 96 or 384 wells.

In some embodiments, the multiple camera microscopes can be outfitted with a controllable illumination source, which can provide a structured illumination beam, a reference beam, variable-angle illumination, or in general, multiple illumination patterns to the sample, for example, to provide light filed, dark field, contrast illumination, or differential contrast illumination.

In some embodiments, the multiple camera microscopes can be outfitted with one or more moving mechanisms, which can control the cameras, e.g., individual cameras or the whole camera array, such as changing the field of view for adjusting the magnification, changing positions for scanning the sample, or changing the focus for focusing at different focus depth planes in the sample. The moving mechanisms can include a sample manipulation such as rotation within or across specimen material within more than one of such wells, or all such wells, In some embodiments, the microscope can be configured to image 3D volumetric specimens using different illumination patterns. The multiple captured images of a same sample area under the different illumination patterns can be processed to provide 3D information about a volumetric specimen. For example, the multiple illumination patterns can include structured illumination and Fourier ptychographic tomography.

In general, a large number of illumination patterns is required for thick samples, e.g., thicker than about 50 or 100 nm. For thick samples, the different illumination patterns can have a particular spatial or angular arrangement to the specimen. It can be challenging to ensure accurate spatial or angular arrangements of illumination across many specimens distributed within a multi-well plate. Issues such as the following exist: the well wall leads to shadowing effects which prevents high-angle illumination, liquid above or below the sample, often with a meniscus, modifies the illumination beam in often unknown ways, and the well-plate itself is of material that can cause effects such as autofluorescence, inter-reflection and scattering. These effects can prevent direct application of 3D imaging techniques used within standard microscopes, to the acquisition of 3D information from thick volumetric specimens.

In some embodiments, the microscope can be configured to image thin specimens that are treated as 2D objects, e.g., using a fewer number of illumination patterns, such as less than 10, less than 5, less than 3, or just 2 illumination patterns. For example, multiple images captured fewer than 8, such as 4 or 2, different illumination patterns can be processed to acquire an accurate height (about 20 nm, such as less than 30 nm, or 50 nm) profile of the 2D surface. The smaller number of illumination patterns can speed up the data processing, together with less issues associated with thicker specimens.

In some embodiments, the microscope can be configured to image thick specimens using focal stacking. The focal stacking process can work across a large depth range, limited only by the opacity of the sample, such as up to 1 mm for some sparsely distributed samples.

The focal stacking process includes capturing a series of images as the focus of the imaging system is varied across the specimen, such as along the axial dimension, which is the dimension that aligns with the optical axis of the imaging system. The changes of the focus depth in the sample can be achieved via movements of the sample, or movement of the cameras, e.g., the camera array or the lenses and imaging sensors of the individual cameras. After acquiring a sequence of snapshots from different axial locations, e.g., the cameras are focused along different axial focus depth planes of the volumetric specimen before capturing images, the captured image data can be used to process the acquired data into an estimate of the 3D distribution of the specimen of interest. The focal stacking process can acquire a volumetric estimate of the sample at low resolution, which is limited by the resolution of the cameras and the separation of the focus depth planes, such as between 200 nm to a few tens of micrometers axial resolution.

In some embodiments, the present invention discloses systems and methods to combine the process of thin specimen imaging using a small number of illumination patterns with the focal stacking process. The thin specimen imaging can provide high 2D surface-type resolution (~20 nm), and the focal stacking can extend the high 2D resolution over a large axial range (more than 1 mm). For example, the present invention can be used image organoid specimens. These are small clusters of cells, typically grown from human cells extracted within clinical applications, which is of particular interest to be observed at high resolution. Since the cells are distributed in 3 dimensions within different areas of a well plate that is multiple mm across and multiple mm deep, the present microscope utilizing a combination of 3D high resolution thin specimen imaging together with the focal stack imaging for extending the high resolution in the axial dimension can be an effective microscopic imaging technology available to capture the desired information.

Microscopy-based high content screening, in which microscopic images are captured of many unique samples (e.g., biological specimens) is a popular and growing research tool in drug discovery, toxicology and genetics, to name a few disciplines. As compared to high-throughput screening, in which images are typically not captured, it can provide critical information about cell or organism morphology, viability, growth, and other morphological or visual phenotypes. The present microscope can provide a fast measurement process for high content screening. The present microscope can offer 5-10 seconds for high-content and high-throughput screening for well-plate such as a 96 well-plate. In addition, the present microscope can also offer 3D image data with high content screening to obtain additional information about volumetric specimens, instead of being constrained to only image 2D specimens that are on the bottom surface of the sample.

The present microscope can offer two primary benefits. First, by recording across many specimen areas in parallel, which can contain many individual wells of a well-plate, the proposed approach can greatly speed up high-content screening experiments. In principle, with N individual imaging systems within the array, a high-content screening experiment based upon standard technology using a single microscope imaging column can be sped up by a factor of N. This speed up can be on the order of 48× or 54× or 100×, for example, depending upon the size of the array, which reduces what are typically 5-10 minute experiments to approximately 5-10 second experiments, in principle.

A second primary benefit is the ability to record 3D information about volumetric specimens. Existing technologies for high-content screening rarely capture 3D information about volumetric cells, in part due to the additional time that is required to capture such information, as well as the general challenges associated with accurate 3D capture. By integrating volumetric specimen measurement within a parallelized approach, this invention provides a means to acquire such 3D data in a timely manner. A key examine is in the imaging of clusters of cells such as organoids, which are otherwise challenging to acquire full morphological information about. The present invention enables rapid, high-throughput acquisition of 3D information of organoid specimens in a parallelized manner, which is otherwise not possible with existing technology.

Other benefits include the following. First, the ability to image across multi-well plates that are not uniformly located along the axial dimension, which are not uniformly flat due to manufacturing tolerances, or which contain specimen material that is unevenly positioned within different wells at different axial locations. Accordingly, this invention is able to capture in-focus image data from wells with different bottom depths that exist at different axial planes. Second, the ability to rapidly assess volumetric specimens such as organoids in a compact geometry, which can fit within an incubator to remove the need to extract the specimen for study and thus remove the need to alter its environmental surroundings. Third, the simultaneous use of multi-focus capture with angled illumination unlocks the ability to extract relevant phase-sensitive information about large, 3D volumetric specimens in a rapid manner with this invention's parallelized approach.

In some embodiments, the present invention discloses an imaging system, such as a microscope employing a high resolution imaging system array to capture image data from a three-dimensional area of interest that contains a specimen of interest, here referred to as the specimen volume or a sample. The array of high-resolution imaging systems, such as micro cameras, can form a multi-camera array microscope to image samples such as a well plate, which contains 6, 24, 54, 96, 384 or another number of individual wells, with each well containing material of interest for imaging. The material of interest can include cellular matter, stem cells, human-derived cells, organism-derived cells, plant-derived cells, small model organisms, other vertebrate or invertebrate organisms, plant material, plant cells, biochemical suspensions, organoid tissue, organoids, cellular structures, in vitro cells, in vitro tissue, tissue, cytopathology material, bacteria, bacterial colonies, protein crystals, other proteins, viruses, DNA, RNA, or such proteins, viruses, DNA, RNA attached to microbeads or microspheres. The material of interest can be distributed at various locations within the specimen volume, either within individual wells of a well-plate, or across a large area of a slide or alternative specimen holder. At different locations within the specimen volume, the specimen exhibits a three-dimensional structure from which the microscope can extract volumetric information.

Each high-resolution imaging system, e.g., camera, within the array is configured to image at microscopic resolution, which ranges from 0.1 µm resolution to 10 µm resolution and captures electromagnetic radiation in the visible, ultraviolet or infrared regime of the electromagnetic spectrum that has interacted with the specimen volume. In some embodiments, some or all of this radiation can originate from one or more illumination boards that contain a number of unique light-emitting elements. Example light emitting elements include LEDs, laser diodes, vertical cavity surface emitting lasers, or incoherent thermal sources. The illumination boards can be positioned above, below, or to the side of the specimen of interest. Other arrangements, including selections and combinations of illumination boards that illuminate from the top, side and below, can be used.

Each high-resolution imaging system, e.g., camera, contains a series of collection optical elements, such as lenses, diffractive lenses, or metalenses, which capture and deliver optical radiation from one sub-volume region, e.g., a portion of the volume, of the specimen volume of interest to a digital image sensor which contains an array of radiation-sensitive pixels. The digital image sensors can include a charged coupled device (CCD), complementary metal-oxide semiconductor (CMOS) pixel array, "smart" pixel array such as a gigajot array, or an active vision sensor, or a single-photon avalanche diode (SPAD) array. For each high-resolution imaging system within the array, digital image data from a particular sub-volume specimen region is captured within a finite exposure time, e.g., a snapshot. Within this snapshot, electromagnetic radiation is converted into an electric signal at one or more pixels within the array, which is subsequently digitized to form a digital image.

The resulting digital images from one or more imaging system snapshots, composed as digital signals, are then delivered to a first digital processor, which aggregates and organizes the acquired image data. In some embodiments, the first processor is a field-programmable gate array (FGPA), but can also take the form of a computer processing unit or alternative ASIC. The first processor subsequently sends the organized image data to a second set of digital processors, which can be contained within a data processing system such as a desktop or an alternative computer and include one or more computer processing units (CPU), graphic processing units (GPU) and/or tensor processing units (TPU). Either the first processor or the second processor or both the first processor and second processor can be used to control parameters of the imaging system array (exposure time, frame rate, number of imaging systems to record data from, etc.). This second set of processors can be connected to a display or monitor for visual analysis of recorded video and data. In some embodiments, a single processor can be used.

The first or the second set of processors can also control electronic and electro-mechanical components surrounding and touching the specimen volume. For example, the processors can control, via electronic signals, the illumination boards, which can be programmed to illuminate the specimen volume with different spatial, angular, or spectral patterns of illumination. Controllable components can include specimen providers, such as micro-injectors to inject a specimen in the volume or in wells within a multi-well plate. The controllable components can also include injectors or excitation providers, such as to insert specific chemicals, toxins or other biochemical materials into the specimen volume. Micro-manipulators may also be used to manipulate, stimulate, perturb or otherwise change the specimen or their surrounding area in a controlled manner. Equipment such as voice coils or LCD screens may also be used to move or project light onto a specimen plane.

In some embodiments, the specimen volume can be imaged in an inverted geometry in which the imaging array is placed beneath the specimen volume. In this case, each imaging system can capture optical information transmitted through a transparent or semi-transparent well bottom. It is also possible to place the micro camera array microscope (MCAM) within an incubator. As an example, a MCAM can include a camera array containing 8×4 imaging systems (a total of 32 individual imaging systems).

In some embodiments, the MCAM can include a 3D positioning stage, which can be controlled by either the first or the second set of processors to move the specimen volume of interest in any directions, such as in the three cardinal directions. For example, the stage can be moved in the lateral x-y plane, perpendicular to the optical axis of the imaging systems, to allow each imaging system within the imaging array to scan the sample surface, e.g., to capture different fields-of-view of the specimen volume. For systems in which the field-of-view (FOV) of each imaging system is smaller than the size of one well, such x-y lateral scanning can enable imaging of an entire well via sequential step-and-repeat scanning and image capture. As the x-y scanning will alter the FOV of more than one imaging system within the imaging system array, the scanning ability can provide a means to enable imaging of more than one entire well via sequential step-and-repeat scanning. For example, if there are 48 imaging systems within an 6×8 imaging system array, and each imaging system is configured to capture only a fraction of the well surface, e.g., each imaging system is positioned over a unique well to capture 25% of the well surface such that 48 wells are imaged in parallel, then lateral x-y scanning in a 2×2 manner can be used to capture the remaining 75% of each well surface. The first FOV area within a first scan position is first captured. After a first scan in the x-direction, a second FOV area is then captured. After a subsequent scan in the x and y directions, a third FOV area is captured, and then after a subsequent scan in the x direction, a forth FOV area is captured.

In some embodiments, to capture 3D information, the MCAM system can scan along the axial dimension (the z-dimension) to capture image data from more than one scan location along the z-dimension. The process of axial scanning can be performed by a 3D mechanical stage, which can move the well plate to different positions along the depth z direction, e.g., the direction perpendicular to the lateral surface of the sample, or the direction perpendicular to the imaging sensors of the cameras, or the direction parallel to the optical axis of the cameras. The scanning ability along the z direction can allow each of the imaging systems within the camera array to capture optical information from multiple depth planes within the specimen volume. for example, an imaging system can capture a first image snapshot from a first depth plane, a second image snapshot from a second depth plane, a third image snapshot from a third depth plane, and a forth image snapshot from a fourth depth plane. Other number of depth planes can be used, such as between 2 and 200 depth planes can be imaged from during axial scanning. The selected depth planes can be equally spaced, or can have different spacing between the scanned depth planes, e.g., the depth planes can be axially positioned at any locations within the specimen volume.

In some embodiments, the axial depth planes at which images are acquired can be selected to be a fraction of one depth-of-focus apart. For example, if each imaging system uses a lens for image formation with L=500 nm light using a numerical aperture (NA) of NA=0.3, then it is commonly recognized that the depth-of-focus of each lens is approximately $L/NA^2$=5.6 µm, and a 5.6 µm axial separation (i.e., axial scan distance) between axial image planes can be selected.

The MCAM system can have both lateral and axial scanning. For example, the camera array can be focused at a first axial depth plane, and then a 2×2 lateral scan is completed in which four snapshots are captured at different FOVs. Then, the system is scanned along the z-dimension to bring a second axial depth plane into focus, which can contain in-focus information about a different specimen area within the specimen volume that is not available within the image data captured at the first axial depth plane. The process is once again repeated in which four snapshots are captured of four different FOVs. In this example, 4 snapshots at each depth planes, for a total of 8 snapshots, are acquired by each imaging system. A camera array with 48 imaging systems will capture 48×8=384 total snapshots that will be subsequently processed by the processors, e.g., by the processors executing a data processing program.

In some embodiments, the imaging array can also be connected to a mechanical stage to control the array position. For example, the MCAM system can include a mechanical stage to move the specimen of interest in up to three dimensions, together with a mechanical stage to move the imaging system array in up to three dimensions. In some embodiments, a mechanical stage can be used to move the array's optical elements for image formation. In some embodiments, one, two or all three mechanical stages can be used in an MCAM system. Each mechanical stage can move either in one dimension (such as the axial direction), two dimensions (such as the lateral x-y directions), or all three dimensions to also enable lateral scanning in addition to axial scanning. Alternatively or additionally, individually focusable lenses can also be used within the array to focus at different axial planes, whose focal length can be varied via a small mechanical motor within each imaging system, or via an applied voltage with a liquid lens element, or some alternative optical element such as a rotatable diffraction grating can be used to control the focus position of each imaging system.

Micro-Camera Array Microscope (MCAM) System

In some embodiments, the present invention discloses a system having parallel image data acquisition, e.g., cameras, across an array of multiple separate image sensors and associated lenses, which can allow the image acquisition of a large sample, limited by the number of cameras in the camera array. The cameras can be micro cameras having small form factors assembled on a camera board, with data transfer cable coupled to a nearby computer system. With the small size and short transfer cable, fast data acquisition for large sample can be achieved.

In some embodiments, the system having parallel image data acquisition can include a computational microscope system of a micro-camera array microscope (MCAM) system. Details about the MCAM system can be found in patent application Ser. No. 16/066,065, filed on Jun. 26, 2018; and in patent application Ser. No. 17/092,177, filed on Nov. 6, 2020, entitled "Methods to detect image features from variably-illuminated images"; hereby incorporated by reference in their entirety, and briefly described below.

Figure 1B:
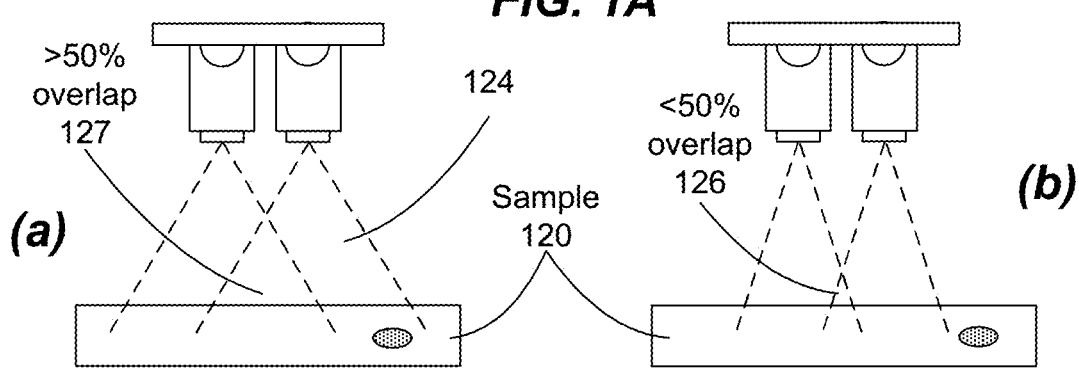

FIGS. 1A-1B illustrate a schematic of an MCAM system according to some embodiments. FIG. 1A shows a perspective view of the MCAM system. In general, the MCAM system can be viewed as an integration of multiple individual microscopes tiled together in an array to image a large sample. Each individual microscope can be configured into a micro camera package, e.g., a camera having a small form factor with minimum components, such as without a cover or extra peripheral elements. The integration of the micro camera packages can form a tightly packed array of micro-cameras with high resolution (1-10 μm) over a large area (hundreds of square centimeters). The images or video taken from the individual micro cameras, which include overlapped or non overlapped image patches of a sample 120, can be assembled together to form the image of the sample. The MCAM system can offer size, weight, complexity, and cost advantages with respect to standard microscopes. The MCAM system may not require any moving parts, and its micro-cameras fit within a compact space without requiring a rigid support structure and can thus operate within a small, confined space.

The MCAM system 100 can include multiple cameras 110, which can form a camera array, and one or more illumination sources disposed above 121 and below 122 for microscopic imaging. The light sources can be visible light sources, infrared light sources, ultraviolet light sources, fluorescent light sources, or polarized light sources, such as light emitting diodes (LEDs) or lasers with appropriate wavelengths and filters. The illumination system can be placed below 122 or above 121 the sample, to provide transmissive or reflective light to the micro cameras.

The MCAM system can use multiple micro-cameras 110 to capture light from multiple sample areas, with each micro camera capturing light from a sample area onto a digital image sensor, such as a charged coupled device (CCD), complementary metal-oxide semiconductor (CMOS) pixel array, or single-photon avalanche diode (SPAD) array.

In some embodiments, the illumination system can provide the sample with different illumination configurations, which can allow the micro cameras to capture images of the sample with light incident upon the sample at different angles, spatial patterns, and wavelengths. The illumination angle and wavelength are important degrees of freedom that impacts specimen feature appearance. For example, by slightly changing the incident illumination angle, a standard image can be converted from a bright field image into a phase-contrast-type image or a dark field image, where the intensity relationship between the specimen and background is completely reversed. The illumination system thus can be controlled to provide an optimum illumination pattern to the sample.

Alternatively, by providing the sample with different illumination light angles, spatial patterns, and wavelengths, both intensity and phase information of the imaged optical field can be recorded, which can allow the reconstruction of an image, for example, with more information or higher resolution, such as a measure of sample depth, spectral (e.g., color) properties, or the optical phase at the sample plane.

In some embodiments, the MCAM system can include one or more excitation sources 130, which can be configured to provide excitation energy to the sample, e.g., to disturb the organisms in the sample. The excitation sources can be local, e.g., the excitation energy is confined to one or more areas of the sample. The excitation sources can be global, e.g., the excitation energy is provided to the whole sample, e.g., to all areas of the sample. The excitation energy can be provided continuously, or in separate pulses. The pulses can be periodic, or can include burst of energy pulses. The excitation sources can include an acoustic signal, a radiation signal, a radiation pattern, a vibration signal, an injector that can inject a stimulant such as a chemical or a radiation excitation component, an olfactory signal, or a manipulator for generate a mechanical disturbance or stimulant to the sample.

The MCAM system 100 can include a controller 140 for controlling the cameras 110, the illumination sources 121 and 122, the excitation sources 130, and for processing the images. For example, the controller 140 can include a central processing unit or processor, which can couple to camera and light controllers for controlling the cameras units, such as to tell the cameras when to capture images, and for controlling the illumination sources, such as to tell the illumination sources when to be activated and what illumination sources to be activated. The central processing unit can be coupled with the camera units to obtain the image data captured by the camera units. The data can be stored in memory, can be processed by the central processing unit to be stored in a post processing dataset, and can be displayed on a display or to send to a final storage. The controller can optionally include a pre-processing unit or pre-processor, e.g., another processing unit or another processor, in addition to the central processing unit, for processing the image data from the cameras before sending to the central processing unit.

The post process data set can include a 3D volumetric representation of the sample, which can provide detailed information of the objects or organisms in the sample, including dimensions such as sizes and thicknesses.

FIGS. 1B(a)-1B(d) show configurations of the fields of view of the cameras in the MCAM system. FIG. 1B(a) shows a configuration for more than 50% overlapped FOV 127, e.g., the FOV 124 of 2 adjacent cameras are overlapped more than 50% of the FOV of a single camera. FIG. 1B(b) shows a configuration for less than 50% overlapped FOV 126. FIG. 1B(c) shows a configuration for a non overlapped FOV, for example, for capturing images of discrete wells in a multi-well plate or sample 120*. FIG. 1B(d) shows a configuration for a non overlapped FOV, with the FOVs of individual cameras significantly less than the well surface areas. In this configuration, a scan can be performed to move the cameras relative to the sample to allow the cameras to capture whole images of the well. As shown, the FOV of the same camera for 2 successive scans are overlapped 126*, which can allow the images to be stitched to represent a whole image of the well. The FOV of 2 adjacent cameras can be non overlapped, e.g., having a gap 125 which is also non overlapped after the scanning operation, e.g., the FOV of a first camera during the second scan does not overlap with the FOV of the second camera during the first scan. Other configurations can be used.

Each camera has a field of view 224, which can depend on the camera magnification and the distance to the sample 220. Each camera can focus on a sample area, with non-overlapping area 225 or overlapping areas 226 or 227 with a nearby camera.

In some embodiments, the field of views of the cameras can be adjusted to vary the overlapping area, such as between non overlapping FOV, less than 50% overlapping FOV, and more than 50% FOV. The adjustment can be performed by changing the magnification of the cameras or the focus distance to the sample areas.

The FOV of the cameras can be non overlapped, for example, to observe samples with discrete areas such as well plates. The FOV of the cameras can overlap 50% or less in one or two lateral directions, such as x and y directions, such that less than half of the points on the object plane for one camera are also captured by one or more other cameras in the array. This permits stitching of the images to form a complete representation of the sample.

The FOV of the cameras can overlap 50% or more in one or two lateral directions, such that less than half of the points on the object plane for one camera are also captured by one or more other cameras in the array. This permits depth calculation for the objects positions, for example, through photogrammetry or photostereo.

Figure 2A:
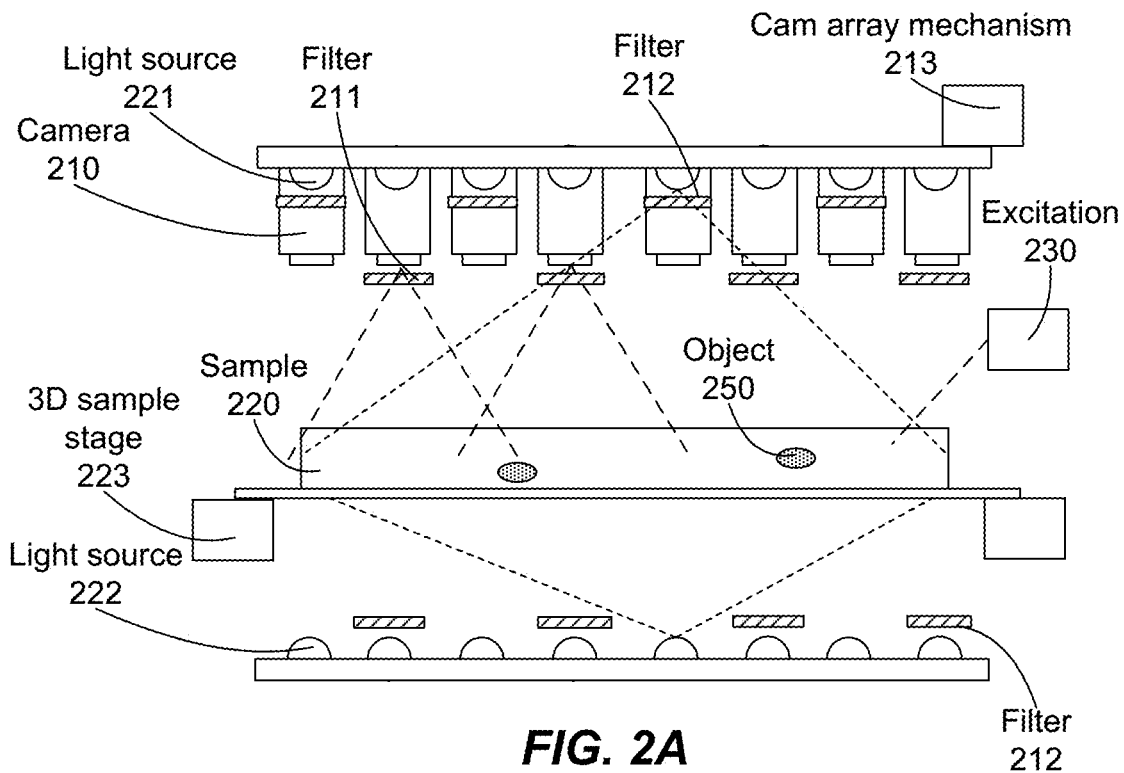
FIGS. 2A-2B illustrate configurations for an MCAM according to some embodiments.
Figure 2B:
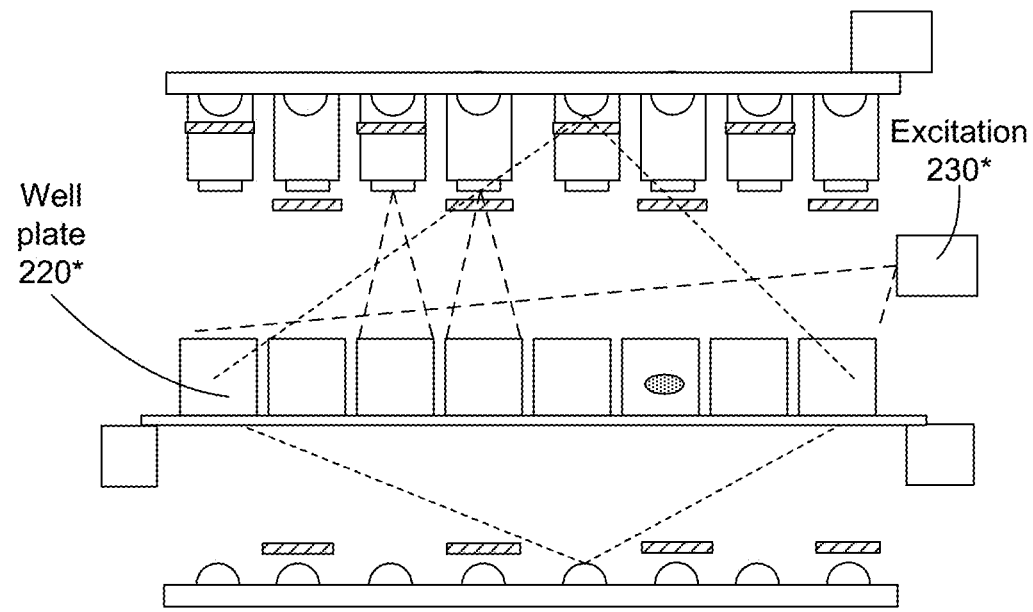

FIGS. 2A-2B illustrate configurations for an MCAM according to some embodiments. FIG. 2A shows a cross section view of an MCAM having multiple cameras 210 and one or more light sources 221 and/or 222 to illuminate a sample 220. The cameras and the light sources can be configured with or without filters, such as fluorescent filters or polarized filters. For example, as shown, alternate cameras and light sources have filters 211 and 212. The filters for the cameras can change the characteristics of the captured light, so that the images captured by the cameras can have the specific property of the filters. For example, a fluorescent filter can allow the cameras to capture fluorescent signal emitted from the sample. A polarized filter, such as a circular polarized filter, can allow the cameras to capture circular-polarized light.

The cameras are configured to be overlapped. As shown, cameras having the same type of filters are overlapped, since in general, images captured by cameras having the same filter type are stitched together to form a composite image of the sample having the filter.

The filters for the light sources can change the characteristics of the emitted light, so that the sample can have the specific light property provided by the filters. For example, a fluorescent filter can allow the light sources to emit fluorescent excitation energy to the sample, causing the organisms in the sample to respond and emit fluorescent signals. A polarized filter, such as a circular polarized filter, can allow the light sources to emit circular-polarized light. As shown, each light source is configured to illuminate the whole sample. Alternatively, more than one light sources can be used to illuminate the whole sample.

The MCAM system can include excitation sources 230 for exciting objects or organisms 250 in the sample. As shown, the excitation source is configured to provide a local excitation energy to a volume of the sample. The excitation sources can be separate excitation sources, or can be incorporated into the light sources, for example, by filters 212, such as polarized filters or fluorescent excitation filter.

The MCAM system can include moving mechanisms configured to move the cameras or the sample. A moving mechanism 213 can be coupled to the camera array to move the camera array relative to the sample, such as toward or away from the sample. Another moving mechanism 223 can be coupled to a sample support to move the sample relative to the cameras, such as toward or away from the cameras. The moving mechanism 223 can also be configured to move the sample support in a lateral direction, for example, for scanning the sample. For example, the specimen can also be placed on a 3D motorized stage, whose position can be controlled via software on the computer to bring the specimen into appropriate focus and lateral position.

FIG. 2B shows a cross section view of the MCAM configured to observe multiple wells in a multi-well plate or sample 220*. As shown, the cameras are configured to be non overlapped. Since the wells are discretely separated, the non overlapped cameras can be configured to have FOV covering the surface areas of the wells. Other FOV configurations can be used, such as a FOV of a camera smaller than the surface area of a well, and a scanning step is used for a complete coverage of the well.

As shown, the excitation sources 230* is configured to provide a global excitation energy to all wells in the multi-well plate 220*. Other configurations can be used, such as different excitation sources to provide local excitation energies to different wells.

Figure 3A:
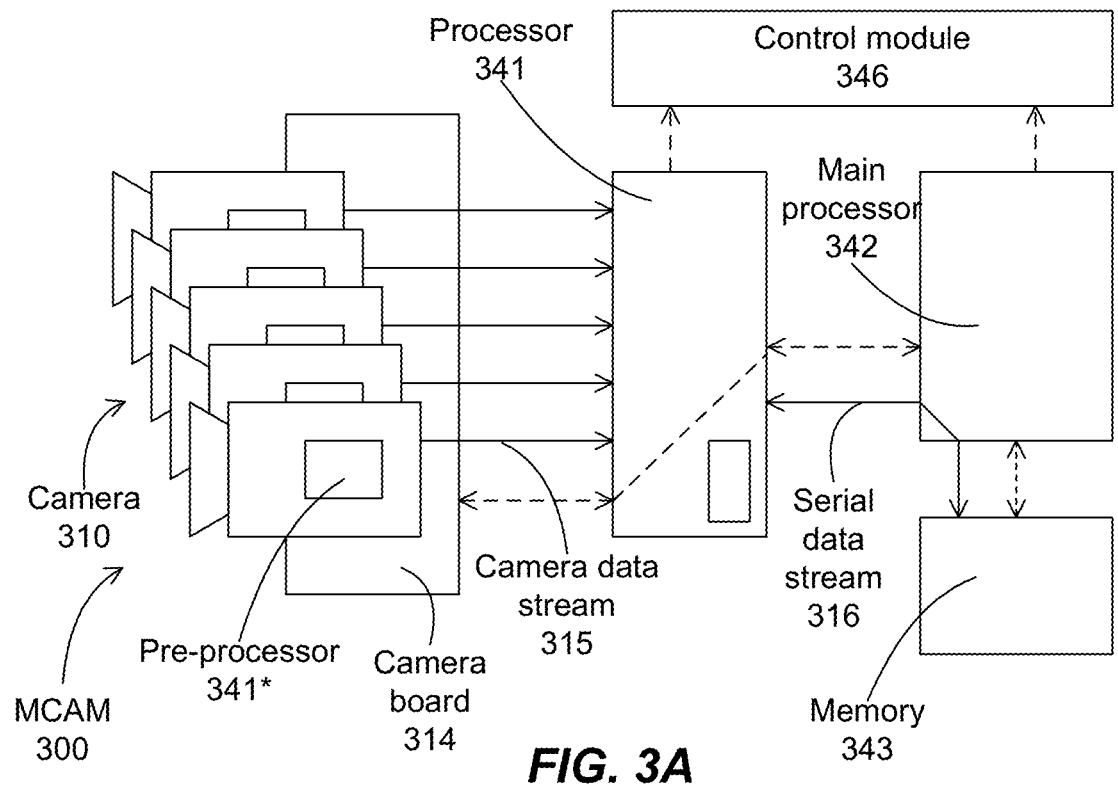
FIGS. 3A-3B illustrate schematic configurations for an MCAM according to some embodiments.
Figure 3B:
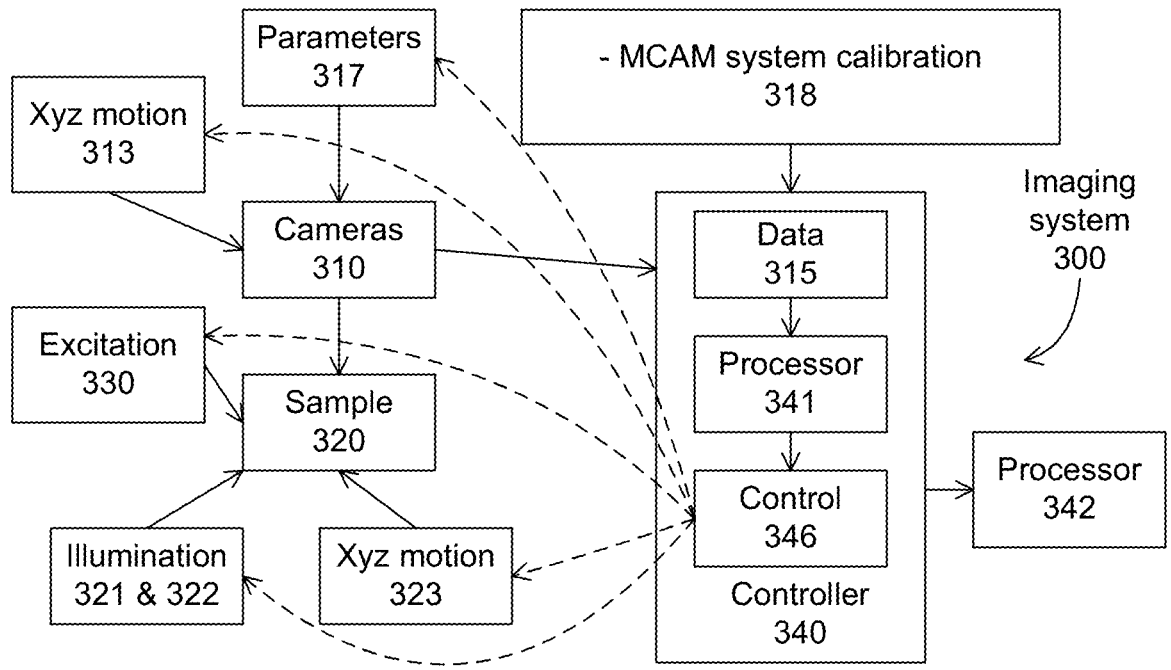

FIGS. 3A-3B illustrate schematic configurations for an MCAM according to some embodiments. An MCAM imaging system can be used to record video of a sample of interest across a wide FOV and at high resolution. MCAM video is created by recording multiple image snapshots in sequence from one or more micro-cameras within the array.

FIG. 3A shows an MCAM microscope system 300 having a camera array 310, which includes multiple camera units. The camera array can have a common clock generator to reduce timing variations between cameras. The cameras can have optional preprocess modules 341, which can be configured to preprocess the image data when reading from the image sensors of the cameras. The preprocess modules can perform simple or complex image processing, such as a quick detection of frame to frame variation or an object detection. The original or preprocessed image data can be sent, in multiple parallel data streams 315, to another optional process module 341, which is configured to organize the image data.

The process module 341 can be an FPGA based module (e.g., a module containing a processing chipset, such as an FPGA, or other chipset of an ASIC, an ASSP, or a SOC), which can be configured to receive image data from the multiple camera units, e.g., through data streams 315. The FPGA based module 341 can include a shallow buffer, for example, to store incoming data from the data streams 315. The FPGA based module can be configured to send sensor configuration data to the camera array, for example, to provide image parameters to the image sensors of the camera units. The sensor configuration can be received from a computational unit having a processor 342 and a memory 343. For example, the processor can send configuration and settings to the FPGA based module, with the configuration and settings including setting information for the FPGA based module and the configurations for the image sensors. The FPGA based module can communicate 316 with the computational unit using direct memory access (DMA) to pass data directly to the memory 343, through a high speed link such as PCIe. The FPGA based module can communicate with a control module, which can be configured to control lighting, motion, and sample handling for the microscope system. The computational unit 342 can also communicate directly to the control module. The computational unit 342 can communicate with a storage or network devices (not shown). The system can include peripheral devices, such as stages, illumination units, or other equipment involved in the apparatus necessary to ensure adequate imaging conditions.

FIG. 3B shows a block diagram of an imaging system 300, such as an MCAM system, modified for organism detection and tracking. The imaging system can include a camera array 310 and an illumination source 321 and 322, which are controlled by one or more controllers, such as a camera controller, an illumination controller, and a system controller.

An imaging system can include an array of cameras 310 focused on a large sample 320 under the illumination of an array of light sources 321 and 322. Image parameters 317 to the camera array 310 can be inputted to the camera array, for example, to control focus mechanisms for focusing or for changing magnification of the individual cameras. A motion mechanism, e.g., a movable camera stage 313, can be used to adjust the positions of the camera array, such as tipping, tilting, translating the camera array, or for changing the overlap amounts between cameras. A motion mechanism, e.g., a movable sample holder 323, can be used to adjust the positions of the sample, such as tipping, tilting, translating, or curving the sample. The movable sample holder can also be used for advancing the sample or the sample holder in discrete steps for capturing scanning image data of the sample. An excitation module 330 can be used to provide excitation to the organisms in the sample 320.

A data processing system 340 can be used to control the elements of the imaging system. The data processing system 340 can be configured to receive inputs 318, such as data related to features of interest to be detected and analyzed on the sample. The data processing system 340 can be configured to receive data from the camera array 310, and to transfer the data to a data processing processor 341 or 342 for processing. The data processing system 340 can be configured to transfer the data to a second data processing processor 342 for analysis. The data processing system 340 can include a controller 346 to control the camera array, the illumination source, and the sample holder to provide suitable conditions for image captures, such as providing variably illuminated radiation patterns to the sample, repositioning the cameras, the camera array, the sample, or the sample holder for focusing or scanning operations.

In some embodiments, the data processing system is a desktop computer. This desktop computer can be attached to a monitor for visual analysis of recorded MCAM video and/or MCAM statistics. The desktop computer can also be networked to transmit recorded video data and/or MCAM statistics and is also used to control the image and video acquisition parameters of the MCAM instrument (exposure time, frame rate, number of micro-cameras to record video from, etc.) via electronic signal.

The imaging system 300, such as a camera array microscope, based on a set of more than one compact, high-resolution imaging system, can efficiently acquire image data from across a large sample by recording optical information from different sample areas in parallel. When necessary, physically scanning the sample with respect to the array and acquiring a sequence of image snapshots can acquire additional image data.

The imaging system can be used to obtain image and video data from the sample. The data can be analyzed to detect organisms for tracking. In addition, the data can be analyzed to classify the organisms, e.g., using the features on the organisms to classify the organisms into different organism categories or organism identification.

In some embodiments, the MCAM system can include a main processor, such as a central processing unit of a desktop computer, which is coupled to the cameras to receive the image data from the image sensors of the cameras. The processor can include a control module, e.g., a controller, for controlling the elements of the MCAM system, such as controlling the camera, the light source, or the excitation source parameters. In some embodiments, the MCAM system can include a controller for controlling the MCAM elements. The controller can include a main processor, such as a central processing unit of a desktop computer or a data processing system.

A parallel to serial data conversion device can be disposed between the main processor and the cameras, for converting the multiple parallel image data streams from the cameras to a serial data image stream to the memory of the processor. The parallel to serial data conversion device can be an FPGA, or any other electronic device configured to perform the parallel to serial conversion.

In operation, after each of the cameras acquires an image, the image data from each camera are sent, in parallel to the FPGA. The FPGA then sequentially outputs the image data into a serial data stream to the processor to be processed, or to the memory of the processor. The parallel to serial conversion, e.g., in the FPGA, can be performed sequentially on each image or on portions of each image. For example, image data from camera 1 is sent first to the processor, followed by the image data from camera 2, and so on. Alternatively, a portion of the image data from camera 1 is sent, followed by a portion of the image data from camera 2, and so on.

An object detection algorithm, and subsequently, an object tracking and analyzing algorithm can be applied on the image data stored in the memory, including an edge detection algorithm, a projection algorithm, a centroid-finding algorithm, a neural network such as a convolutional neural network, or an inpainting algorithm. For example, the object detection is first performed to find the objects of interest, e.g., after removing the objects not suitable. The image data then can be cropped out to form bounding boxes, e.g., regions of interest. The bounding boxes can be centered upon each object of interest, and correlate specific objects as a function of time for tracking. Data from the bounding boxes are saved to the memory after processing.

Using the main processor, advanced processing algorithms on a GPU or CPU can be run, with the advanced algorithms not fast enough or flexible enough to be run on the FPGA. Advantages of the configuration include the ability to reduce saved data for subsequent per-organism analysis. This is especially relevant for MCAM video, which typically streams 50-100 camera frames (10 million pixels each) at 10 frames per second for 5-10 gigabytes of data per second.

Figure 4A:
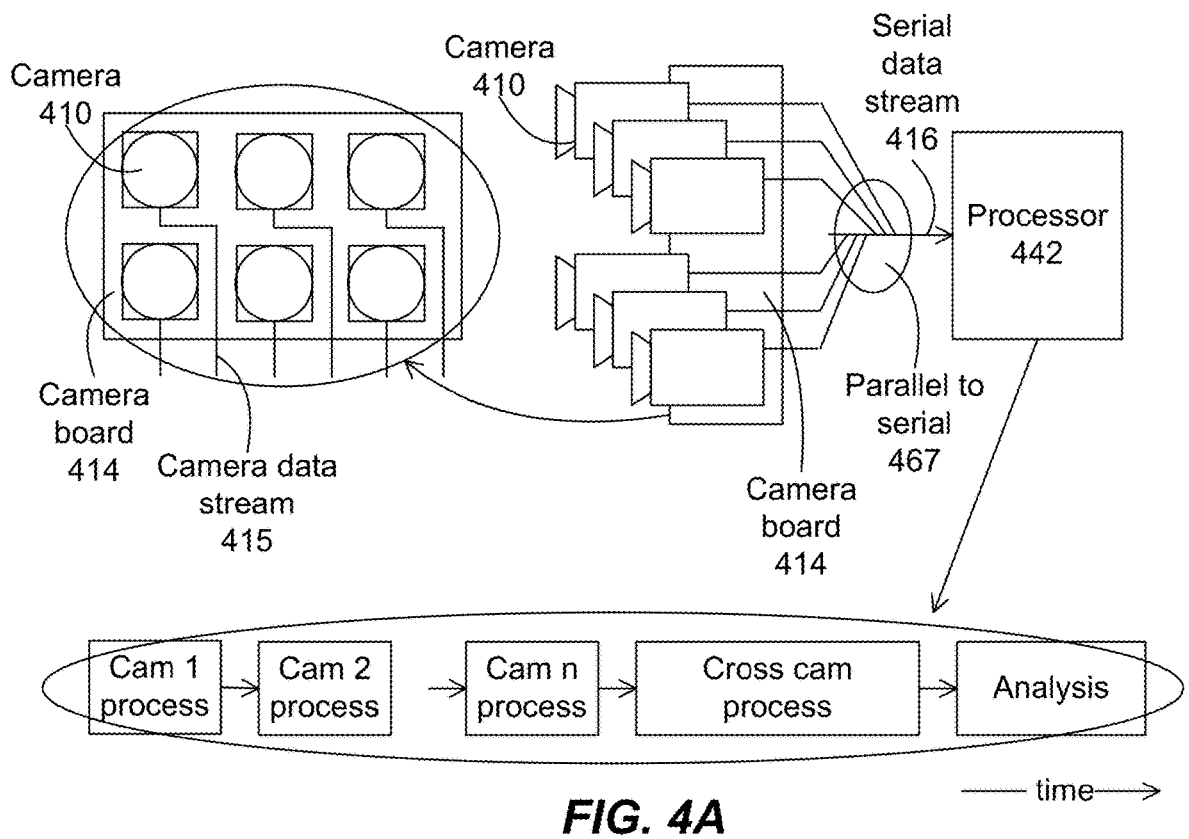
FIGS. 4A-4B illustrate configurations of an MCAM having a central processor according to some embodiments.
Figure 4B:
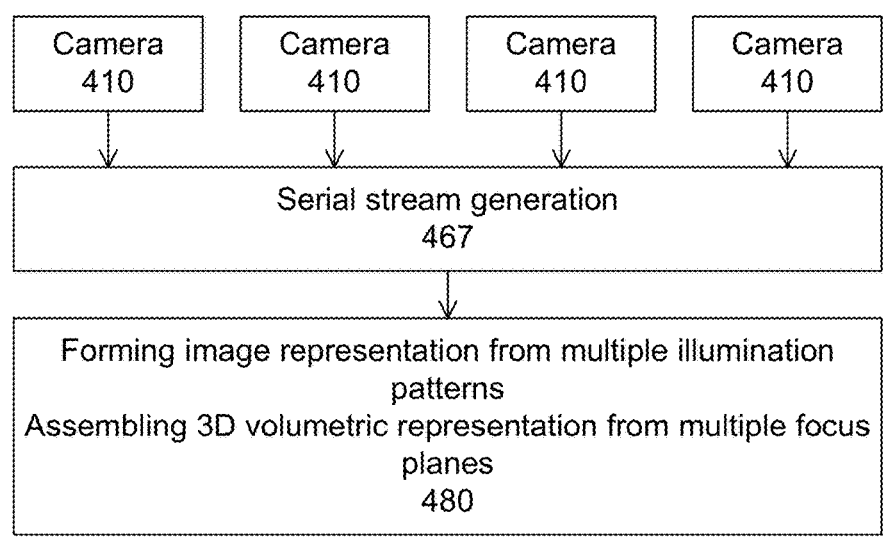

FIGS. 4A-4B illustrate configurations of an MCAM having a central processor according to some embodiments. FIG. 4A shows a schematic of an MCAM system, including multiple cameras 410 coupled to a parallel to serial device 467, such as an FPGA, which is coupled to a processor 442 (or controller, which are used interchangeably in the specification). The FPGA is configured to converting parallel image data streams 415 from the cameras 410 to a serial data image stream 416 to the processor 442.

In some embodiments, the cameras can include micro-camera packages, which can include multiple camera sensors and optical components assembled on a board 414, such as on a Printed Circuit Board (PCB).

In operation, the processor can process the image data from the cameras in sequence, e.g., one after the other. The detected objects can be subjected to an across camera analysis to merge objects and to remove duplicated objects across the cameras. The objects in bounding boxes can be analyzed, such as motion tracking and object analysis.

FIG. 4B shows a data flow of the image data. The image data from the cameras 410 are sent in parallel to the FPGA 467, which performs a parallel to serial conversion. The serial data stream is then sent to the processor, e.g., to a memory of the processor, for analysis, including 480 forming image representation from multiple illumination patterns, and assembling 3D volumetric representation from multiple focus planes.

Figure 5A:
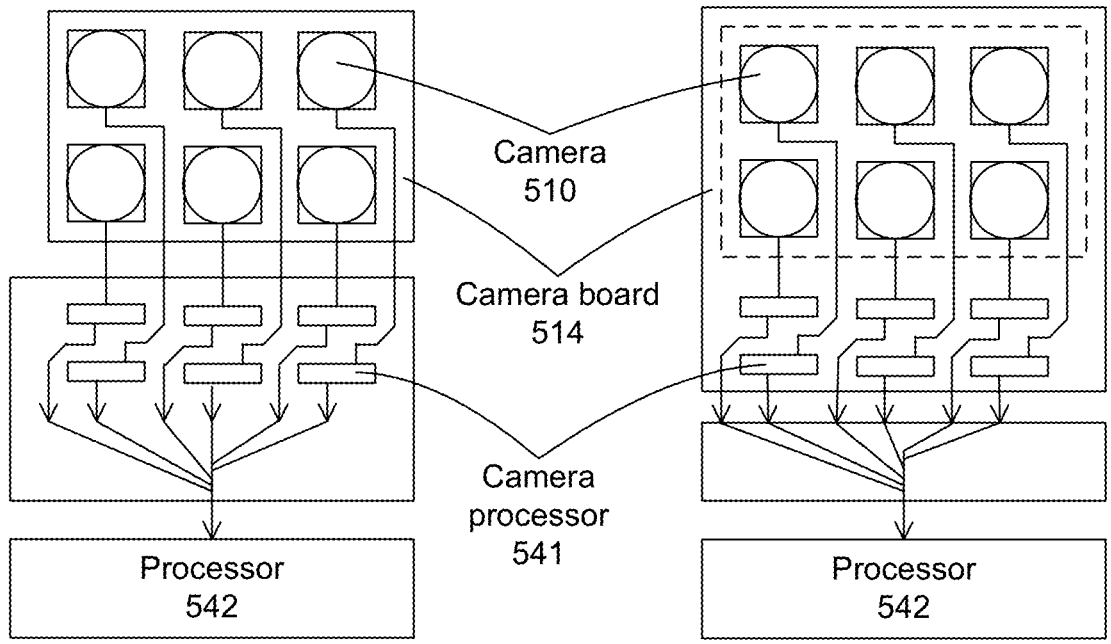
FIGS. 5A-5B illustrate configurations for an MCAM having multiple pre-processors according to some embodiments.
Figure 5B:
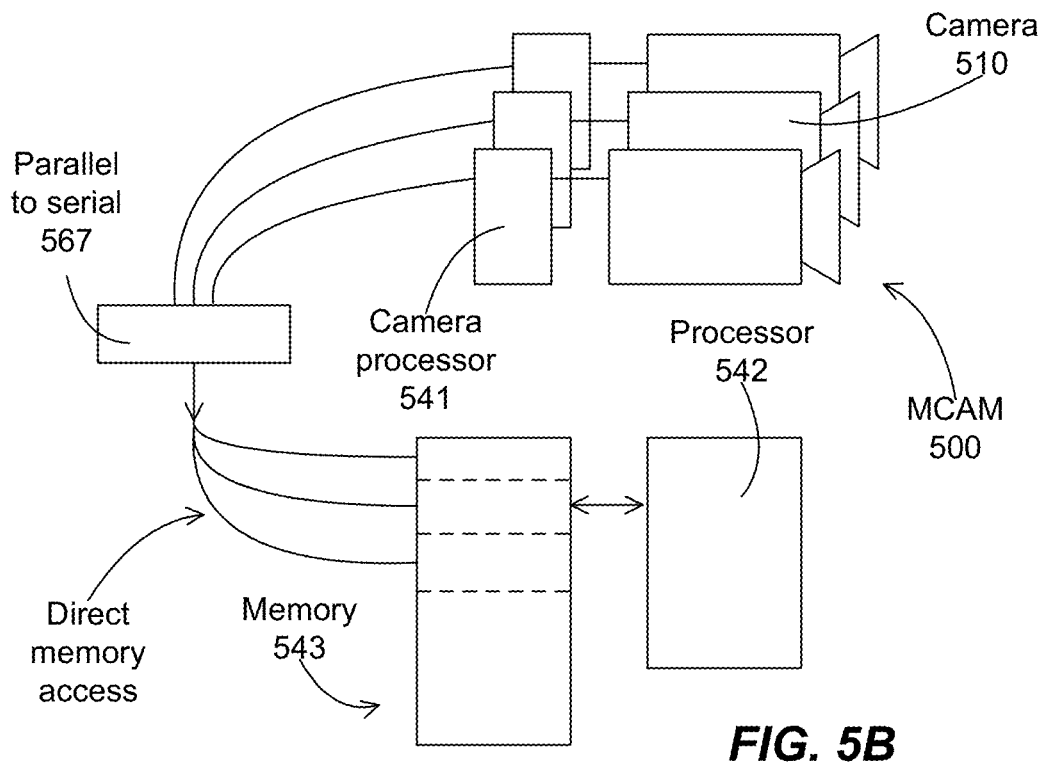

FIGS. 5A-5B illustrate configurations for an MCAM having multiple pre-processors according to some embodiments. In FIG. 5A(a), the cameras 510 can be disposed on a PCB board 514, with the outputs from the camera board coupled to an intermediate device before reaching the processor 542. The intermediate device can include multiple camera pre-processors 541 coupled to a parallel to serial conversion component. In FIG. 5A(b), the cameras 510 and the pre-processors 514 can be disposed on a PCB board 514, with each camera coupled to a pre-processor. The outputs from the camera board are coupled to a parallel to serial conversion device before reaching the processor 542.

FIG. 5B shows a data flow configuration of separate pre-processors 541 and parallel to serial conversion 567. Image data from multiple cameras 510 are sent in multiple parallel data streams, each to a pre-processor 541. The pre-processors can quickly detect if there are objects in the image frames from the captured images. The outputs from the pre-processors can be connect to a parallel to serial device 567 to organize the data in the multiple parallel data streams into a serial data stream. Image data from cameras showing no objects is omitted, e.g., not sending to the parallel to serial device. The serial data stream is then distributed to a memory 543 of a computational unit having a processor 542, so that the data for each image from each of the multiple parallel data streams are stored sequentially.

Cameras from a camera array can capture images from a sample. After the images are captured, a pre-processing module in each camera can pre-process the data of the captured image, such as detecting the presence or absence of objects. The image data from cameras showing objects are sent to the parallel to serial device 567, to form a serial data stream to the memory 543, for example, by direct memory access.

In some embodiments, the MCAM system can be configured to capture images of a sample, and then form a 3D volumetric representation of the sample by assembling multiple image representations generated from the captured images at different depth planes.

In operation, the cameras in the MCAM are controlled to focus on a depth plane of the sample, and then capture images of the sample under each of multiple illumination patterns. The captured images under the multiple illumination patterns are then processed to generate an image representation of the sample at or around the focus depth plane. For example, the image representation can be a 2D image of the sample at the focus depth plane with higher quality, e.g., contrast or resolution, than the individual images captured under one illumination pattern. Alternatively, the image representation can be a 3D image of the sample around the focus depth plane, e.g., a lateral image of the sample showing organisms together with thickness data of the organisms. In some embodiments, the number of illumination patters is small, e.g., less than 8, such as 4 or 2, to reduce capturing and processing time and also to reduce noise caused, for example, by light reflected from the walls of the wells in a multi-well plate. With few illumination patterns, the image representation can have a small thickness, such as less than 50 nm, such as about 20 nm.

The process can be repeated for other focus depth planes to generate multiple image representations at multiple focus depth planes, which then can be assembled to form a volumetric representation of the sample. The spacing between the focus depth planes can be determined by the requirements of the volumetric representation. For example, to generate a detailed volumetric representation, the spacing between the focus depth planes can be about or less than the thickness of the image representations to allow stitching of the image representations. Alternatively, the spacing can be larger with the image representations fitted under light propagation constraints. Alternatively, the spacing can depend on the density of the organisms in the sample, with focus depth planes determined to pass through the organisms for imaging.

Figure 6A:
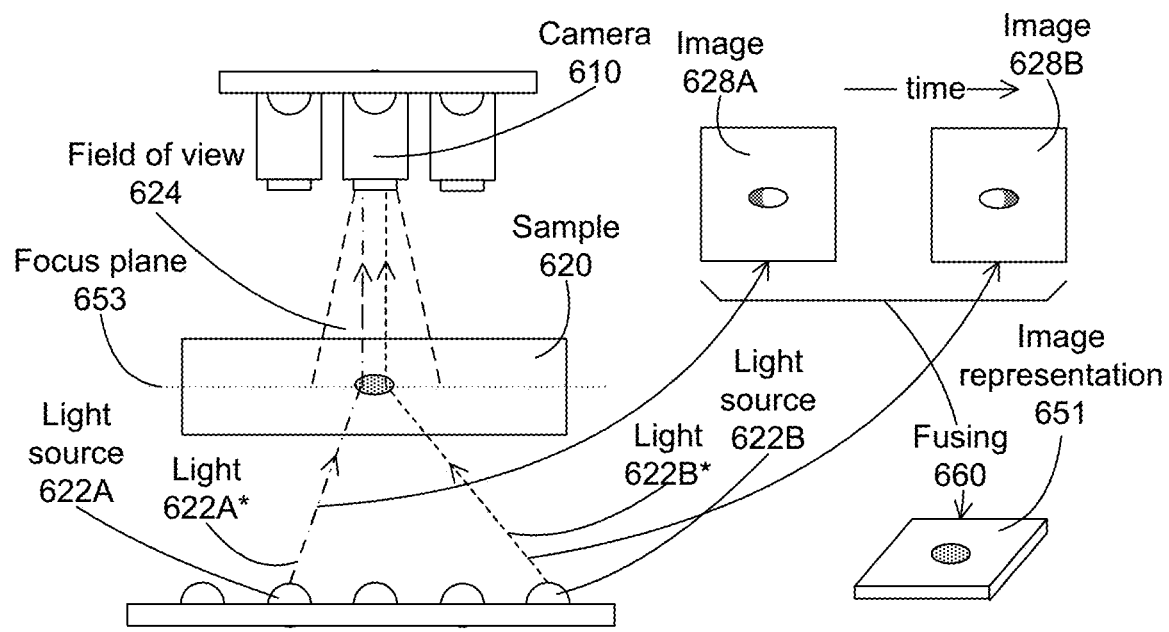
FIGS. 6A-6B illustrate a process for forming volumetric representation of a sample according to some embodiments.
Figure 6B:
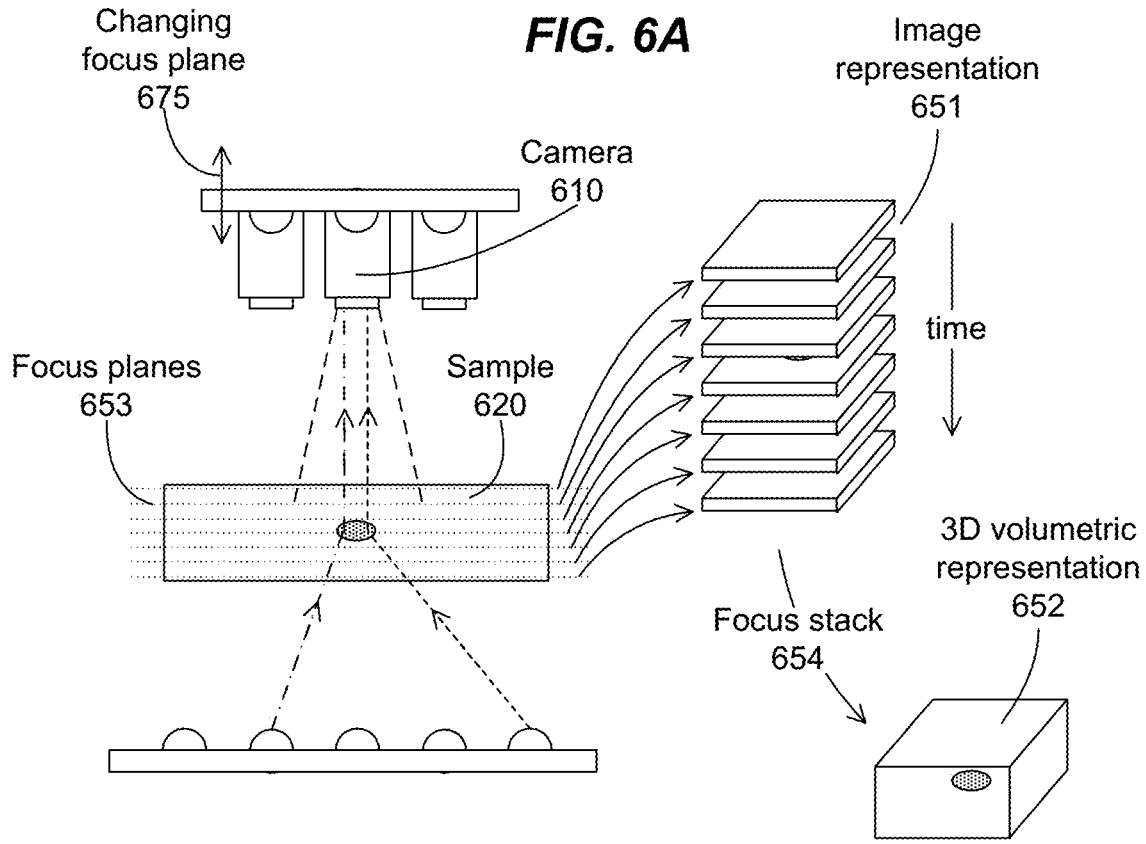

FIGS. 6A-6B illustrate a process for forming volumetric representation of a sample according to some embodiments. FIG. 6A shows a first step of forming an image representation under multiple illumination patterns. FIG. 6B shows a second step of assembling multiple image representations determined at different focus depth planes to form a volumetric representation of the sample.

In FIG. 6A, a sample 620 can be placed under a camera array 610. The cameras are controlled to be focused on a focus depth plane 653 of the sample. Illumination sources 622A and 622B can sequentially illuminate the sample with light 622A* and 622B*, respectively, to form two illumination patterns to the sample. As shown, a camera has a field of view 624, which can be configured to capture images of a portion of the sample. Under the illumination pattern with light 622A* generated by light source 622A, the camera can capture image 628A. Then, under the illumination pattern with light 622B* generated by light source 622B, the camera can capture image 628B.

The captured images 628A and 628B under the multiple illumination patterns are then processed by a processor, such as to fuse 660 the images together to form an image representation 651. The image representation can contain 3D information of the sample at the focus depth plane 653, including a lateral surface of the sample at the focus depth plane 653 and a thickness, which can be calculated based on the phase differences from the light 622A* and 622B*. Alternatively, the image representation can be a 2D image representation, with a lateral surface having higher contrast or resolution than that of a single image 628A or 628B. For example, the image representation can be determined from a differential image contrast based on the two captured images at different light sources 622A* and 622B*.

As shown, the images used for processing an image representation are captured by an individual camera. Thus, a set of multiple image representations can be generated, with each image representation corresponded to images captured by a camera under multiple illumination patterns.

Alternative, the images used for processing an image representation are composite images, with each composite image stitched together from images captured by the cameras in an camera array. Thus, an image representation can be generated, with the image representation formed by assembling composite images captured under multiple illumination patterns.

In some embodiments, the image representations can be visible, infrared, or ultraviolet image representations, e.g., formed from visible, infrared, or ultraviolet images captured by the cameras. For example, the cameras can have infrared or ultraviolet filters, which can allow the cameras to capture infrared, or ultraviolet images. In addition, the illumination sources can have infrared or ultraviolet filters, which can allow the illumination source to generate infrared, or ultraviolet light.

In some embodiments, the image representations can be unpolarized or polarized image representations, e.g., formed from unpolarized or polarized images captured by the cameras. The polarized images can be linearly polarized or circular polarized, or any other forms of polarization. For example, the cameras can have polarized filters, which can allow the cameras to capture polarized images. In addition, the illumination sources can have polarized filters, which can allow the illumination source to generate polarized light.

In some embodiments, the image representations can be fluorescence image representations, e.g., formed from fluorescence images captured by the cameras. The fluorescence images can include fluorescence signals emitted by organisms in the sample, after being fluorescent excited. For example, the cameras can have fluorescence filters, which can allow the cameras to capture fluorescence images. In addition, the illumination sources can have fluorescence excitation filters, which can allow the illumination source to generate fluorescence excitation light, e.g., radiation configured to fluorescent excite the organisms in the sample.

In FIG. 6B, the cameras are controlled to be focused on different focus depth planes 653. The changes of focus depth planes can be performed by a moving mechanism moving the camera array 675. Alternatively, the changes of focus depth planes can be performed by another moving mechanism moving the sample (not shown). Similar processes can be repeated to form multiple image representations 651, each at a different focus depth plane 653. The multiple image representations can be stacked to form a focus stack 654 of image representations.

The processed image representations 651 are then processed by the processor, such as to assemble the image representations together to form a 3D volumetric representation 652. The volumetric representation can contain 3D information of the sample at a larger z dimension. Organism measurements can be performed from the volumetric representation.

In some embodiments, the presented invention discloses methods to form 3D volumetric representation of a sample over a large imaging area and at high spatial resolution, which can allow measurements of organisms in a specimen or sample.

A sample can be placed on a sample support in an MCAM system, under, above, or to a side of the cameras. Freely moving objects can be observed in the sample for imaging and analysis. The sample can be an arena, for example, having a glass or plastic flat surface with surrounding walls. Alternatively, the sample can have the form of a 6, 12, 24, 48, 54, 96, or more well-plate. The sample can contain model organisms, such as fruit flies, ants, C. Elegans, along with other materials of interest. The sample can also contain water, in which aquatic model organisms such as the zebrafish are placed for subsequent investigation and analysis.

The sample can be subjected to one or more excitation sources, which can be placed surrounding the sample area to manipulate the organisms. For example, the excitation sources can include micro-injectors to inject various model organisms with certain biochemical material, or to insert specific chemicals, toxins or other biochemical material into the sample area. Micro-manipulators may also be used to manipulate, stimulate, perturb or otherwise change the model organisms or their surrounding area. Equipment such as voice coils or LCD screens may also be used to stimulate the visual, auditory, olfactory or other sensory systems of the model organisms within the sample area.

FIGS. 7A-7F illustrate a process for forming a volumetric representation of a sample according to some embodiments. An MCAM imaging system can be used to capture images of a sample of interest. Excitation sources can be optionally activated. The excitation sources can include fluorescence excitation sources, configured to provide fluorescence excitation energy to the organisms in the sample.

FIG. 7A shows the camera array focusing 761 on a focus depth plane 753 in a sample 720.

FIG. 7B shows images 728 captured 761 from K=3 adjacent cameras and under L=2 illumination patterns for a total of 6 images. After the image capture process, the image data can be sent to a processor, such as a processor coupled to each camera, or a main processor coupled to all the cameras. The cameras can be provided with fluorescence filters, to capture fluorescence signals emitted by the organisms in the sample after being fluorescence excited by the fluorescence excitation energy.

In FIG. 7C, after the images are captured, the camera array can move relative to the sample to scan the sample surface. For example, if the fields of view of individual cameras have gaps between adjacent cameras, the camera array can move in a direction to eliminate or reduce the gaps. At the new scanning position, the cameras can capture new images of the sample, under each of the multiple illumination patterns.

The images of the sample captured by the cameras in the camera array, including the images captured at the new scanning position, can optionally be stitched 765 together to form a composite image of the sample under an illumination pattern. Thus, after the stitching process, there are L=2 composite images, with each composite image corresponded to an illumination pattern.

Without the stitching process, there are K=3 sets of images, with each set of images having L=2 images, with each image corresponded to an illumination pattern.

In FIG. 7D, the images captured under different illumination patterns are processed to form 766 an image representation 751. For example, for composite images, e.g., images captured by the cameras in the camera array stitched together, there are L=2 composite images under L=2 illumination patterns. The L=2 composite images are processed to form an image representation.

For non-stitched images, e.g., images captured by the individual cameras, there are K=3 sets of images. In each set of images, there are L=2 images under L=2 illumination patterns. The L=2 images are processed to form an image representation. Thus, there are K=3 image representations, with each image representation representing the sample area under the field of view of a camera.

In FIG. 7E, the process of forming image representations is repeated 767 for other focus depth planes in the sample. For a total of N focus depth planes, there are N composite image representations, if the images captured by the cameras are stitched together. For non-stitched images, there are K×N image representations, e.g., K sets of N image representations, with each set of N image representations corresponded to N focus depth planes.

In FIG. 7F, the N image representations at N focus depth planes are assembled 768 to form a volumetric representation of the sample. For example, N composite image representations can be assembled to form a volumetric representation of the sample. Without stitching, e.g., the image representations are not composite image representations, there are K sets of volumetric representations, with each volumetric representation corresponded to a volume of the sample under the field of view of a camera.

Figure 8:
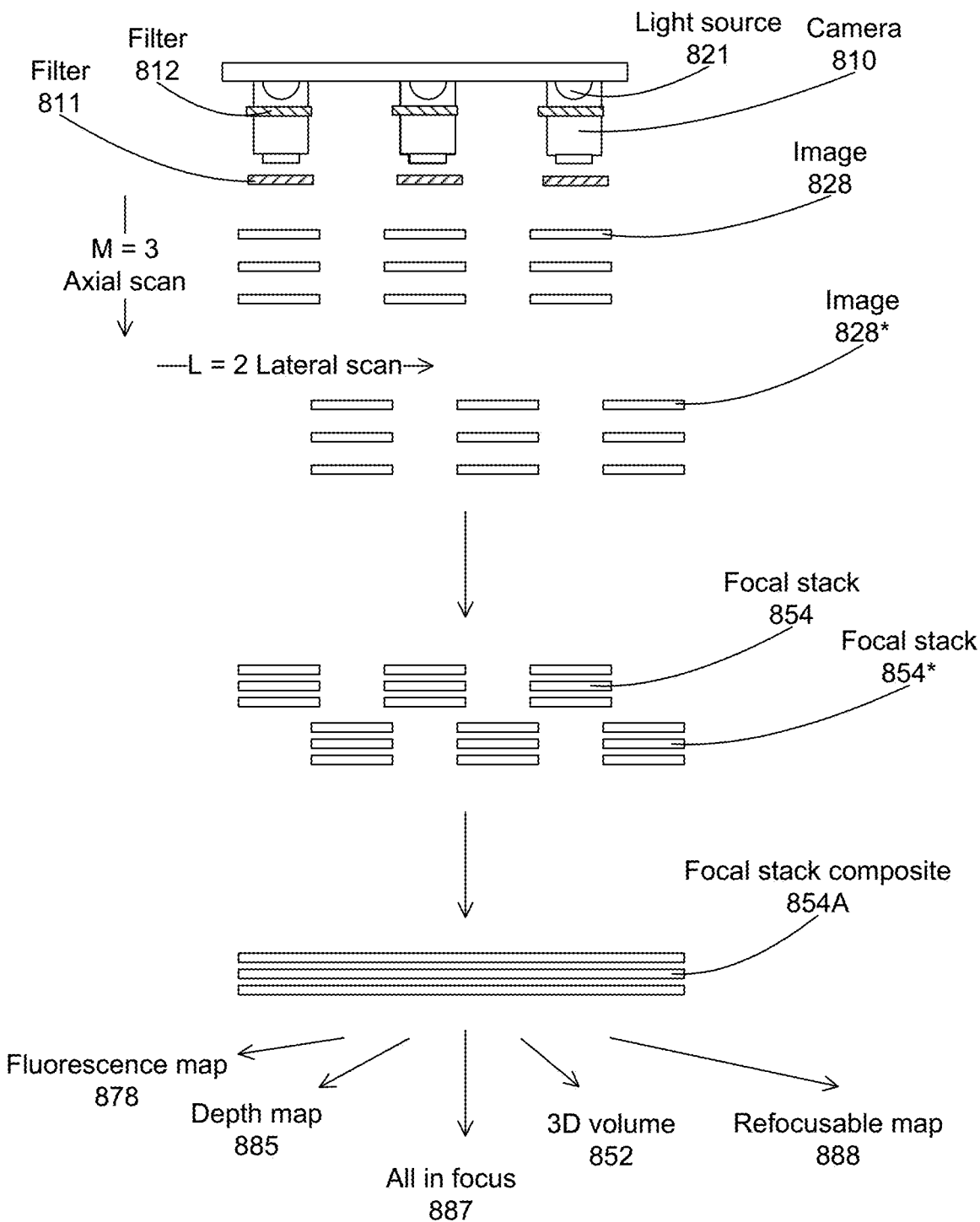
FIG. 8 illustrates a multiple focus positioning process for forming a volumetric representation of a sample according to some embodiments.

FIG. 8 illustrates a multiple focus positioning process for forming a volumetric representation of a sample according to some embodiments. In multiple focus positioning, after the specimen is placed in an MCAM system, the specimen volume can be displaced axially (along the z-dimension) with respect to the imaging system array in multiple positions, either by moving the specimen via a mechanical stage, or by moving the imaging system array, or a combination of moving the specimen via a mechanical stage and moving the imaging system array. At each of the multiple positions within the specimen volume, multiple imaging systems within the array are employed to capture an image. Denoting the number of employed imaging systems within the array as K, and the number of lateral x-y scan positions utilized as L, and the number of axial scan positions as M, then a total of K×L×M individual images are captured by the imaging system array to form an image dataset D.

As shown, the imaging system can include K=3 cameras 810, configured so that each camera first captures M=3 images 828 along the axial scan position. The captured images 828 can form a focal stack 845. L=2 lateral scanning is then implemented such that each camera observes a new FOV. Axial scanning is then once again implemented to capture M=3 images 828\* at the new FOV, such that the camera that captured a focal stack 854 now captures a new focal stack 854\*. The image data from the K=3 cameras scanned to L=2 lateral positions for imaging M=3 axial locations per position yields K×L total focal stack and K×L×M total images that form an image dataset D.

The image dataset D can include visible, infrared, or UV images. The image dataset D can include unpolarized or polarized images. The image dataset D can include fluorescence images, capturing the fluorescence signals emitted by a fluorescence excitation energy.

Alternative ordering of image capture can also be used during the multiple focus positioning process. For example, axial scanning and lateral scanning can be interwoven, such that lateral scanning is used to capture a first and second image at a first axial plane, then axial scanning is implemented to bring a second axial plane into focus, and lateral scanning is once again used to capture a first and second image at the second focal plane. This process can be repeated for any number of lateral scans L and axial scans M. In general, any order of axial and lateral scan steps can be used to bring the different specimen volume locations within the FOV of the individual imaging systems to form the dataset D.

The focal stacks 854 and 854\* can be stitched together into a focal stack composite 854A, with a composite image for each axial scan location. Standard image stitching software can be used for such composite formation, for example based upon software-based feature identification, feature matching and subsequent image alignment and blending. Alternatively non-feature-based stitching methods can be used, such as Fourier-transform-based phase alignment to identify image offset. Alternatively, photogrammetric image stitching software may be used to execute this stitching step, in which it is possible to extract additional height map information for each stitched composite within the set of focal stack composite images. The phase contrast information from variable angle illumination may lead to higher stitching accuracy.

From this focal stack composite 854A, software can also be utilized to produce an all-in-focus image 887. In some embodiments, an all-in-focus image is formed by using a sharpness metric to identify image locations that are in-focus within each stitched composite image, repeating this process for all stitched image composites within the focal stack composite image set, and then merging the identified image locations that are in-focus into the final all-in-focus image.

From this focal stack composite 854A, software can also be utilized to produce a 3D volume 852 or a depth map 885. The focal stack composite 854A can be displayed as a refocusable map 888 on a computer monitor or screen or other type of visual display for visual assessment. In a refocusable map, a first digital cursor can be used to pan around the acquired image data laterally in (x,y), and either the same first digital cursor or a second digital cursor can be used to refocus the visually presented image data at a particular set of spatial locations of interest for one or more specimen sub-volumes of interest to different axial planes (e.g., different depths) within the specimen volume.

In some embodiments, the MCAM system can be configured to obtain fluorescence images, e.g., image representation and volumetric representation, up on being excited by fluorescence excitation sources. For example, the cameras 810 can be adapted for fluorescence image captured, such as by incorporating filters 811 specifically designed to capture fluorescence signals emitted by the sample, e.g., by the organisms in the sample. Further, the light sources 821 can be configured to emit fluorescence excitation radiation, e.g., the radiation configured to excite the organisms in the sample to emit fluorescence signals. For example, the light sources 821 can be adapted to generate fluorescence excitation radiation, such as by incorporating filters 812 specifically designed to generate radiation of a specific range of frequencies that can excite the organisms in the sample to emit fluorescence signals. For example, the focal stack composite 854A, captured by the cameras having fluorescence filters 811 under the light sources having filters 812 to emit fluorescence excitation radiation, can be processed to generate fluorescence map 878.

Figure 9:
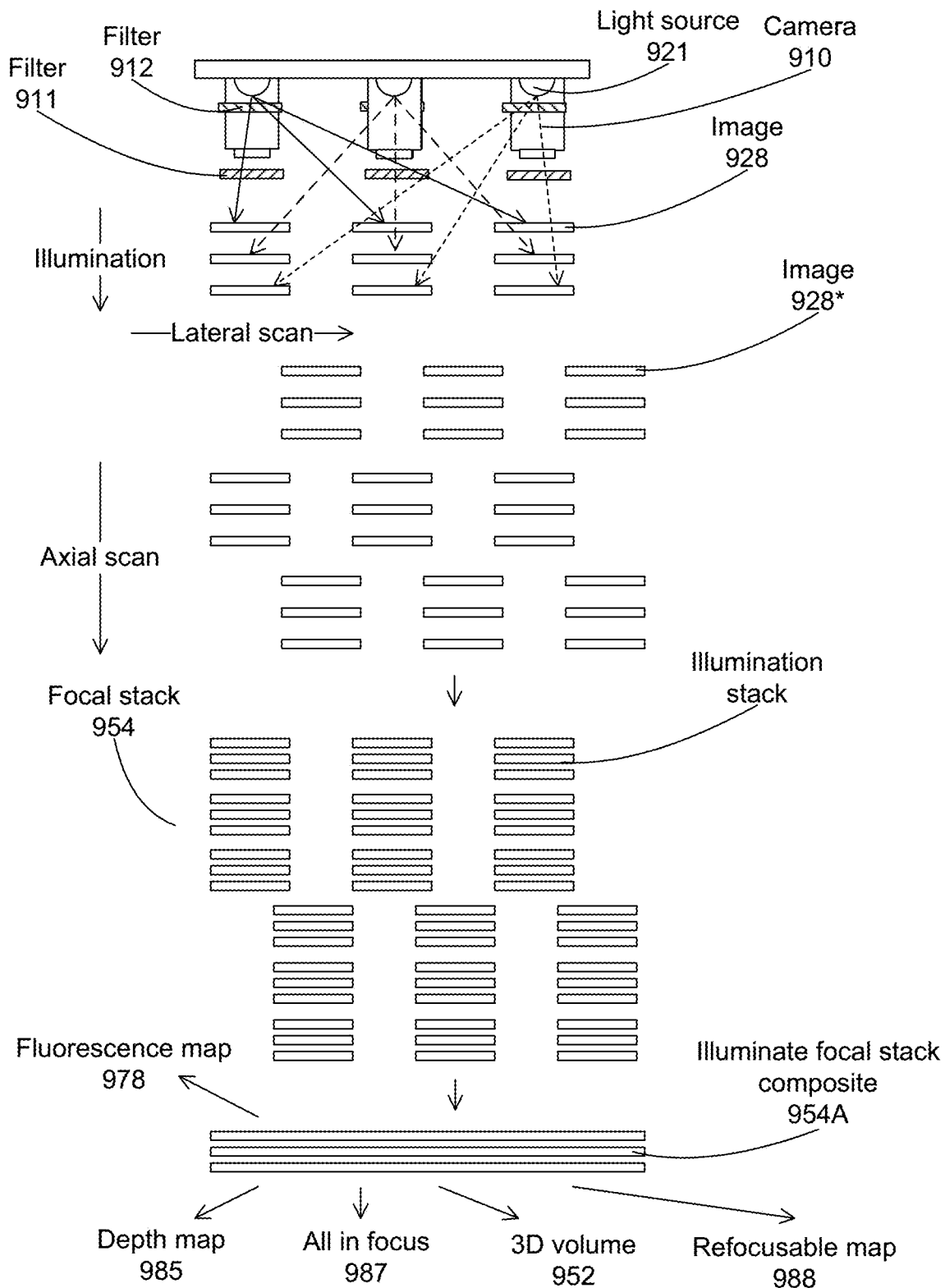
FIG. 9 illustrates a process for forming a volumetric representation of a sample according to some embodiments.

FIG. 9 illustrates a process for forming a volumetric representation of a sample according to some embodiments. The process can include a multiple focus positioning process and a multiple illumination pattern process.

In multiple angle illuminations (or multiple illumination patterns), the illumination sources can be used to illuminate the specimen volume in different illumination patterns at different axial scan locations, at different lateral scan locations and for multiple cameras. More than one illumination source can be turned on at any given time, such that the illumination can be unique for individual specimen sub-volumes of interest. Capturing more than one image under uniquely angled illumination adds a new dimension to the captured data matrix, such that a new data matrix E is formed. Denoting the number of employed imaging systems within the array as K, and the number of lateral x-y scan positions utilized as L, and the number of axial scan positions as M, and the number of unique illumination patterns presented as N, then a total of K×L×M×N individual images are captured by the imaging system array to form an image dataset E. The set of M images captured at different axial focus positions is referred to as a focal stack. The set of N images captured under different illumination patterns is referred to as an illumination stack.

As shown, the imaging system can include K=3 cameras 910, configured so that each camera first captures N=3 images 928 under N=3 illumination patterns at an axial scan position. Each illumination pattern can be provided by an illumination source. The captured images 928 can form an illumination stack. L=2 lateral scanning is then implemented such that each camera observes a new FOV. The multiple illumination patterns of N=3 are then implemented again to capture N=3 images 928* at the new FOV, such that the cameras that captured an illumination stack now captures a new illumination stack.

The axial scan M=3 is then implemented to repeat the capturing process for M=3 axial positions. The image data from the K=3 cameras captured under N illumination patterns scanned to L=2 lateral positions for imaging M=3 axial locations per position yields K×L×M illumination stacks, or K×L focal stacks, or K×N×L×M total images that form an image dataset E. Alternative ordering of image capture can also be used during the multiple focus positioning and the multiple illumination pattern process.

The image dataset E can include visible, infrared, or UV images. The image dataset D can include unpolarized or polarized images. The image dataset D can include fluorescence images, capturing the fluorescence signals emitted by a fluorescence excitation energy.

The images can be stitched together into a focal stack composite 954A, with a composite image for each axial scan location and for each illumination pattern. Standard image stitching software can be used for such composite formation.

Under the multiple illumination patterns, software can be utilized to achieve useful outputs for subsequent analysis, such as providing access to phase contrast information that can be utilized to generate a differential phase contrast depth map 985, a differential phase contrast refocusable map 988, a differential phase contrast all-in-focus image 987, and a 3D volume estimation 952 with higher 3D resolution and accuracy than that created without the use of angled illumination.

In some embodiments, the MCAM system can be configured to obtain fluorescence images, e.g., image representation and volumetric representation, up on being excited by fluorescence excitation sources. For example, the cameras 910 can be incorporated with filters 911, and the light sources 921 can be configured to emit fluorescence excitation radiation. For example, the focal stack composite 954A, captured by the cameras having fluorescence filters 911 under the light sources having filters 912 under multiple illumination patterns and at multiple axial positions can be processed to generate differential phase contrast fluorescence map 978.

Figure 10:
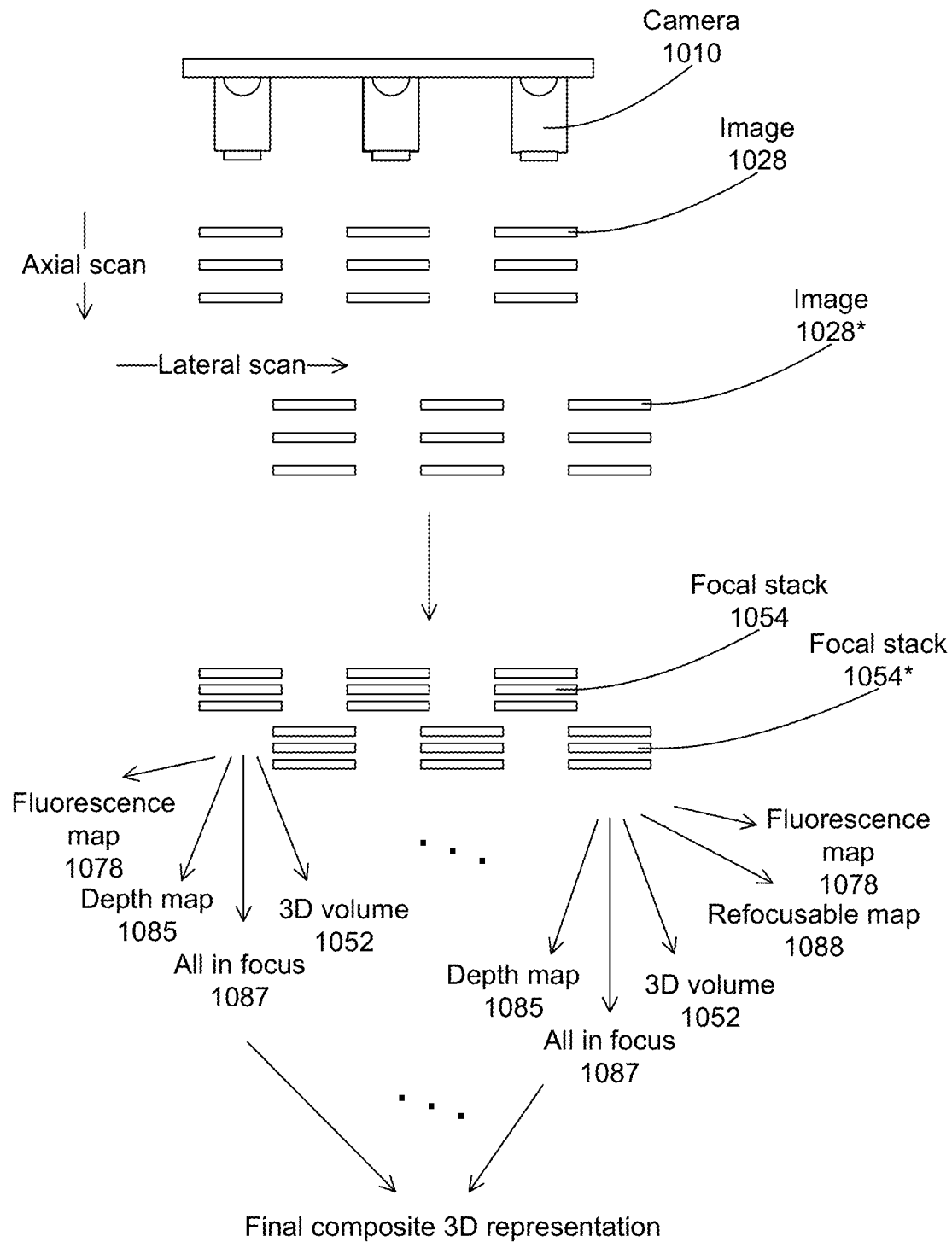
FIG. 10 illustrates another multiple focus positioning process for forming a volumetric representation of a sample according to some embodiments.

FIG. 10 illustrates another multiple focus positioning process for forming a volumetric representation of a sample according to some embodiments. In some embodiments, the operation of focal stack composite formation is omitted. Instead, one or more captured focal stacks from one or more lateral positions and one or more micro-cameras are processed to produce a depth map, all-in-focus image or a 3D volume, or more than one of the three listed options. In some embodiments, this computational processing can be executed in a parallelized manner, in which more than one focal stack is processed by the computer at any given time.

As shown, the imaging system can include K=3 cameras 1010, configured so that each camera first captures M=3 images 1028 along the axial scan position. The captured images 1028 can form a focal stack 1045. L=2 lateral scanning is then implemented such that each camera observes a new FOV. Axial scanning is then once again implemented to capture M=3 images 1028* at the new FOV, such that the camera that captured a focal stack 1054 now captures a new focal stack 1054*.

The image dataset can include visible, infrared, or UV images. The image dataset D can include unpolarized or polarized images. The image dataset D can include fluorescence images, capturing the fluorescence signals emitted by a fluorescence excitation energy.

From the focal stacks, software can also be utilized to produce an all-in-focus image 1087, a 3D volume 1052, a depth map 1085, a refocusable map 1088, or a fluorescence map 1078.

The all-in-focus image 1087, the 3D volume 1052, the depth map 1085, the refocusable map 1088, or the fluorescence map 1078 for different focal stacks can be assembled to form a final composite 3D representation.

Figure 11:
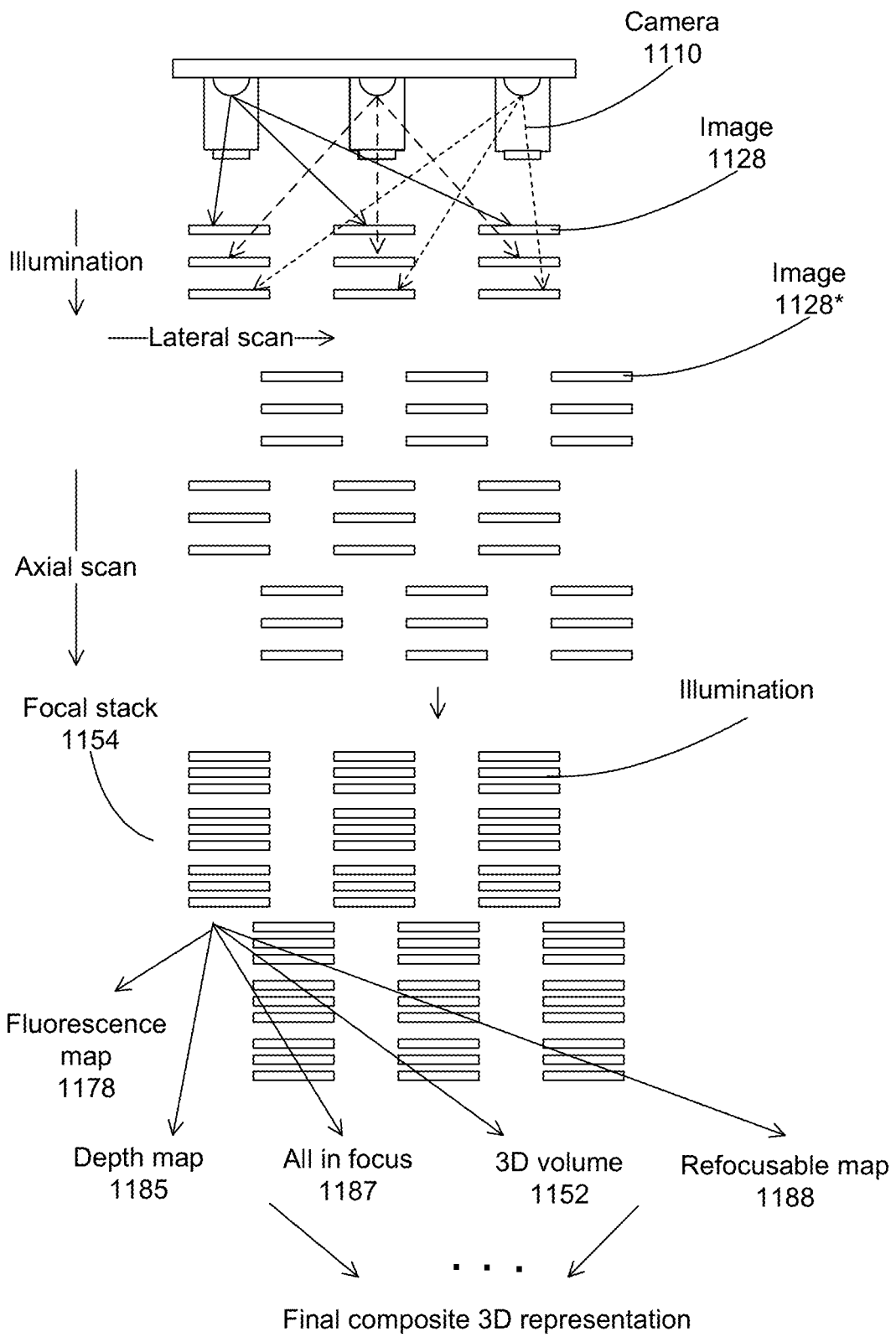
FIG. 11 illustrates another process for forming a volumetric representation of a sample according to some embodiments.

FIG. 11 illustrates another process for forming a volumetric representation of a sample according to some embodiments. In some embodiments, the operation of focal stack composite formation is omitted. Instead, one or more captured focal stacks from one or more lateral positions and one or more micro-cameras are processed to produce a depth map, all-in-focus image or a 3D volume, or more than one of the three listed options. In some embodiments, this computational processing can be executed in a parallelized manner, in which more than one focal stack is processed by the computer at any given time.

As shown, the imaging system can include K=3 cameras 1110, configured so that each camera first captures N=3 images 1128 under N=3 illumination patterns at an axial scan position. Each illumination pattern can be provided by an illumination source. The captured images 1128 can form an illumination stack. L=2 lateral scanning is then implemented such that each camera observes a new FOV. The multiple illumination patterns of N=3 are then implemented again to capture N=3 images 1128* at the new FOV, such that the cameras that captured an illumination stack now captures a new illumination stack.

The axial scan M=3 is then implemented to repeat the capturing process for M=3 axial positions. The image data from the K=3 cameras captured under N illumination patterns scanned to L=2 lateral positions for imaging M=3 axial locations per position yields K×L×M illumination stacks, or K×L focal stacks, or K×N×L×M total images that form an image dataset E. Alternative ordering of image capture can also be used during the multiple focus positioning and the multiple illumination pattern process.

The image dataset can include visible, infrared, or UV images. The image dataset D can include unpolarized or polarized images. The image dataset D can include fluorescence images, capturing the fluorescence signals emitted by a fluorescence excitation energy.

From the focal stacks, software can also be utilized to produce a phase contrast all-in-focus image 1187, a phase contrast 3D volume 1152, a phase contrast depth map 1185, a phase contrast refocusable map 1188, or a phase contrast fluorescence map 1178.

The all-in-focus image 1187, the 3D volume 1152, the depth map 1185, the refocusable map 1188, or the fluorescence map 1178 for different focal stacks can be assembled to form a final composite 3D representation.

FIG. 12 illustrates a flow chart for forming a volumetric representation of a sample according to some embodiments. 3D information about a specimen volume can be acquired by a two step process of multiple focus positioning and multiple angled illuminations. Either multiple focus positioning, multiple angled illuminations, or a combination of multiple focus positioning and multiple angled illuminations can be used to capture 3D information about the specimen volume.

Operation 1264 forms multiple image representations at multiple focus planes of a sample, with each image representation formed by processing multiple images of an area captured under multiple illumination patterns, with each image of the multiple images captured under an illumination pattern of the multiple illumination patterns. The images of an area include images captured by an individual camera, or composite images stitched from images captured by multiple cameras.

In some embodiments, the image representation can include a result image having higher contrast or resolution than an image of the images. The image representation can include lateral and depth information around a focus plane of the multiple focus planes. The image representation can include lateral locations of objects in the sample and thickness of the objects at the lateral locations. The image representation can include complex values with magnitude components showing lateral locations of objects in the sample and phase components showing thickness of the objects.

In some embodiments, the multiple illumination patterns can be configured to enable calculations of phase contrast information in the images. The multiple illumination patterns can include equal and opposite illumination patterns to the area to provide phase contrast information in the images. The multiple illumination patterns can be configured to enable calculations of phase information of light reaching the images for determining the depth information.

Operation 1266 forms a 3D volumetric representation of the sample based on the multiple image representations at the multiple focus planes of the sample.

In some embodiments, the formation can include identifying in-focus image locations using a sharpness metric, and associating the locations with calibrated depths. The formation can include identifying in-focus image locations using a sharpness metric, and merging the identified image locations into an all-in-focus image. The formation can include stitching the multiple image representations based on common features identified in overlap volumes between adjacent image representations. The formation can include minimizing a function of the volumetric representation and the multiple image representations subjected to light propagation constraints. The formation can include minimizing errors in connecting the multiple image representations subjected to light propagation constraints.

In some embodiments, the present invention discloses methods and systems to form a volumetric representation of a 3D sample by processing multiple image representations at different focus depth planes of the sample. The image representation can include two 2D arrays of pixels, or a 3D array of pixels of size N×M×2, where N×M is the original 2D matrix size. In the first array, the intensity/brightness values are stored for a discrete set of spatial locations along the specimen. In the second array, the corresponding thickness measurements for the same discrete set of spatial locations along the specimen.

Alternatively, the image representation can be an array of pixels that contains complex values of the form of an optical field, $$U(x,y)=A(x,y)e^{i2\pi t(x,y)}$$

with $A(x,y)$ is the amplitude of light, e.g., the square root of the intensity/brightness, and $t(x,y)$ is a measure of the optical thickness of the specimen at the location $(x,y)$. The value of the optical thickness $t(x,y)$ is a way to get a measurement of specimen thickness at 20 nm-type resolution.

FIGS. 13A-13C illustrate configurations for image representations according to some embodiments. FIG. 13A shows an image representation 1351. FIG. 13B shows configurations of an image representation in two dimensions. The image representation can be a 2D representation 1351B, a 2D image 1328, an intensity 2D matrix 1356*, an intensity function f(x,y), or an intensity table (x,y).

FIG. 13C shows configurations of an image representation in three dimensions. The image representation can be a 3D layer representation 1351A, a 3D image 1355 which includes intensity 1356 and thickness 1357, two 2D matrices with one 2D matrix being an intensity matrix 1356* and one 2D matrix being a thickness matrix 1357*, a complex function f(x,y) 1358A or a complex table t(x,y) 1358B with magnitude related to the intensity and the phase related to the thickness, a real function f(x,y,z) 1355 or a real table t(x,y,z) with x, y related to lateral positions of objects and z related to the thickness of the objects at the lateral x, y positions.

The volumetric representation can include 3D information in a volume, such as the volume of a sample or the volume of a well in a multi-well plate.

FIGS. 14A-14D illustrate configurations for volumetric representations according to some embodiments. FIG. 14A shows a volumetric representation 1452, which describes a 3 dimensional volume of a sample including any organisms, e.g., the locations, lateral sizes and thickness of the organisms. FIG. 14B shows a volumetric representation having multiple 3D image layers 1455, with each 3D layer showing lateral locations, sizes and thicknesses of the organisms. FIG. 14C shows a volumetric representation having multiple 2D image layers 1428, e.g., images 1428, with each image showing lateral locations and sizes of the organisms in higher contrast or resolution due to the multiple illumination patterns, as compared to images captured under a single illumination pattern. FIG. 14D shows a volumetric representation including a function or table 1452A in 3 dimensions showing the presence of the organisms, such as a vertex table (x,y,z) showing vertices of the organisms in 3 dimensions, an edge table (x,y,z) showing edges of the organisms in 3 dimensions, a surface table (x,y,z) showing surfaces of the organisms in 3 dimensions.

FIG. 15 illustrates a flow chart for forming a volumetric representation of a sample according to some embodiments. Operation 1560 optionally provides excitation to the sample after the sample is placed under a microscope. The excitation can include a local excitation to one or more areas of the sample or a global excitation to a whole of the sample. The excitation can include at least one of a continuous excitation, a periodic excitation, or a pulse excitation, and with the excitation including a noise, a sound, an audio effect, a light, a visual effect, an olfactory effect, a vibration, a mechanical manipulation, a chemical or biochemical injection, a fluorescence excitation.

The excitation can include a single excitation source to provide excitation energy to a local volume of the sample or to the whole of the sample. The excitation can include multiple different excitation sources provided to different volumes of the sample, such as to different wells in a multiple well plate. The excitation can include multiple similar excitation sources with different parameters to be provided to different volumes of the sample, such as to different wells in a multiple well plate.

Operation 1561A sets focus of multiple cameras of the microscope to a first focus plane in the sample, such as to a top or a bottom surface of the sample. The focus setting can be performed by adjusting the focus for the individual cameras of the microscope, or by adjusting the focus for the cameras together, such as by moving a camera stage on which the multiple cameras are mounted on. Alternatively, the focus setting can be performed by moving a stage on which the sample is placed, until the desired surface, e.g., the top or bottom surface in this case, is in focused.

Operation 1563A captures images from the multiple cameras under a first illumination pattern. The first illumination pattern is provided to the sample by one or more light sources, controlled by a controller or a processor of the microscope. The microscope can be a MCAM, which has multiple cameras with each camera capturing an area of sample. The cameras can have filters or not having filters, to captured filtered or unfiltered images. Similarly, the light sources can have filters or not having filters, to generate filtered or unfiltered light, such as polarized, fluorescent, or unpolarized light.

In some embodiments, the cameras have can have overlapped or non-overlapped fields of view. The overlapped fields of view can be large, such as larger than 50% of the field of view of each camera, which can enable phase determination for the captured images, and which can provide calculations of the thickness information. The overlapped fields of view can be small, such as less than 50% of the field of view of each camera, which can enable stitching of the images based on common feature determination.

The cameras can have non overlapped fields of view, for example, when capturing images of discrete wells in a multi-well plate or sample. In some embodiments, the non overlapped field of view can be large, e.g., there are large gaps between fields of view of adjacent cameras. The microscope then can be configured for scanning, e.g., moving the sample or the cameras to capture images at the gap areas.

Operation 1564 optionally pre-processes captured image data for each camera in parallel before sending the image data or the pre-processed image data to a memory of a processor. The optional pre-process includes organizing the image data from the cameras and forming a serial data stream to be sent to a processor. In some embodiments, the pre-processor can include an FPGA, configured to form a parallel to serial data stream conversion in data packet serial stream to the main processor. The data packets can be sent by direct memory access to a memory of the main processor.

Operation 1563B repeats capturing images from the cameras under one or more second illumination patterns different from each other and from the first illumination pattern. The multiple illumination patterns, e.g., the first and second illumination patterns are configured to provide phase information to the captured images, such as to determine thicknesses of the organisms, e.g., objects in the images, or to determine phase contrast information which can provide better contrast for the captured images.

The illumination patterns are configured to for ease of phase calculation, which can improve contrast, resolution or to provide depth information to the captured images. For example, asymmetric illumination patterns, such as similar patterns from left and right of the captured images, can be used to determine differential phase contrast information, which can be used to improve contrast of the captured images.

Operation 1565A optionally moves the cameras or the sample to new locations to scan the sample, and repeats capturing images from the cameras under the first and the one or more illumination patterns at new locations. If the fields of view of the cameras do not completely cover the sample, scanning the sample by moving the sample or by moving the cameras can be used to capture images of the sample areas that have not been captured in the first scanning position. For example, for large sample in which the cameras only cover the area of the sample under the cameras, the sample can move to a new area outside of the coverage of the cameras to capture images. Alternatively, the cameras can capture images of interlaced areas of the sample, and the sample can move a short distance so that the cameras can capture images of the alternate interlaced areas.

Operation 1565B optionally stitches images of different areas of the sample under each illumination pattern. The stitching process can use feature or non-feature identification in the overlapped areas of the captured images. After the stitching process, multiple composite images, e.g., images stitched together from individual captured images, are formed, with each composite image formed for an illumination pattern.

In some embodiments, the stitching process is optional. For example, for a multi-well plate, the wells are separated by gaps between adjacent wells. Thus, if each camera is configured to capture image of a well, then stitching can be unnecessary. In this case, a set of multiple images are formed, with each image of the multiple images captured under an illumination pattern.

In some embodiments, the stitching process can be performed for multi-well plates, if the fields of view of the cameras are not large enough to cover the whole surface of a well. After a scanning process in which the sample or the cameras are moved to one or more new scanning positions to completely cover the well surface, the scanned images captured by the same cameras can be stitched together to form a composite image of the well. After the stitching process, multiple well composite images with each well composite image corresponded to a well, are formed, with each well composite image formed for an illumination pattern.

Operation 1566 processes the images or the stitched images of the first and the one or more second illumination patterns to form a first image representation of the area or of the sample. The first image representation can include lateral and depth information around the first focus plane. Alternatively, the first image representation can include higher quality, such as higher contrast, as compared to the individually captured images.

Operation 1561B sets focus of cameras to one or more second focus depth planes in the sample, with the one or more second focus depth planes different from each other and from the first focus plane. For example, the first focus depth plane can be the top surface of the sample. The second focus depth planes can be one or more focus depth planes below the first focus depth plane, in a sequential order.

Operation 1567 repeats capturing images, optionally moving, optionally stitching, and fusing to form one or more second image representations with each second image representation comprising lateral and depth information around one of the one or more focus planes.

Operation 1568 forming a 3D volumetric representation of the sample based on the first and the one or more second image representations of the sample.

FIG. 16 illustrates a flow chart for forming a microscope system according to some embodiments. The microscope system can be configured to capture images by multiple cameras under multiple illumination patterns at multiple focus depth planes. The microscope system can be configured to process the captured images at each focus depth plane to form an image representation. The microscope system can be configured to process the image representations to form a volumetric representation of the sample. Measurements of the organisms in the sample can be performed from the volumetric representation.

Operation 1600 forms an MCAM system for forming a 3D volumetric representation of a sample. The MCAM system includes multiple cameras each configured to capture images of a different area of the sample, one or more light sources configured to provide irradiation to the sample, one or more moving mechanisms configured to focus the multiple cameras to one of multiple focus planes in the sample, and a controller configured to control the multiple cameras, the one or more light sources, the one or more moving mechanisms, and also configured to process image data from the captured images.

The MCAM system optionally includes one or more excitation sources configured to provide a local or a global excitation to the sample, with the excitation sources including a local excitation to an area of the sample or a global excitation to a whole of the sample, with the excitation including a continuous excitation, a periodic excitation, or a pulse excitation, and with the excitation including a noise, a sound, an audio effect, a light, a visual effect, an olfactory effect, a vibration, a mechanical manipulation, a chemical or biochemical injection, a fluorescence excitation.

The controller is configured to generate one or more illumination patterns by controlling the one or more light sources. The controller is configured to control the multiple cameras to capture images of the sample under each of the one or more illumination patterns.

The controller is configured to control the one or more moving mechanisms to focus the multiple cameras to each of the multiple focus planes.

The controller is configured to generate multiple image representations, with each image representation generated from a set of images captured by the multiple cameras under each illumination pattern at each focus plane. The set of images can include multiple individual images, with each individual image captured by a same individual camera. The set of image can include multiple composite images, with each composite image including images captured by the multiple cameras and stitched together. The set of image can include multiple scanned images, with each scanned image including images captured by a same individual camera during scanning and stitched together.

The controller is configured to generate a 3D volumetric representation of the sample by processing the multiple image representations.

In some embodiments, the microscope system can be configured to be flexible in term of image captured and image data processing.

Figure 17A:
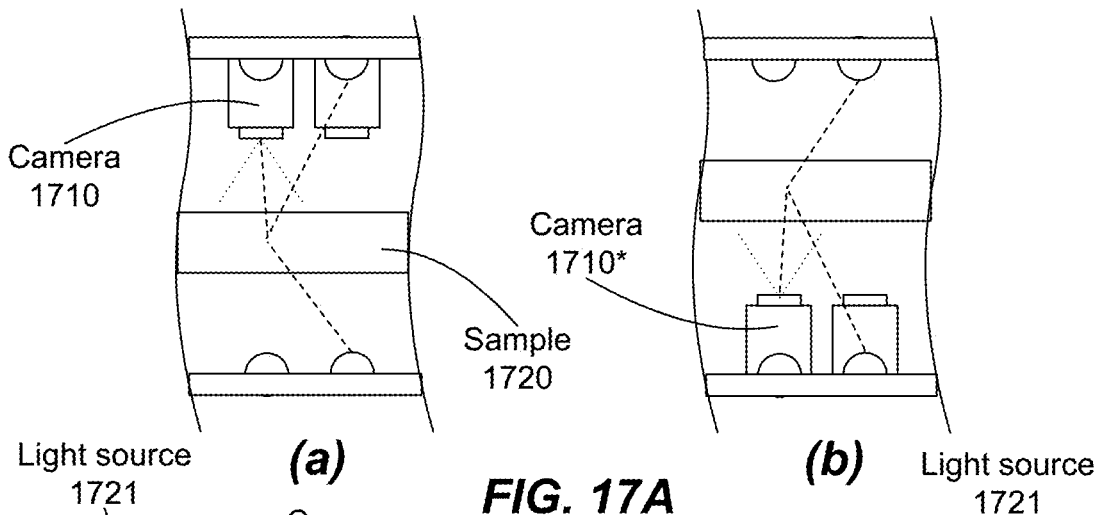
FIGS. 17A-17D illustrate MCAM configurations according to some embodiments.

FIGS. 17A-17D illustrate MCAM configurations according to some embodiments. FIG. 17A shows configurations of the cameras or the camera array in an MCAM system. The cameras 1710 can be disposed above the sample 1720 in FIG. 17A(a), or below the sample in FIG. 17A(b). Other configurations can be used, such as the cameras can be disposed on a left side, on a right side, or forming an angle not parallel and not perpendicular with the sample.

Figure 17B:
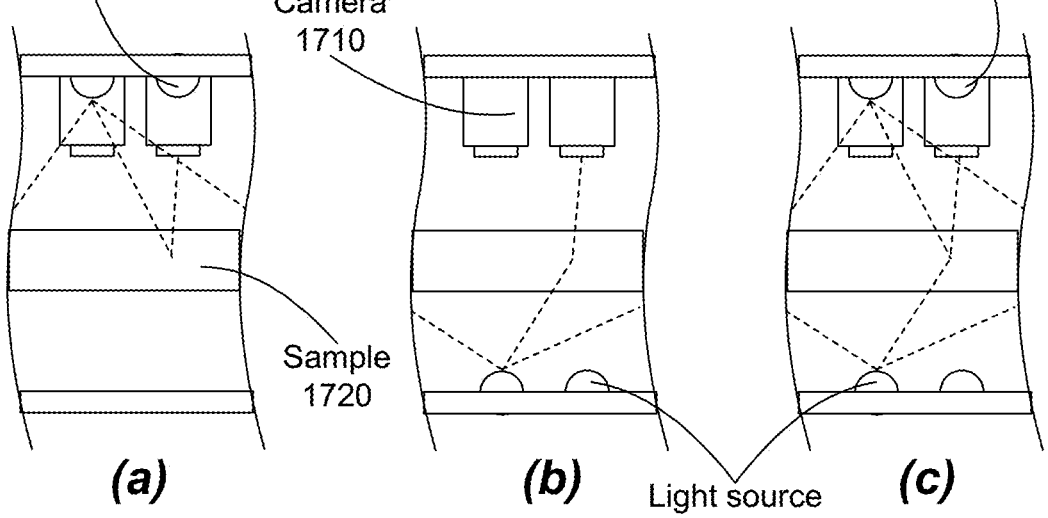

FIG. 17B shows configurations of the illumination sources or light sources in an MCAM system. The light sources 1721 can be disposed above the sample 1720 and at a same side as the cameras in FIG. 17B(a), to provide reflective illumination to the sample. The light sources 1722 can be disposed below the sample and at an opposite side of the cameras in FIG. 17B(b), to provide transmissive illumination to the sample. The light sources 1721 and 1722 can be disposed above and below the sample, respectively, in FIG. 17B(c). Other configurations can be used, such as the cameras can be disposed on a left side, on a right side, or forming an angle above or below and not parallel and not perpendicular with the sample.

Figure 17C:
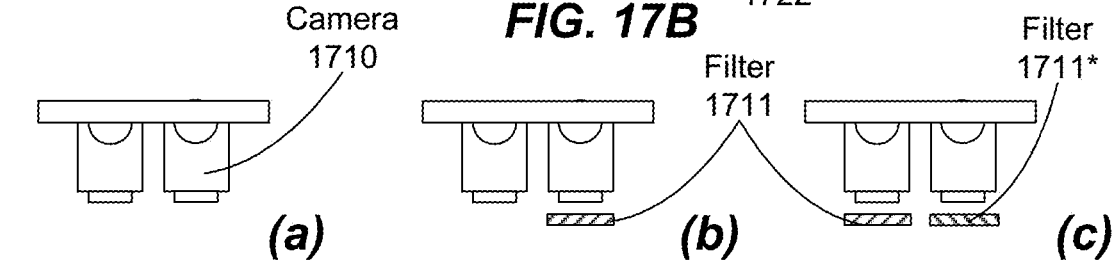

FIG. 17C shows filter configurations of the cameras or the camera array in an MCAM system. The cameras can have filters, such as fluorescent filter or polarized filters, to capture light with specific characteristics. The cameras can have no filters in FIG. 17C(a). Some cameras can have no filters and some cameras have filters in FIG. 17C(b). The cameras can have multiple types of filters in FIG. 17C(c). Other configurations can be used, such as filtered cameras can be alternatingly arranged or randomly arranged with non-filtered or with different type filtered cameras.

Figure 17D:
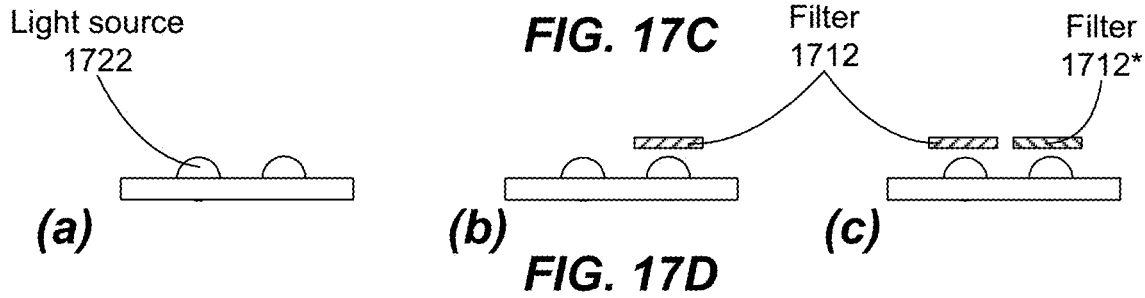

FIG. 17D shows filter configurations of the light sources in an MCAM system. The light sources can have filters, such as fluorescent filter or polarized filters, to provide excitation or light with specific characteristics. The light sources can have no filters in FIG. 17D(a). Some light sources can have no filters and some light sources have filters in FIG. 17D(b), such as no-filtered light sources for illumination and fluorescent filtered light sources for fluorescent excitation. The light sources can have multiple types of filters in FIG. 17D(c), such as no-filtered light sources for illumination, polarized light sources for polarized light, and fluorescent filtered light sources for fluorescent excitation. Other configurations can be used, such as filtered light sources can be alternatingly arranged or randomly arranged with non-filtered or with different type filtered light sources.

FIGS. 18A-18D illustrate configurations for excitation sources for an MCAM according to some embodiments. FIG. 18A shows a configuration of an excitation source 1830A providing a global excitation to the sample 1820. In the global excitation process, the excitation energy provided by the excitation source 1830A can reach the whole sample, such as all surface of the sample and/or some depth of the sample. Another excitation source 1830B can provide local excitation to the sample. In the local excitation process, the excitation energy provided by the excitation source 1830B can reach an area of the sample, such as a surface area and/or some depth of the area.

Other configurations can be used, such as one global excitation source, one local excitation source, or multiple local excitation sources. The excitation sources can be disposed above, below, or at a side of the sample.

In some embodiments, the light sources 1821 and/or 1822 can be configured to function as the excitation source, such as the excitation sources can be placed at or near the light sources. For example, a fluorescent filter can be disposed on a light source, which can provide fluorescent excitation energy to the sample.

FIG. 18B shows examples of sound and light excitation sources. An excitation source 1830A1, such as a speaker, can emit an acoustic signal, such as a sound, to all areas of the sample, e.g., functioning as a global sound excitation source. An excitation source 1830A2 can emit a focus sound to an area of the sample, e.g., functioning as a local sound excitation source.

An excitation source 1830B1, such as an LED, can emit a radiation signal, such as a visible, infrared, or ultraviolet light, to all areas of the sample, e.g., functioning as a global radiation excitation source. An excitation source 1830B2 can emit a focus radiation to an area of the sample, e.g., functioning as a local radiation excitation source.

FIG. 18C shows configurations for the excitation energy provided by the excitation sources. The excitation energy 1831A can be continuous, e.g., the excitation source, once started, continuously provides excitation energy to the sample. The excitation energy can be constant or can be varied, such as a periodic excitation energy, a gradually increased excitation energy, or a gradually decreased excitation energy.

The excitation energy 1831B can be periodically pulsed, e.g., the excitation source provides periodic pulses of excitation energy to the sample. The excitation energy can be constant or can be varied, such as changing pitches, duty cycles, on times, off times, a gradually increased excitation energy, or a gradually decreased excitation energy.

The excitation energy 1831C can be one or more pulses, e.g., the excitation source provides one or more pulses of excitation energy to the sample. The excitation energy can be constant or can be varied, such as changing pitches, duty cycles, on times, off times, a gradually increased excitation energy, or a gradually decreased excitation energy.

FIG. 18D shows configurations for the excitation energy provided by the excitation sources. One or more excitation sources can be used, such as at a same time, or at different times to provide excitation energy to the sample. The excitation sources 1830 can include a noise, e.g., a sound or an acoustic signal, a light flash, e.g., a burst or one or more pulses of radiation signal, a vibration of the sample holder, or a picture on an LCD screen projected to the sample surface. Other excitation sources can be used, such as an LCD, a vibration source, an injector source, an olfactory source, a manipulator source, an ultrasonic source, a fluorescent source, or a polarization source.

In addition, the excitation sources can include injectors or micro-injectors to inject various model organisms with certain biochemical material, or to insert specific chemicals, toxins or other biochemical material into the specimen arena. The excitation sources can include manipulators or micro-manipulators, which can be used to manipulate, stimulate, perturb or otherwise change the model organisms or their surrounding area. The excitation sources can include equipment such as voice coils or LCD screens, which can be used to stimulate the visual, auditory, olfactory or other sensory systems of the model organisms within the specimen plane.

The excitation sources can be placed surrounding the specimen or sample holder to manipulate the specimen, the sample, the medium, or the organisms in the sample. The excitation sources can be electronically controlled by a controller or a processor, such as a desktop computer.

FIGS. 19A-19D illustrate camera configurations according to some embodiments. In some embodiments, an MCAM system can be tuned to have 50% or larger overlap field of view for 3D object tracking. The overlap amount can be changed by changing the magnification of the cameras or the fields of view of the cameras. For example, decreasing the magnification of each camera can increase the inter-camera overlap for the MCAM system.

In some embodiments, an MCAM system can be tuned to have the cameras focusing on different depth planes of the sample. For example, the focus for the individual cameras can be adjusted, such as by moving the lenses (e.g., the objective lenses or the optical lenses), moving the image sensors, or moving the whole camera subsystem.

Figure 19A:
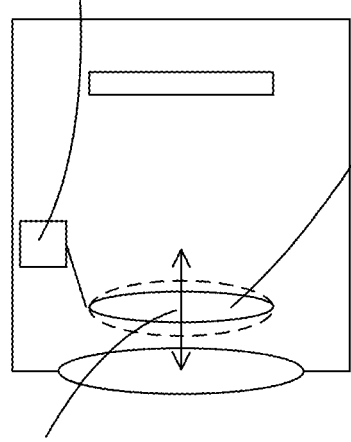
FIGS. 19A-19D illustrate camera configurations according to some embodiments.
Figure 19B:
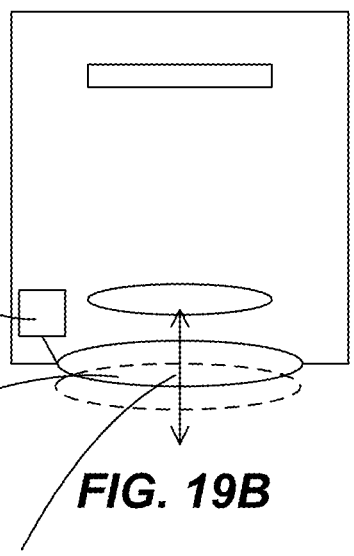
Figure 19C:
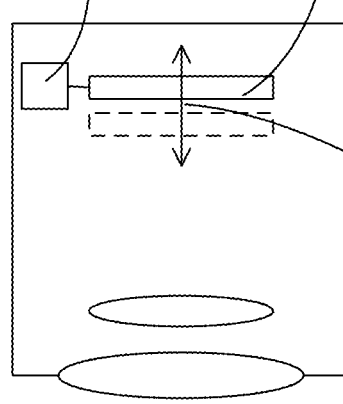
Figure 19D:
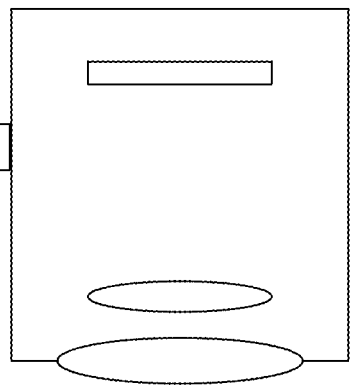

In FIG. 19A, a camera can have a lens mechanism 1910C for adjusting positions of an optical lens 1973, which can change the focus or magnification of the camera. In FIG. 19B, a camera can have an optic mechanism 1910B for adjusting positions of an objective lens 1974, which can change the focus or magnification of the camera. In FIG. 19C, a camera can have a sensor mechanism 1910A for adjusting positions of an image sensor 1972, which can change the focus or magnification of the camera. In FIG. 19D, a camera can be coupled to a camera mechanism 1910D for adjusting positions of the camera 1910, which can change the focus or magnification of the camera. The change in focus of the camera can change the surface of at which the cameras are focusing on, e.g., the cameras can be adjusted to be focused at a top surface of the sample, at a bottom of the sample, or at any depth plane between the top and bottom surfaces. The multiple focus depth planes can allow the formation of volumetric representation of the sample, such as through a focal stacking process. The change in magnification of the camera can change the overlapped field of view of the cameras of the MCAM, allowing tuning the MCAM to have 50% or more FOV overlap for 3D object tracking.

Figure 20A:
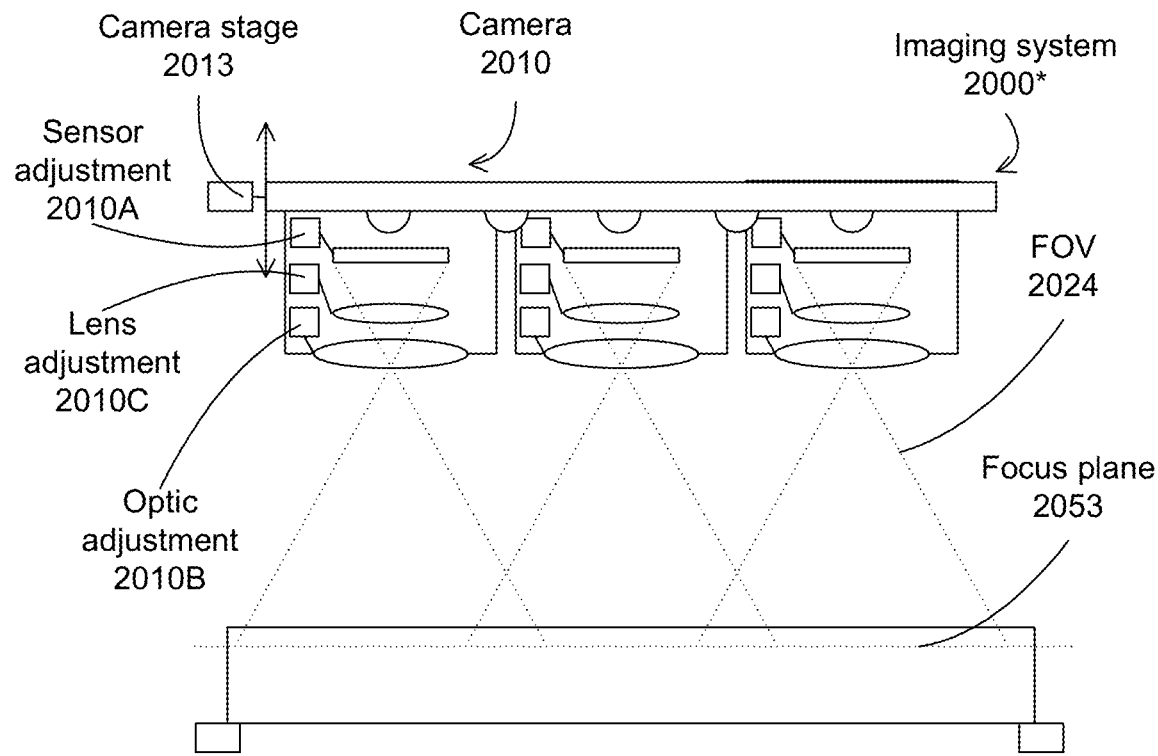
FIGS. 20A-20B illustrate a process for adjusting focus depth planes according to some embodiments.
Figure 20B:
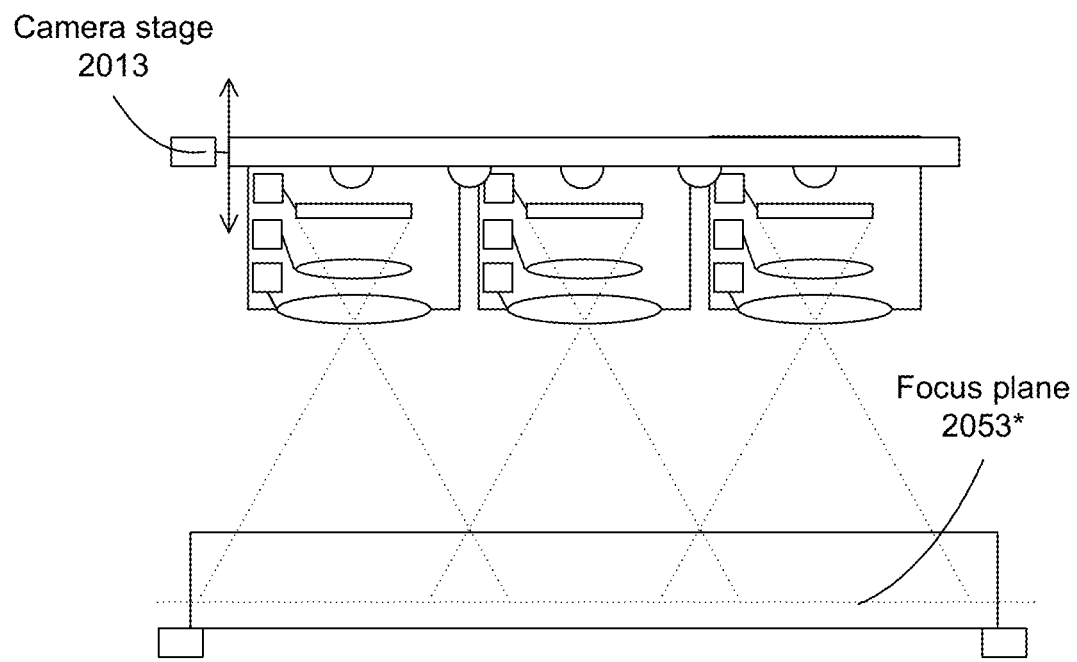

FIGS. 20A-20B illustrate a process for adjusting focus depth planes according to some embodiments. In FIG. 20A, an MCAM 2000 can have multiple cameras 2010 coupled to a camera stage 2013. The camera stage 2013 can be adjusted, e.g., to move the cameras relative to the sample. Each camera can have a sensor adjustment mechanism 2010A for adjusting positions of the image sensor, a lens adjustment mechanism 2010C for adjusting positions of the optical lens, and an optic adjustment mechanism 2010B for adjusting positions of the objective lens. Each camera can have a field of view 2024 and a focus on a depth plane 2053. As shown, the cameras have less than 50% overlapped field of view 2026. Other configurations can be used, such as more than 50% overlap or non overlapped. In the non overlapped configuration, the MCAM can be configured for scanning operations, e.g., moving the camera stage 2013 or the sample stage to different scanning positions.

In FIG. 20B, the camera stage 2013 is adjusted to have a new focus depth plane 2053*.

Alternatively, the new focus depth plane 2053* can be achieved by adjusting the sensor adjustment mechanism, the lens adjustment mechanism, or the optic adjustment mechanism. In some embodiments, the camera stage can be adjusted to have a focus depth plane anywhere from the top surface of the sample to the bottom surface of the sample.

Other configurations can be used, such as adjusting the positions of the sample through a sample stage instead of adjusting the camera stage.

In some embodiments, multiple illumination sources are used to illuminate the sample or specimen volume in controllable configurations, e.g., to generate optimized multiple illumination patterns to the sample. The multiple illumination patterns are sequentially provided to the sample at each of the multiple axial scan locations (e.g., at each focus depth planes), at each of the lateral scan locations (e.g., at each scanned position). The multiple cameras in the camera array are then configured to capture images of the sample to form a data matrix E, as discussed above, at each of the multiple illumination patterns, at each of the multiple axial scan locations, and at each of the lateral scan locations (which is optional, depending on the configurations of the fields of view of the cameras on the sample).

The multiple illumination patterns, e.g., the angled illumination on the sample, can provide access to phase information of light propagated through the sample. For example, the intensity of the captured images under the multiple illumination patterns can be related to the changes in the optical phase of light emerging from the specimen surface, which can allow the calculation of thicknesses of organisms in the sample, e.g., to determine a volumetric representation of the sample.

Figure 21A:
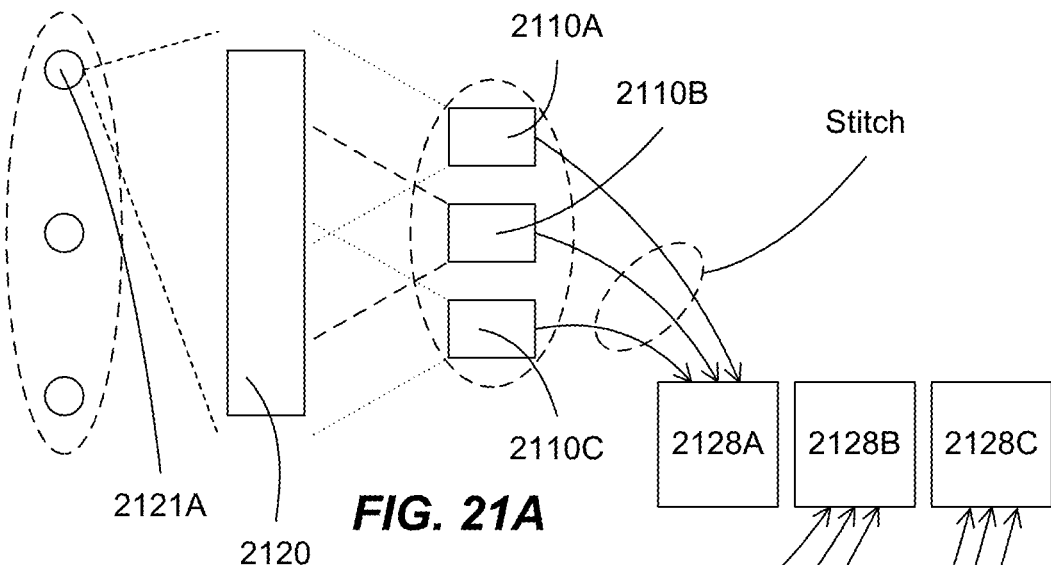
FIGS. 21A-21C illustrate a process for forming an image representation according to some embodiments.
Figure 21B:
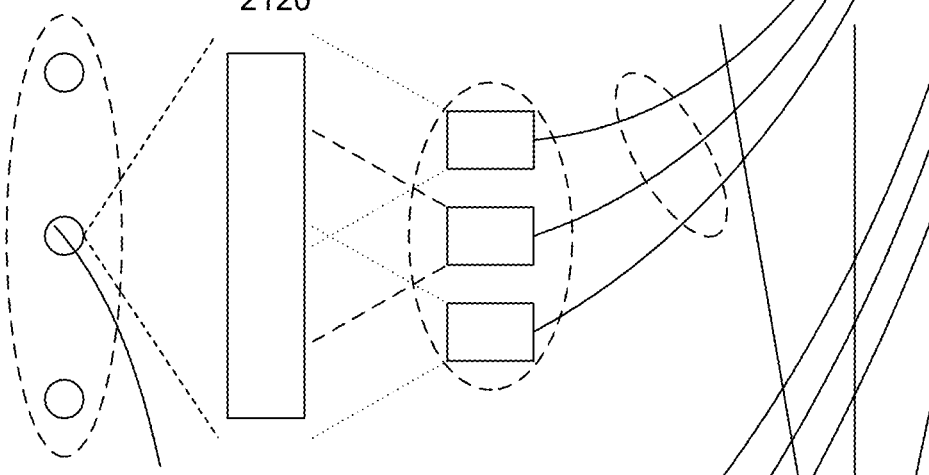
Figure 21C:
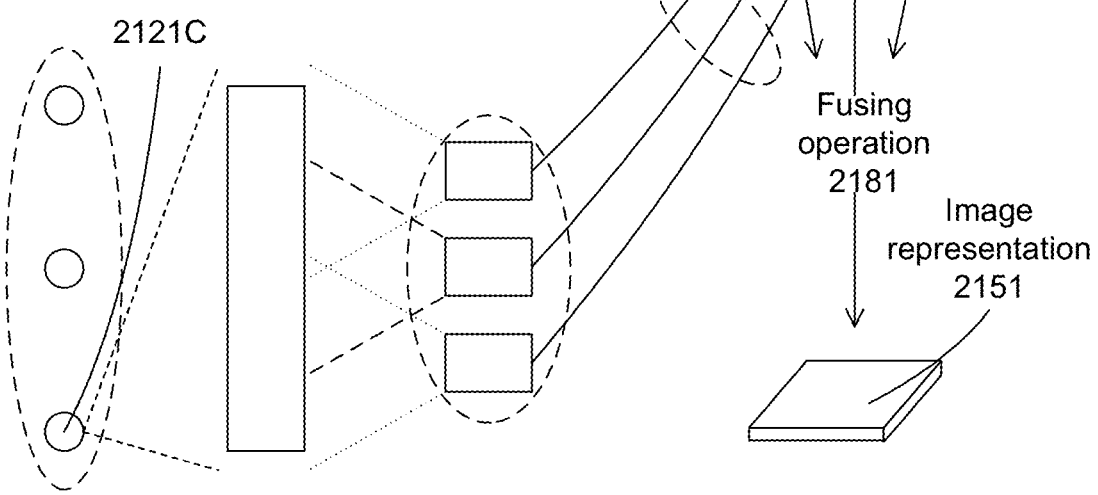

FIGS. 21A-21C illustrate a process for forming an image representation according to some embodiments. A microscope system can have illumination sources and cameras for capturing images of portions of a sample 2120. As shown, the illumination source can include k=3 radiation sources 2121A, 2121B, and 2121C, and the camera units can include n=3 cameras 2110A, 2110B, and 2110C.

In some embodiments, each radiation source is configured to cover the whole sample. Each camera is configured to capture images of a portion of the sample. The images captured by all cameras can be assembled, such as stitching together, to form composite images 2128A, 2128B, 2128C, e.g., complete images of the sample, under the illumination of the radiation sources.

In FIG. 21A, radiation source 2121A can shine light on a sample 2120. The radiation source 2121A is configured to cover the whole sample, or at least the portion of interest in the sample. Under the illumination pattern generated by the radiation source 2121A, each camera 2110A, 2110B, and 2110C of the camera array can capture an image. The captured images can be stitched together to form a composite image 2128A, e.g., a complete image of the sample, under the illumination of the radiation source 2121A.

In FIG. 21B, the process can be repeated for another illumination pattern, such as an illumination pattern generated by radiation source 2121B. The cameras 2110A, 2110B, and 2110C can capture images under the new illumination pattern, which can be stitched together to form a composite image 2128B under the illumination of the radiation source 2121B.

In FIG. 21C, the process can be repeated for another illumination pattern, such as an illumination pattern generated by radiation source unit 2121C. The cameras 2110A, 2110B, and 2110C can capture images under the new illumination pattern, which can be stitched together to form a composite image 2128C under the illumination of the radiation source 2121C.

Thus, the cameras can capture images under different illumination patterns to form a set of composite images of the sample, after being stitched together.

In some embodiments, the captured images can include visible, infrared, or UV images, unpolarized or polarized images, or fluorescence images, capturing the fluorescence signals emitted by a fluorescence excitation energy.

The radiation from different illumination patterns can provide radiation with different path lengths to the sample, so that each point on the sample can receive radiation with multiple path lengths, which can be seen from the different composite images 2128A, 2128B, and 2128C. The different path lengths can allow the reconstruction of phase information using intensity information from the multiple path length radiation.

By capturing images from multiple different illumination patterns, phase information can be reconstructed from the multiple captures intensity-only images. Larger overlapped field of view or higher number of illumination patterns can provide a more reliable image reconstruction process with higher depth dimension.

In some embodiments, the present invention discloses an optimization process for a smaller number of illumination patterns, e.g., a limited number of illumination patterns, such as less than 10, less than 8, less than 6, or 4 or 2 illumination patterns to generate a thin image representation of the sample, e.g., for less than 100 nm thick, less than 80 nm thick, less than 60 nm thick, less than 40 nm thick, such as about 20 nm thick.

The images captured under limited illumination patterns, such as the composite images 2128A, 2128B, and 2128C, can be processed to form a thin image representation of the sample at a focus depth plane. The thin image representation can be represented by a complex function S 2151, which has intensity and phase information, representing the sample area at the focus depth plane.

When an image of the sample area is captured by a camera, only the intensity is captured, e.g., the phase information is lost to the camera, and the 3D sample is converted to a 2D image. By taking a set of images with different illumination patterns representing lights having different phases reaching the camera, the phase information can be reconstructed 2181 to generate a representation of the 3D sample with finite thickness.

Thus the image representation can be formed by solving an equation linking the amplitudes of the multiple captured images captured under the multiple illumination patterns M (e.g., the images captured by the cameras under the multiple illumination patterns) with the amplitudes of multiple images calculated from light propagation through the image representation S through a system matrix T that describes the microscope image formation process, which can determined from the geometry of the MCAM setup, including the light paths from the light sources to the camera.

For example, the MCAM system can capture k images of the sample area, meaning a set of k images M captured by the cameras under k illumination patterns. This set of k images M is the result of the image representation S transformed through the system matrix T. The equation can be expressed as $$M = \|T \cdot S\|^2 + n$$

The set of k images M is the result of the transformation of the system matrix M with the sample function S. Here, the absolute square term is due to the ability to detect only intensity by the camera, and n is an additive Gaussian noise.

The image representation S 2151 can be calculated from the above function by solving the inverse problem. A possible approach for the inverse problem is to minimize the mean-squared error between amplitudes of the multiple captured images and amplitudes of multiple images calculated from light propagation under the multiple illumination patterns.

between the measured magnitudes and an estimate of the sample function. Another possible approach is to minimize a related negative log-likelihood function, which is based on a Poisson noise prior. Another possible approach is to treat the problem as a cost function, using appropriate minimization algorithms, such as Douglas-Rachford algorithm.

The image reconstructions process thus can form an image representation of the thin sample, which can include an estimate of the sample height, the sample phase, and its spectral color content. For example, the image representation can provide an image with a resolution that is higher than that defined by the diffraction limit of its imaging lenses, an image having a measurement of depth at different spatial locations across the image, an image having a measurement of the optical phase at different spatial locations across the image, or an image having a measurement of multi-spectral content at different spatial locations across the image.

FIG. 22 illustrates a process for forming an image representation according to some embodiments. Operation 2265A positions a sample facing multiple cameras at a first position so that each camera is configured to capture a first image of a first area of the sample.

Operation 2262A generates a first illumination pattern on the sample.

Operation 2263A captures a first set of images from the multiple cameras under the first illumination pattern at the first location.

Operation 2265B optionally moves the multiple cameras or the sample to one or more second locations so that the each camera is configured to capture one of one or more second images of each of one or more second areas of the sample.

Operation 2263B captures one or more second sets of images from the multiple cameras under the first illumination pattern, with each of the one or more second sets of images captured at one of the one or more second locations.

Operation 2267 repeats for one or more second illumination patterns on the sample. The repetition includes generating each of the one or more second illumination patterns, moving the multiple cameras or the sample to the first and the one or more second positions, and captures additional first and one or more second sets of images at the first and the one or more second positions.

Operation 2265C optionally stitches the first set, the one or more second sets, the additional first set, and the additional one or more second sets of images into first, one or more second, additional first, and additional one or more second composite images, respectively. The first set of images can be stitched into the first composite image. Each of the one or more second sets of images can be stitched into one of the one or more second composite images. The additional first set of images can be stitched into the additional first composite image. Each of the one or more additional second sets of images can be stitched into one of the one or more additional second composite images.

In the stitching process, features can be extracted from the sets of images captured by each camera under the different illumination patterns. The features in each image can be matched against the features in other images, and the images can be transformed to allow the overlapping of the matched features to form the complete image. After the stitching process, the complete image can be a set of complete image members, e.g., having one complete image member for each illumination pattern.

Operation 2266A processes one or more groups of images to form one or more image representations. Each of the one or more groups of images is processed into one of the one or more image representations. The each of the one or more groups of images includes images captured by a same camera under the first and the one or more second illumination patterns, or includes the first, the one or more second, the additional first, and the additional second composite images.

FIGS. 23A-23B illustrate flow charts for forming image representations according to some embodiments. In FIG. 23A, operation 2366A forms an image representation of a sample by processing multiple images of an area captured under multiple illumination patterns, with each image of the multiple images captured under an illumination pattern of the multiple illumination patterns.

The images of an area include images captured by an individual camera, or composite images stitched from images captured by multiple cameras. The image representation includes a complex function of planar positions, with amplitudes of the complex function related to intensities of objects at the planar positions, with phases of the complex function related to thickness of the objects at the planar positions.

The formation of the image representation includes determining parameters of the complex function. The determination is performed by minimizing errors between intensity of the multiple captured images and intensity of images generated by the complex function calculated from properties of light propagating in the multiple illumination patterns. The determination is performed by calculating intensities of multiple images resulted from the light propagation in the multiple illumination patterns, respectively. The determination is performed minimizing a mean squared error between amplitudes of the multiple captured images and the amplitudes of the multiple calculated images between the complex function and the light propagation in the multiple illumination patterns.

The formation of the image representation is optionally performed by partitioning each of the multiple captured images into smaller images, determining multiple complex functions for the smaller images, with each complex function representing a smaller image, and assembling the multiple complex functions.

In FIG. 23B, operation 2300A forms an MCAM system including a controller. The controller is configured to form an image representation of a sample through minimizing errors between intensity of multiple captured images and intensity of images generated by a complex function representing the image representation calculated from properties of light propagating in the multiple illumination patterns.

Asymmetric Light Sources

In some embodiments, the multiple illumination patterns can provide access to phase contrast information of light propagated through the sample. For example, with the optical thickness related to a change of the optical phase of light emerging from the specimen surface, intensity variations can be determined based on the phase variations. Thus, the multiple illumination patterns can convert variations of the optical phase of light emerging from the specimen surface into detectable intensity variations with significant contrast at the image plane. In addition, the multiple illumination patterns, with access to the phase contrast information, can be used by the image stitching software algorithms, all-in-focus image generation algorithm, depth map estimation algorithm or 3D volume estimation algorithm.

Phase contrast, as opposed to absorption-based contrast, is particularly relevant for primarily transparent specimens, such as the cellular matter, stem cells, human-derived cells, organism-derived cells, plant-derived cells, small model organisms, organoid tissue, organoids, cellular structures, in vitro cells, in vitro tissue, tissue, cytopathology material, bacteria, bacterial colonies, etc. that are potential specimens that this invention is designed to image. In addition, there are other useful outputs that can be processed for subsequent analysis using phase contrast information. These include a differential phase contrast refocusable map, a differential phase contrast all-in-focus image, and a 3D volume estimation with higher 3D resolution and accuracy as compared to those not using the multiple illumination patterns.

Differential phase contrast images are produced by illuminating a specimen from one range of off-center illumination angles to capture a first image, then illuminating the specimen from a second range of off-center illumination angles that are equal and opposite in offset to the first range of angles to capture a second image, and then dividing the difference of the first and second image by their sum. Such differential phase contrast image production is helpful in creating high-contrast output images for human or computer analysis that can include information about the specimen phase gradient.

In some embodiments, a differential phase contrast image can be computed from two or more uniquely illuminated images acquired at a particular axial scan location per micro-camera per lateral scan location. This can be repeated for multiple axial scan locations, and then also for applied across multiple micro-cameras and lateral scan locations. As a specific example, 3 images each captured under a different illumination pattern are obtained per axial scan location, e.g., at each focus depth plane. In some embodiments, two or more images from this set of variably illuminated images can be combined into a single differential phase contrast map. This process can be repeated for the 3 axial scan locations visited, and the 3 micro-cameras in the array, and the 2 lateral scan locations are visited, to create a 3×3×2 differential phase contrast maps, which here is referred to as a differential phase contrast data matrix. The matrix then can then be stitched together into a final composite per axial scan location to produce a phase contrast focal stack composite.

Standard image stitching software can be used for such composite formation, for example based upon software-based feature identification, feature matching and subsequent image alignment and blending. Alternatively non-feature-based stitching methods can be used, such as Fourier-transform-based phase alignment to identify image offset. Alternatively, photogrammetric image stitching software may be used to execute this stitching step, in which it is possible to extract additional height map information for each stitched composite within the set of focal stack composite images. The phase contrast information from variable angle illumination may lead to higher stitching accuracy.

From this phase contrast composite image focal stack, software can also be utilized to produce an all-in-focus phase contrast image. In some embodiments, an all-in-focus phase contrast image is formed by using a sharpness metric to identify image locations that are in-focus within each stitched composite image, repeating this process for all stitched image composites within the focal stack composite image set, and then merging the identified image locations that are in-focus into the final all-in-focus image.

From this composite phase contrast image focal stack, software can also be utilized to produce a 3D volume. In some embodiments, a 3D volume W is formed by solving an inverse problem. The inverse problem can be approached by minimizing a cost function. In one preferred embodiment, the cost function can be a function $f=|g(W)-E|^2$, and the minimization problem can be to minimize f with respect to W, subject to various constraints on W, such as positivity and smoothness. Here, E is the measured data matrix with angled illumination as noted above, and g is a known forward model that maps the estimated 3D volume to the uniquely illuminated measurements. The process of illumination and axial scanning can be summarized in a forward model, such as the first Born approximation, a higher-order Born approximation, the Rytov approximation, a multiple-scattering model, the multi-slice model with forward or forward and backward propagation included, or a combination of the above models. Alternatively, the process of only angled illumination can be summarized in one of the above forward models, from which go can be composed for solution of W from E. The goal during minimization is to perturb the values within the data matrix W, which represent properties about the 3D specimen of interest, to minimize the value of f. In one preferred embodiment, optimization software such as an automatic differentiation algorithm can be used to solve the above minimization problem to recover the final data volume W.

In some embodiments, the phase contrast focal stack composite can be displayed as a refocusable map on a computer monitor or screen or other type of visual display for visual assessment. The refocusable phase contrast image can also include additional information that is connected to unique specimen illumination, or can present pre-processed varying illumination. In a phase contrast refocusable map, a first digital cursor can be used to pan around the acquired image data laterally in (x,y), and either the same first digital cursor or a second digital cursor can be used to refocus the visually presented image data at a particular set of spatial locations of interest for one or more specimen sub-volumes of interest to different axial planes (e.g., different depths) within the specimen volume.

In some embodiments, one or more captured phase contrast focal stacks from one or more lateral positions and one or more micro-cameras are processed to produce a refocusable map with phase contrast, all-in-focus phase contrast image or a 3D volume with phase contrast information, or more than one of the three listed options. In some embodiments, this computational processing can be executed in a parallelized manner, in which more than one focal stack is processed by the computer at any given time.

FIGS. 24A-24C illustrate a process for forming image representations using phase contrast according to some embodiments. In FIG. 24A, asymmetric illumination patterns, such as mirror symmetric illumination patterns, can be used on a sample. For example, first light source 2422A can be activated to provide a first illumination pattern on the sample 2420. A camera can capture a first image 2428A of the sample under the first illumination pattern. Second light source 2422B, which is mirror symmetrical to first light source 2422A, can be activated to provide a second illumination pattern on the sample 2420. A camera can capture a second image 2428B of the sample under the first illumination pattern.

The illumination patterns are asymmetric, such as mirror symmetrical. FIG. 24B shows configurations for asymmetric illumination patterns. Light sources 1 and light sources 2 are mirror symmetrical with respect to the center of the light sources or to the center of the sample. Similarly, light sources 3 and 4 are also mirror symmetrical. In addition, light sources 1, 2, 3, and 4 are also mirror symmetrical. The mirror symmetry can provide ease of calculations for the differential phase contrast.

The images captured under the asymmetric illumination patterns can be processed, such as performing a differential phase contrast operation 2482, which can include a ratio of intensity or amplitude difference and intensity or amplitude summation of the captured images. The differential phase contrast operation can generate an image representation with higher contrast with fewer illumination patterns, or higher resolution with more illumination patterns.

For example, an image representation formed from 4 images captured under a left, a right, a top, and a bottom illumination patterns can be processed to obtain higher contrast, through the differential phase contrast operation. For higher resolution, the left illumination patterns would need more than one illumination pattern, such as a 10 degree left, a 20 degree left, a 30 degree left illumination patterns. A non linear algorithm such as a Fourier ptychography can be used to calculate the high resolution image from the 8 or 12 images captured under the 2 or 3 left, right, top, and bottom illumination patterns. The higher resolution image will also be of the form $U(x,y)=A(x,y)e^{j2\pi t(x,y)}$, which is an image representation.

FIGS. 25A-25B illustrate flow charts for phase contrast processes according to some embodiments. In FIG. 25A, operation 2566B forms an image representation of a sample by processing multiple images of an area captured under multiple illumination patterns. The image representation includes a complex function of planar positions, with amplitudes and phases related to intensities and thicknesses, respectively.

The formation of the image representation includes determining parameters of the complex function. The determination is performed by reconstructing the phase of the complex function through the internal relationship between the intensity and phase distribution of a wave. The determination is performed by calculating phase contrast information from multiple images calculated from the light propagation under the multiple illumination patterns, respectively. The determination is performed minimizing a mean squared error between phase information of the multiple captured images and the phase information of the multiple calculated images. The determination is performed by minimizing errors between phase contrast differences among the multiple captured images and phase contrast differences of images generated by calculating from light propagation through the complex function. The determination is performed by calculating phase contrast differences between multiple images calculated from light propagation under the illumination patterns. The determination is performed minimizing a mean squared error between phase contrast difference of the multiple captured images and the phase contrast difference of the multiple calculated images.

In FIG. 25B, operation 2500B forms an MCAM system including a controller. The controller is configured to form an image representation of a sample through minimizing errors between phase contrast differences of multiple captured images and phase contrast differences of images generated by a complex function representing the image representation calculated from light propagation.

Defocus

In some embodiments, the multiple illumination patterns can provide access to phase information of light propagated through the sample. For example, with the optical thickness related to a change of the optical phase of light emerging from the specimen surface, intensity variations can be determined based on the phase variations. Thus, the multiple illumination patterns can convert variations of the optical phase of light emerging from the specimen surface into detectable intensity variations with significant contrast at the image plane. In addition, the multiple illumination patterns, with access to the phase contrast information, can be used by the image stitching software algorithms, all-in-focus image generation algorithm, depth map estimation algorithm or 3D volume estimation algorithm.

Phase information can be constructed by a transport of intensity equation (TIE), which describes the internal relationship between the intensity and phase distribution of a wave, using the law of conservation of energy to write a differential equation for the transport of energy by an optical field. This equation could be used as an approach to phase recovery, with an approximation of the amplitude of the wave propagating nominally in the z-direction by a parabolic equation, expressed in terms of irradiance and phase.

For a phase sample with a constant intensity, the transport of intensity equation simplifies to, where $\lambda$ is the wavelength, $I(x,y,z)$ is the irradiance at point $(x,y,z)$, and $\Phi$ is the phase of the wave:

$$\frac{d}{dz}I(z) = -\frac{\lambda}{2\pi}I(z)\nabla^2_{x,y}\Phi$$

If the intensity distribution of the wave and its spatial derivative can be measured experimentally, the equation becomes a linear equation that can be solved to obtain the phase distribution $\Phi$. Thus, the transport of intensity equation allows measuring the phase distribution of the sample by acquiring a defocused image, e.g., $I(x, y, z+\Delta z)$.

From the phase distribution, software can also be utilized to produce a phase all-in-focus image, a phase 3D volume, a phase depth map, a phase refocusable map, or a phase fluorescence map.

FIGS. 26A-26C illustrate a process for forming image representations using phase information obtaining from defocus images according to some embodiments. In FIG. 26A, multiple illumination patterns can be used on a sample 2620. In addition, multiple focus depth planes 2653A and 2653B can be used to capture in-focus and out-of-focus objects 2632 and 2633 in captured images 2628A and 2628B.

The images captured under the multiple illumination patterns and axial planes can be processed, such as performing a transport of intensity equation 2683, which can calculate a phase distribution of light reaching the sample, and an image representation 2651 of the sample at the in-focus depth plane.

FIGS. 27A-27B illustrate flow charts for phase distribution processes according to some embodiments. In FIG. 27A, operation 2766C forms an image representation of a sample by processing multiple images of an area captured under multiple illumination patterns. The image representation includes a complex function of planar positions, with amplitudes and phases related to intensities and thicknesses, respectively.

The formation of the image representation includes determining parameters of the complex function. The determination is performed by reconstructing the phase of the complex function through an internal relationship between the intensity and phase distribution of a wave, relating difference in irradiance with a phase distribution, which allows a measurement of the phase distribution of a sample by acquiring a defocus image.

In FIG. 27B, operation 2700C forms an MCAM system including a controller. The controller is configured to form an image representation of a sample through calculating a phase distribution of the sample using a defocused image having intensity distribution at x, y, and z+delta z.

Volumetric Representation

In some embodiments, the present invention discloses methods and systems to form a volumetric representation of a 3D sample by processing multiple image representations at different focus depth planes of the sample. The image representation can include higher resolution or higher contrast than individual images captured by the cameras, based on phase distribution or phase contrast information calculated from multiple captured images under multiple illumination patterns. The image representation can include depth information, also based on a phase distribution of light calculated from multiple captured images under multiple illumination patterns.

The image representations can have thin thickness, e.g., less than 100 nm, such as less than 50 nm, or about 20 nm. For thicker sample, such as 1 mm thickness, multiple focus positioning process can be used.

Figure 28A:
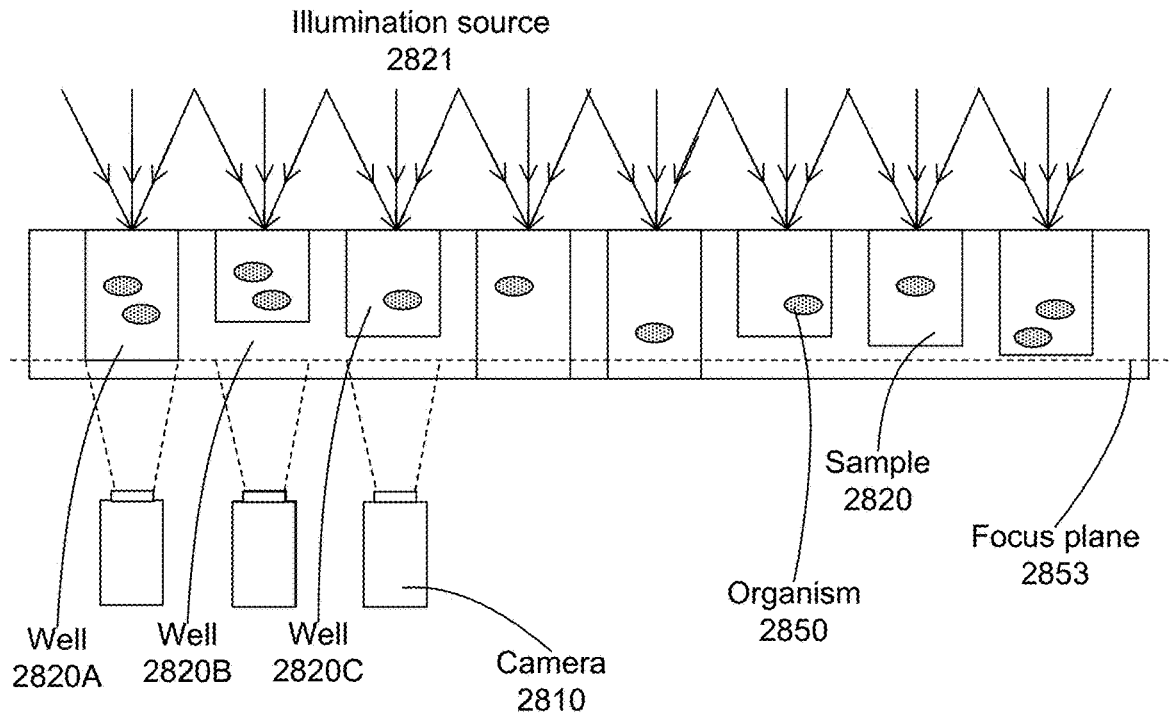
FIGS. 28A-28B illustrate a multiple focus positioning process according to some embodiments.
Figure 28B:
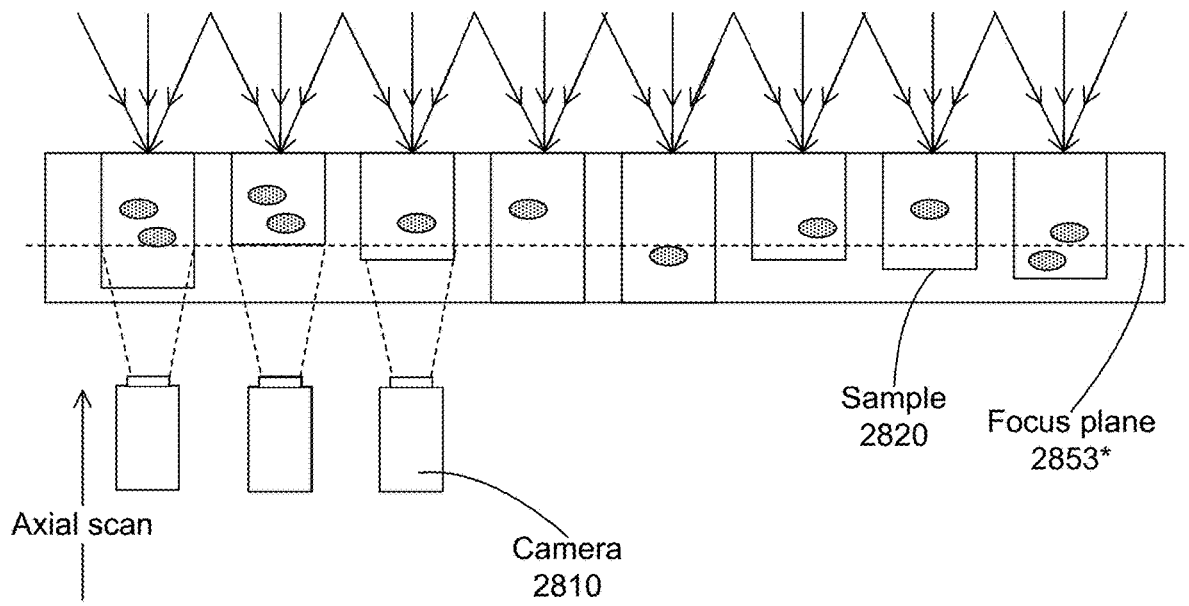

FIGS. 28A-28B illustrate a multiple focus positioning process according to some embodiments. The multiple focus positioning process can enable the ability to image across multi-well plates that are not uniformly located along the axial dimension, e.g., the wells in the multi-well plate are not uniformly flat due to manufacturing tolerances, or which contain specimen material that is unevenly positioned within different wells at different axial locations. As shown, 3 cameras are configured to image three wells within a multi-well plate 2820 that includes uneven well bottoms. Well 2820A has a bottom that is at a unique height with respect to bottoms of well 2820B and 2820C. In a first focus setting 2853, where the camera array is configured to image axial plane 2853 shown in FIG. 28A, only well 2820A will be in focus. By executing axial scanning by moving an axial distance such that the camera array is now focused instead on axial plane 2853*, which aligns with the bottom of well 2820B, then image data from this well can be captured in focus. Accordingly, the multiple focus position process is able to capture in-focus image data from wells with different bottom depths that exist at different axial planes.

Multi-Focus Post-Processing Software

In some embodiments, the image representations formed at the multiple focus depth planes can be assembled to form a volumetric representation of the sample. Using the volumetric representation, multiple outputs can be generated for subsequent analysis.

In some embodiments, the multitude images per axial scan location per illumination pattern can be stitched together to form a composite images. Standard image stitching software can be used for such composite formation, for example based upon software-based feature identification, feature matching and subsequent image alignment and blending. Alternatively non-feature-based stitching methods can be used, such as Fourier-transform-based phase alignment to identify image offset. Alternatively, photogrammetric image stitching software may be used to execute this stitching step, in which it is possible to extract additional height map information for each stitched composite within the set of focal stack composite images.

Depth Map

From the multiple image representations, software can be utilized to produce a depth map. In some embodiments, a depth map is formed by using a sharpness metric to identify image locations that are in-focus within each stitched composite image representation, associating those locations with a calibrated depth computed for the particular stitched composite image representation, and repeating this process for all stitched composite image representations within the multiple stitched image representations.

All-In-Focus Image

From this multiple image representations, software can also be utilized to produce an all-in-focus image. In some embodiments, an all-in-focus image is formed by using a sharpness metric to identify image locations that are in-focus within each stitched composite image representation, repeating this process for all stitched composite image representations within the multiple stitched image representations, and then merging the identified image locations that are in-focus into the final all-in-focus image.

3D Volume

From this multiple image representations, software can also be utilized to produce a 3D volume. In some embodiments, a 3D volume V is formed by solving an inverse problem. The inverse problem can be approached by minimizing a cost function. In some embodiments, the cost function can be a function $f=|g(V)-D|^2$, and the minimization problem can be to minimize f with respect to V, subject to various constraints on V, such as positivity and smoothness. Here, D is the measured data matrix as noted above, and g is a known forward model that maps the estimated 3D volume to the measurements. Example forward models that can be employed include the first Born approximation, a higher-order Born approximation, the Rytov approximation, a multiple-scattering model, the multi-slice model with forward or forward and backward propagation included, or a combination of the above models. The goal during minimization is to perturb the values within the data matrix V, which represent properties about the 3D specimen of interest, to minimize the value of f. In some embodiments, optimization software such as an automatic differentiation algorithm can be used to solve the above minimization problem to recover the final data volume V.

3D Refocusable Map

In some embodiments, the multiple image representations can be displayed as a refocusable map on a computer monitor or screen or other type of visual display for visual assessment. The refocusable map can also include additional information that is connected to unique specimen illumination, or can present pre-processed varying illumination. In a refocusable map, a first digital cursor can be used to pan around the acquired image data laterally in (x,y), and either the same first digital cursor or a second digital cursor can be used to refocus the visually presented image data at a particular set of spatial locations of interest for one or more specimen sub-volumes of interest to different axial planes (i.e., different depths) within the specimen volume.

In some embodiments, the stitching process can be omitted, and images captures per camera per axial scan location per illumination pattern can be used instead of the composite images. As such, one or more captured focal stacks from one or more lateral positions and from one or more cameras are processed to produce a depth map, all-in-focus image or a 3D volume, or more than one of the three listed options. In some embodiments, this computational processing can be executed in a parallelized manner, in which more than one focal stack is processed by the computer at any given time.

Stitch

In some embodiments, the image representations can be stitched together to form a volumetric representation, based on extracted features from overlapped volumes between adjacent image representations. For example, the features extracted from the image representations can be used to perform image stitching. Features can be calculated from the image representations captured by different cameras of the camera array. A matching process can be performed to match the features. After matching, the images having matched features can be positioned so that the matched features are overlapped. The positioning can include image transformations to obtain overlapping features.

Figure 29:
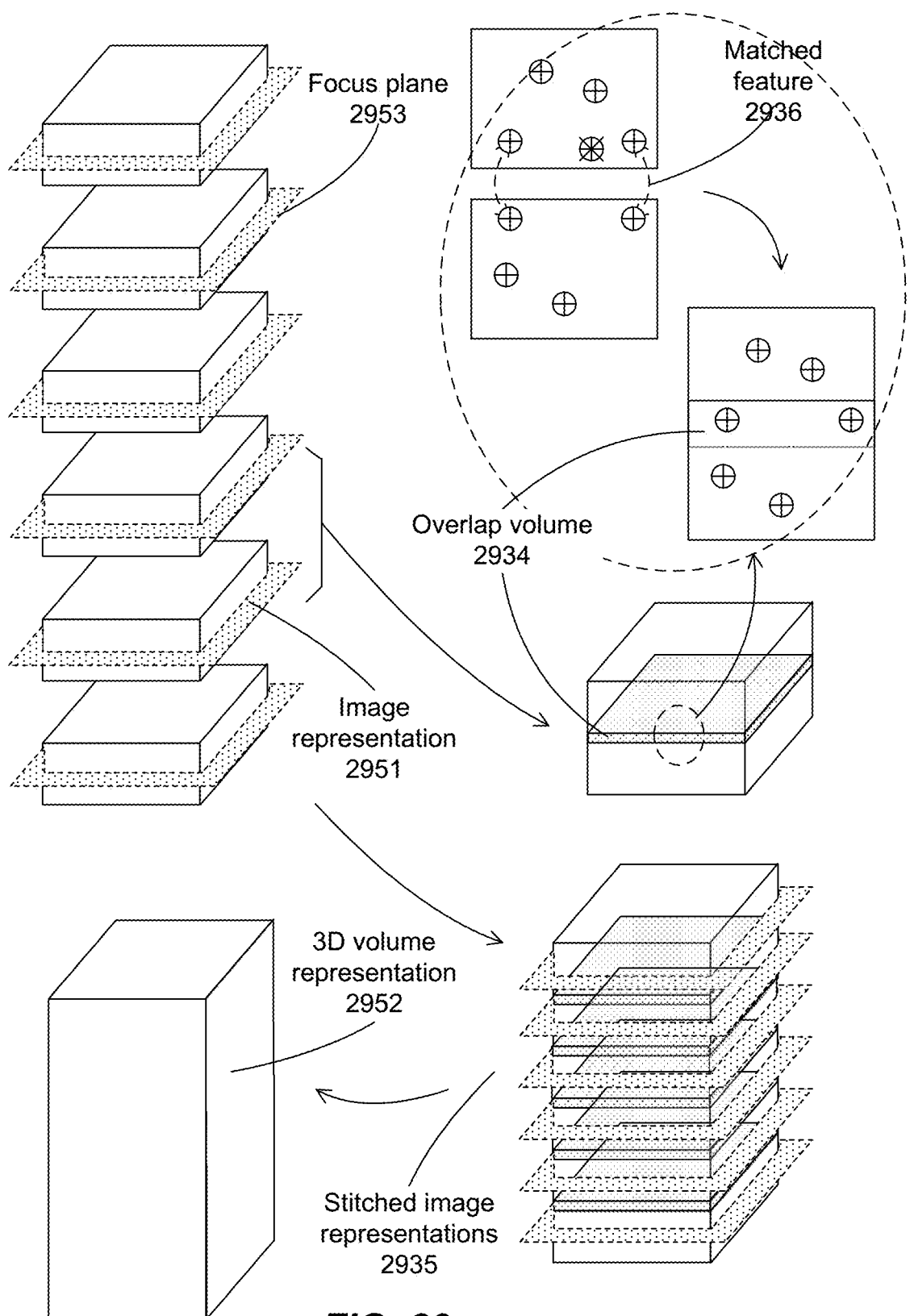
FIG. 29 illustrates a stitching process for multiple image representations to form a volumetric representation according to some embodiments.

FIG. 29 illustrates a stitching process for multiple image representations to form a volumetric representation according to some embodiments. Each image representation 2951 can include a 3D representation having a finite depth, which corresponds to a focus depth plane 2953. Adjacent image representations can have overlapped volumes 2934 in which matched features 2936 can be assembled. For example, features in two adjacent image representations can be identified and compared. The two image representations are then positioned to have the matched features overlapped, to form a larger image representation having two image representations stitched together.

Upon stitching all the image representations, the stitched image representations 2934 can form a 3D volumetric representation 2952, which can be used to determine properties and characteristics of organisms in the sample.

FIGS. 30A-30D illustrate flow charts for stitching image representations according to some embodiments. In FIG. 30A, operation 3084 stitches multiple image representations of a sample to form a 3D volumetric representation of the sample. The multiple image representations include overlapped volumes between adjacent image representations.

In FIG. 30B, operation 3084A determines common features in overlapped volumes between adjacent image representations of multiple image representations. Operation 3084B aligns the common features to form a 3D volumetric representation from the multiple image representations.

In FIG. 30C, operation 3000D1 forms an MCAM system including a controller. The controller is configured to stitches multiple image representations of a sample to form a 3D volumetric representation of the sample. The multiple image representations include overlapped volumes between adjacent image representations.

In FIG. 30D, operation 3000D2 forms an MCAM system including a controller. The controller is configured to determine common features in overlapped volumes between adjacent image representations of multiple image representations. The controller is also configured to align the common features to form a 3D volumetric representation from the multiple image representations.

Light Propagation

In some embodiments, the image representations can be fitted to a volumetric representation based on the constraints of light propagation. For example, light can propagate through the sample, to show as image representations at different depth planes. Thus, if the image representations and the volumetric representation are represented by complex functions, the complex functions representing the image representations can be fitted to represent the complex function representing the volumetric representation, subjected to the constraints of light propagation through the image representations at different depth planes.

In some embodiments, the fitting of the image representations into the volumetric representation can be accomplished by minimizing variations between the complex function representing the volumetric representation and the multiple complex functions representing the image representations, subjected to light propagation constraints. Alternatively, the fitting of the image representations into the volumetric representation can be accomplished by minimizing errors, e.g., a root means squared error, in assembling the multiple image representations (e.g., the complex functions representing the image representations) at corresponded depths subjected to light propagation constraints.

In some embodiments, software can be used to generate a 3D volume, e.g., a volumetric representation, of the sample from the multiple image representations. For example, a volume V can be calculated by solving an inverse problem. The inverse problem can be approached by minimizing a cost function, such as a function of an error or a variation relating the volume V with measurable information, such as the image representations at multiple depth planes.

In some embodiments, the cost function can be a function $f=|g(V)-D|^2$, and the minimization problem can be to minimize f with respect to V, subject to various constraints on V, such as positivity and smoothness. Here, D is the measured data matrix of the image representations at different depth planes, and g is a known forward model that maps the estimated 3D volume V to the measurements. Example forward models that can be employed include the first Born approximation, a higher-order Born approximation, the Rytov approximation, a multiple-scattering model, the multi-slice model with forward or forward and backward propagation included, or a combination of the above models. The goal during minimization is to perturb the values within the data matrix V, which represent properties about the 3D specimen of interest, to minimize the value of f. In some embodiments, optimization software such as an automatic differentiation algorithm can be used to solve the above minimization problem to recover the final data volume V.

In some embodiments, the image representations can be the image representations stitched from the individual images captured by the individual cameras. Alternatively, the image representations can be the individual image representations calculated from the individual images captured by the individual cameras.

FIGS. 31A-31C illustrate a process for forming a volumetric representation according to some embodiments. Multiple image representations at different depth planes can be assembled according the depth planes. The image representations can be represented by complex functions having magnitude and phase components. The complex functions representing the image representations can be linearly combined together and then subjected to an image deconvolution (FIG. 31A).

By representing the image representations with complex functions, the complex function $U_i(x,y)$ at each depth plane $z_i$ can be connected and constrained by the physics of light propagation (FIG. 31B). That is, an equation guides the propagation of $U_i(x,y)$ from depth location $z_i$ to $U_j(x,y)$ at depth location $z_j$, for all depth planes from $z_1$ to $z_n$. Using the property that the values at all of the planes are connected, an estimate of 3D volumetric representation 3152 of the specimen can be formed, using a nonlinear optimization algorithm, since there are additional constraints imposed by physics to support the search process (FIG. 31C).

Alternatively, in some embodiments, the image representations at different depth planes can be combined linearly into a 3D array without any additional processing.

FIGS. 32A-32B illustrate flow charts for forming a volumetric representation according to some embodiments. In FIG. 32A, operation 3268A forms a 3D volumetric representation of a sample by processing multiple image representations at multiple focused depths of the sample, with each image representation processed from multiple images captured under multiple illumination patterns, with each image of the multiple images captured under an illumination pattern of the multiple illumination patterns.

The multiple image representations include images captured by an individual camera, or composite images stitched from images captured by multiple cameras. The image representation includes a complex function of planar positions, with amplitudes and phases related to intensities and thicknesses of the objects at the planar positions. The 3D volumetric representation includes a complex function of 3D positions, with amplitudes and phases related to intensities and thicknesses of the objects at the 3D positions.

The formation of the 3D volumetric representation includes determining parameters of the complex function of 3D positions. The determination is performed by optimizing a propagation of light between the image representations at the multiple focused depths. The determination is performed by connecting the image representations at the multiple depths. The determination is performed by optimizing the connections subjected to constraints of light propagation through the image representations, which including amplitudes and phases of the image representations.

In FIG. 32B, operation 3200E forms an MCAM system including a controller. The controller is configured to form a 3D volumetric representation of a sample by optimizing a propagation of light between multiple image representations at multiple focused depths, with each image representation processed from multiple images captured under multiple illumination patterns, with each image of the multiple images captured under an illumination pattern of the multiple illumination patterns.

Depth Map

From the multiple image representations, software can be utilized to produce a depth map. In some embodiments, a depth map is formed by using a sharpness metric to identify image locations that are in-focus within each stitched composite image representation, associating those locations with a calibrated depth computed for the particular stitched composite image representation, and repeating this process for all stitched composite image representations within the multiple stitched image representations.

In some embodiments, the stitching process can be omitted, and images captures per camera per axial scan location per illumination pattern can be used instead of the composite images. As such, one or more captured focal stacks from one or more lateral positions and from one or more cameras are processed to produce a depth map, all-in-focus image or a 3D volume, or more than one of the three listed options. In some embodiments, this computational processing can be executed in a parallelized manner, in which more than one focal stack is processed by the computer at any given time.

FIGS. 33A-33C illustrate a process for forming a depth map according to some embodiments. Multiple image representations at different depth planes can be assembled according the depth planes. The image representations can be represented by pixel matrices with or without thickness matrices. (FIG. 33A).

Each image representation can be subjected to a sharpness operation 3337, which can calculate intensity gradients 3338 across the image representations. For intensity gradients greater than a threshold value, which signifies that the edges are sharp, the image representations are in focus 3332. For intensity gradients smaller than a threshold value, which signifies that the edges are blurred, the image representations are out-of-focus 3333 (FIG. 33B).

The out-of-focus objects are removed, with the in-focus objects remained in the image representations to form a depth map 3385 (FIG. 33C)

FIGS. 34A-34B illustrate flow charts for forming a volumetric representation according to some embodiments. In FIG. 34A, operation 3468B forms a 3D volumetric representation of a sample by processing multiple image representations at multiple focused depth planes of the sample, with each image representation processed from multiple images captured under multiple illumination patterns, with each image of the multiple images captured under an illumination pattern of the multiple illumination patterns.

The multiple image representations include images captured by an individual camera, or composite images stitched from images captured by multiple cameras. The image representations each include an image focused at a focused depth plane of the multiple focus depth planes to form in-focus and out-of-focus images of objects in the sample. The 3D volumetric representation includes image representations of in-focus images of the objects.

The formation of the 3D volumetric representation includes determining in-focus images of the objects through a sharpness determination process. The formation of the 3D volumetric representation includes determining a sharpness of the image representations through an intensity gradient determination, comparing the sharpness to a threshold to determine image representations having in-focus images, and assembling the image representations having in-focus images according the corresponded focused depths.

In FIG. 34B, operation 3400F forms an MCAM system including a controller. The controller is configured to form a 3D volumetric representation of a sample by determining image representations having in-focus images through a sharpness determination process, and assembling the image representations having in-focus images according the corresponded focused depths.

All-In-Focus Image

From this multiple image representations, software can also be utilized to produce an all-in-focus image. In some embodiments, an all-in-focus image is formed by using a sharpness metric to identify image locations that are in-focus within each stitched composite image representation, repeating this process for all stitched composite image representations within the multiple stitched image representations, and then merging the identified image locations that are in-focus into the final all-in-focus image.

In some embodiments, surface area of objects, for example, organoids, in the volume of the sample can be measured. Since the objects are at different axial locations, thus, if one object is in-focus, others will be blurry. The all-in-focus map can provide the surface area and volume of all of the objects. The surface areas of the objects can be determined from the sharpness metric in the intensity pixel matrices, and the volumes of the objects can be determined from the thickness or height of the objects, based on the image representations having thickness matrices.

3D Refocusable Map

In some embodiments, the multiple image representations can be displayed as a refocusable map on a computer monitor or screen or other type of visual display for visual assessment. The refocusable map can also include additional information that is connected to unique specimen illumination, or can present pre-processed varying illumination. In a refocusable map, a first digital cursor can be used to pan around the acquired image data laterally in (x,y), and either the same first digital cursor or a second digital cursor can be used to refocus the visually presented image data at a particular set of spatial locations of interest for one or more specimen sub-volumes of interest to different axial planes (i.e., different depths) within the specimen volume.

In some embodiments, the stitching process can be omitted, and images captures per camera per axial scan location per illumination pattern can be used instead of the composite images. As such, one or more captured focal stacks from one or more lateral positions and from one or more cameras are processed to produce a depth map, all-in-focus image or a 3D volume, or more than one of the three listed options. In some embodiments, this computational processing can be executed in a parallelized manner, in which more than one focal stack is processed by the computer at any given time.

Figure 35A:
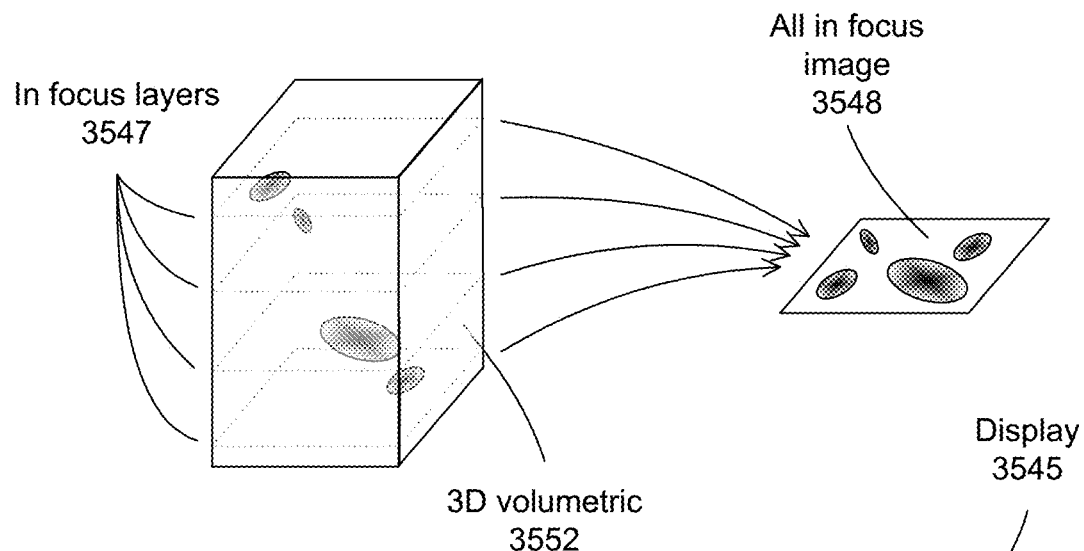
FIGS. 35A-35B illustrate an all-in-focus process and a refocusable process according to some embodiments.
Figure 35B:
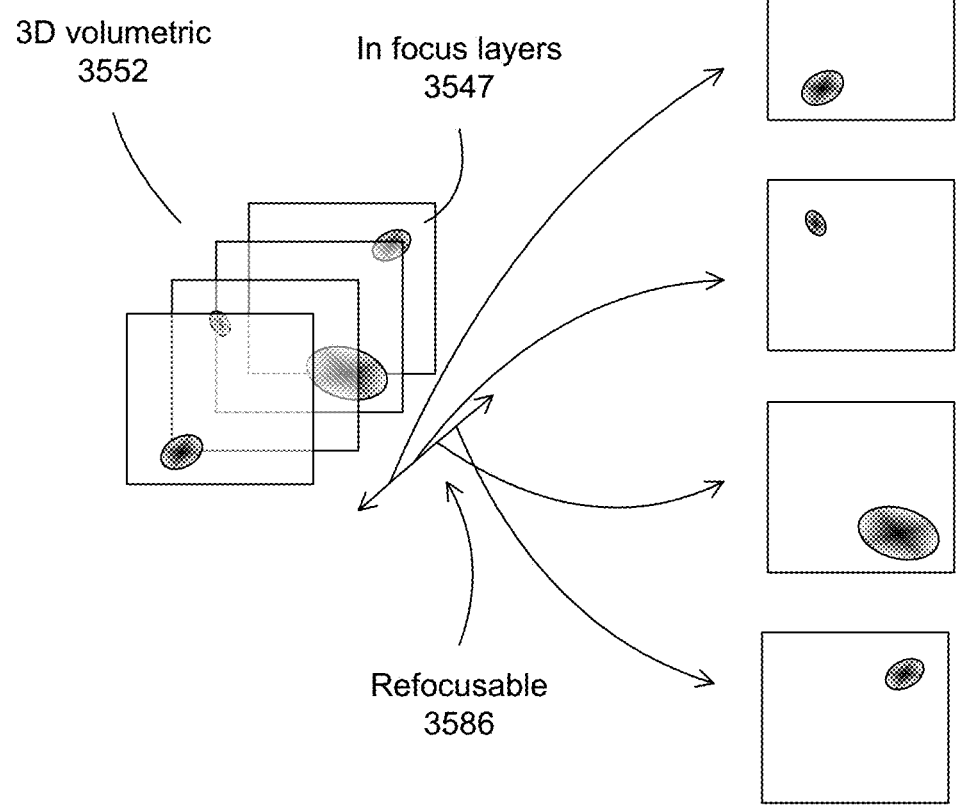

FIGS. 35A-35B illustrate an all-in-focus process and a refocusable process according to some embodiments. In FIG. 35A, an all-in-focus image 3548 can be formed from the volumetric representation 3552, which is assembled from multiple in focus layer 3547.

In FIG. 35B, a refocusable image can be formed from the volumetric representation 3552, which is assembled from multiple in focus layer 3547. The refocusable image can be shown on a display 3545, with a refocusable control 3586 to show different in-focus layers.

FIGS. 36A-36B illustrate flow charts for forming a volumetric representation according to some embodiments. In FIG. 36A, operation 3687 forms a composite image representation of a sample by processing multiple image representations at multiple focused depth planes of the sample, with each image representation processed from multiple images captured under multiple illumination patterns, with each image of the multiple images captured under an illumination pattern of the multiple illumination patterns.

The multiple image representations include composite images stitched from images captured by multiple cameras. The image representations each include an image focused at a focused depth plane of the multiple focus depth planes to form in-focus and out-of-focus images of objects in the sample.

The composite image representation includes in-focus images of the objects in the sample.

Alternatively, the composite image representation includes in-focus images of the objects in the sample, together with thickness information of the objects. The composite image representation includes in-focus images of the objects, with the in-focus images of the objects determined through a sharpness determination process.

The formation of the composite image representation includes determining a sharpness of the image representations through an intensity gradient determination, comparing the sharpness to a threshold to determine image representations having in-focus images, and assembling the image representations having in-focus images into the composite image representation.

In FIG. 36B, operation 3600G forms an MCAM system including a controller. The controller is configured to form a composite image representation of a sample by determining image representations having in-focus images through a sharpness determination process, and assembling the image representations having in-focus images into the composite image representation.

FIGS. 37A-37B illustrate flow charts for forming a volumetric representation according to some embodiments. In FIG. 37A, operation 882 forms a refocusable 3D volumetric representation of a sample by processing multiple image representations at multiple focused depth planes of the sample, with each image representation processed from multiple images captured under multiple illumination patterns, with each image of the multiple images captured under an illumination pattern of the multiple illumination patterns.

The multiple image representations include composite images stitched from images captured by multiple cameras. The image representations each include an image focused at a focused depth plane of the multiple focus depth planes to form in-focus and out-of-focus images of objects in the sample.

The refocusable 3D volumetric representation includes in-focus images of the objects in the sample at corresponded depths, with the focused images focusable at each corresponded depth.

Alternatively, the refocusable 3D volumetric representation includes in-focus images of the objects in the sample at corresponded depths, together with thickness information of the objects. The refocusable 3D volumetric representation includes in-focus images of the objects at corresponded depths, with the in-focus images of the objects determined through a sharpness determination process, with the focused images focusable at each corresponded depth.

In FIG. 37B, operation 3700H forms an MCAM system including a controller. The controller is configured to form a refocusable 3D volumetric representation of a sample by determining image representations having in-focus images through a sharpness determination process, and assembling the image representations having in-focus images into the refocusable 3D volumetric representation, with the focused images focusable at each corresponded depth.

In some embodiments, the element numbers are characterized by the last two digits. For example, a sample can be denoted as 120, 220, 620, 720, etc., e.g., X20 with X ranges from 1 to 37.

What is claimed is:

1. A method comprising:
   forming multiple image representations at multiple focus depth planes of a sample,
      wherein each image representation of the multiple image representations is formed by processing multiple images of an area of the sample captured under multiple illumination patterns at a focus depth plane of the multiple focus depth planes, with each image of the multiple images captured under an illumination pattern of the multiple illumination patterns,
      wherein the images of an area comprise images captured by an individual camera, or composite images stitched from images captured by multiple cameras;
   forming a volumetric representation of the sample based on the multiple image representations at the multiple focus depth planes.

2. The method as in claim 1, wherein at least one of
   the formation of the each image representation comprises forming an image having higher contrast or resolution than an image of the multiple images,
   the formation of the each image representation comprises determining lateral and depth information of objects in the sample at the focus plane,
   the formation of the each image representation comprises determining lateral locations of the objects in the sample and thickness of the objects at the lateral locations at the focus plane, or
   the formation of the each image representation comprises determining complex values representing the objects in the sample at the focus plane, with magnitude components of the complex values showing lateral locations of the objects and phase components of the complex values showing thicknesses of the objects.

3. The method as in claim 1, wherein at least one of
   the formation of the volumetric representation comprises identifying in-focus locations of objects in the sample using a sharpness metric, and associating the locations with calibrated depths,
   the formation of the volumetric representation comprises identifying in-focus locations of the objects in the sample using a sharpness metric, and merging the identified in-focus locations into an all-in-focus image,
   the formation of the volumetric representation comprises stitching the multiple image representations based on common features identified in overlap volumes between adjacent image representations,
   the formation of the volumetric representation comprises minimizing a function of the volumetric representation and the multiple image representations subjected to light propagation constraints, or
   the formation of the volumetric representation comprises minimizing errors in connecting the multiple image representations subjected to light propagation constraints.

4. A method comprising:
   setting focus of multiple cameras of a microscope to multiple focus depth planes in a sample;

at each focus depth plane of the multiple focus depth planes, capturing images of the sample by the multiple cameras under multiple illumination patterns generated by an illumination source of the microscope,
   wherein each cameras of the multiple cameras is configured to capture images of a portion of the sample;
forming multiple image representations at the multiple focus depth planes, with each image representation of the multiple image representations is formed at a focus depth plane of the multiple focus depth planes,
   wherein the each image representation of the multiple image representations is formed by processing multiple images of an area of the sample captured under the multiple illumination patterns at the focus depth plane,
   wherein the multiple images of an area comprise the images captured by an individual camera of the multiple cameras under the multiple illumination patterns at the focus depth plane, or composite images stitched from the images captured by the multiple cameras under the multiple illumination patterns at the focus depth plane,
   wherein the each image representation comprises lateral and depth information at the focus depth plane;
forming a volumetric representation of the sample based on the multiple image representations.

5. The method as in claim 4,
wherein the captured images comprise fluorescence images capturing fluorescence signals caused by fluorescence excitation energy provided to the sample.

6. The method as in claim 4, wherein at least one of
the multiple illumination patterns are configured to improve resolution or to provide depth information to the multiple image representations,
the multiple illumination patterns are configured to enable calculations of phase contrast information in the multiple images to form the each image representation,
the multiple illumination patterns comprise equal and opposite illumination patterns to the area to enable calculations of differential phase contrast information in the multiple images to form the each image representation, or
the multiple illumination patterns are configured to enable calculations of phase information of light reaching the multiple images for determining the depth information in the each image representation.

7. The method as in claim 4, further comprising
pre-processes the captured image data for each camera in parallel before sending the image data or the pre-processed image data to a memory of a processor by direct memory access.

8. The method as in claim 4, further comprising
moving the multiple cameras or the sample to one or more new locations to scan the sample, and repeats capturing images of the sample by the multiple cameras under the multiple illumination patterns at the one or more new locations.

9. The method as in claim 4,
the formation of the each image representation comprises determining intensity and phase information of light reaching the cameras from the multiple illumination patterns for calculating positions and thicknesses of objects in the sample.

10. The method as in claim 4, further comprising
the formation of the each image representation comprises solving an equation linking amplitudes of the multiple captured images captured under the multiple illumination patterns with amplitudes of multiple images calculated from light propagation through a system matrix that describes the microscope image formation process.

11. The method as in claim 4, further comprising
the formation of the each image representation comprises calculating phase contrast differences between the multiple captured images and multiple images calculated from light propagation under the multiple illumination patterns.

12. The method as in claim 4, further comprising
the formation of the each image representation comprises determining a phase distribution of the sample through defocus images captured under the multiple illumination patterns and the multiple focus depth planes by reconstructing a relationship between light intensity and phase to relate a difference between irradiance and the phase distribution.

13. The method as in claim 4,
the formation of the volumetric representation comprises stitching the multiple image representations based on common features identified in overlap volumes between adjacent image representations.

14. The method as in claim 4,
the formation of the volumetric representation comprises minimizing variations between a function of the volumetric representation and the multiple image representations subjected to light propagation constraints, or
the formation of the volumetric representation comprises minimizing errors in assembling the multiple image representations at corresponded depths subjected to light propagation constraints.

15. The method as in claim 4,
the formation of the volumetric representation comprises identifying in-focus locations of objects in the sample using a sharpness metric, and associating the locations with calibrated depths.

16. The method as in claim 4,
the formation of the volumetric representation comprises assembling in-focus images of the objects at corresponded depths, with the in-focus images of the objects determined through a sharpness determination process, with the focused images focusable at each corresponded depth.

17. The method as in claim 4, further comprising
forming an all-in-one focus map, comprising identifying in-focus locations of the objects in the sample using a sharpness metric, and merging the identified in-focus locations into an all-in-focus image.

18. A microscope comprising:
multiple cameras,
   wherein each camera of the multiple cameras is configured to capture one or more images of a region of a sample;
one or more radiation sources,
   wherein the one or more radiation sources are configured to illuminate the sample;
a moving mechanism coupled to the multiple cameras or to the sample for moving the multiple cameras relative to the sample in an axial direction perpendicular to a lateral surface of the sample;
a processor,
   wherein the processor is configured to control the one or more radiation sources to create multiple illumination patterns to the sample,
   wherein the processor is configured to control the multiple cameras to capture images of the sample under the multiple illumination patterns, wherein the processor is configured to control the moving mechanism to focus the multiple cameras to each of multiple focus depth planes of the sample, wherein the processor is configured to form multiple image representations at the multiple focus depth planes, wherein each image representation of the multiple image representations is formed by processing multiple images of an area of the sample captured under multiple illumination patterns at a focus depth plane of the multiple focus depth planes, with each image of the multiple images captured under an illumination pattern of the multiple illumination patterns, wherein the images of an area include images captured by an individual camera, or composite images stitched from images captured by multiple cameras, wherein the processor is configured to form a volumetric representation of the sample based on the multiple image representations at the multiple focus planes.

19. The microscope as in claim 18, wherein the sample comprises a multi-well plate, wherein the each camera of the multiple cameras is configured to capture one or more images of a well of the multi-well plate.

20. The microscope as in claim 18, wherein one or more cameras of the multiple cameras comprise fluorescence filters configured to capture fluorescence signals emitted from the sample, wherein at least a radiation source of the one or more radiation sources is configured to emit a fluorescence excitation energy to the sample.

* * * * *